US009801071B2

(12) United States Patent
Wynn et al.

(10) Patent No.: US 9,801,071 B2
(45) Date of Patent: *Oct. 24, 2017

(54) SYSTEMS AND METHODS FOR ENHANCED ENGAGEMENT

(71) Applicant: Devicescape Software, Inc., San Francisco, CA (US)

(72) Inventors: Simon Wynn, Redwood City, CA (US); John Gordon, Alameda, CA (US); Jean-Marc Matteini, Campbell, CA (US); David Fraser, Piedmont, CA (US)

(73) Assignee: Devicescape Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,662

(22) Filed: Oct. 27, 2015

(65) Prior Publication Data

US 2016/0066187 A1    Mar. 3, 2016

Related U.S. Application Data

(63) Continuation of application No. 13/951,417, filed on Jul. 25, 2013, now Pat. No. 9,170,718.

(Continued)

(51) Int. Cl.
*G06F 7/04* (2006.01)
*G06F 15/16* (2006.01)
(Continued)

(52) U.S. Cl.
CPC .......... *H04W 12/08* (2013.01); *G06F 3/0484* (2013.01); *G06Q 30/0282* (2013.01);
(Continued)

(58) Field of Classification Search
CPC .................................................. H04W 12/08
(Continued)

(56) References Cited

U.S. PATENT DOCUMENTS 7,185,360 B1    2/2007  Anton, Jr. et al.
8,218,736 B1    7/2012  McClintock et al.
(Continued)

FOREIGN PATENT DOCUMENTS

WO    2009043053    4/2009

OTHER PUBLICATIONS

International Application No. PCT/US2013/052145, International Search Report and Written Opinion mailed Dec. 12, 2013.

*Primary Examiner* — Dant Shaifer Harriman
(74) *Attorney, Agent, or Firm* — Sheppard, Mullin, Richter & Hampton LLP

(57) ABSTRACT

In some embodiments, a method comprises displaying a pre-registration invitation on a first digital device connected to a wireless network, determining one or more wireless network identifiers associated with the wireless network, generating a pre-registration code request, the request including the one or more wireless network identifiers, providing the pre-registration code request to a virtual network server, the server generating a pre-registration code in response to the pre-registration code request, the pre-registration code associated with the one or more wireless network identifiers, receiving the pre-registration code, providing a registration request from a second digital device, the registration request comprising the pre-registration code, and provisioning an account based on the registration request and the wireless network identifiers, the wireless network identifiers identified based on the pre-registration code.

19 Claims, 40 Drawing Sheets

Related U.S. Application Data

(60) Provisional application No. 61/675,798, filed on Jul. 25, 2012.

(51) Int. Cl.

| | | |
|---|---|---|
| *G06F 17/30* | (2006.01) | |
| *H04L 29/06* | (2006.01) | |
| *H04W 12/08* | (2009.01) | |
| *G06F 3/0484* | (2013.01) | |
| *G06Q 30/02* | (2012.01) | |
| *H04W 48/18* | (2009.01) | |
| *H04L 29/08* | (2006.01) | |

(52) U.S. Cl.
CPC ........... *H04L 67/141* (2013.01); *H04W 48/18* (2013.01); *H04L 63/062* (2013.01)

(58) Field of Classification Search
USPC ............................................................ 726/7
See application file for complete search history.

(56) References Cited

U.S. PATENT DOCUMENTS

| | | | |
|---|---|---|---|
| 8,607,262 B2 | 12/2013 | Hallberg | |
| 8,638,720 B2 | 1/2014 | Huang et al. | |
| 8,639,096 B2 | 1/2014 | Soohoo et al. | |
| 2003/0118034 A1* | 6/2003 | Furukawa | H04B 7/18582 370/400 |
| 2005/0066033 A1 | 3/2005 | Cheston et al. | |
| 2009/0254851 A1 | 10/2009 | Scott et al. | |
| 2011/0047603 A1 | 2/2011 | Gordon et al. | |
| 2011/0136473 A1 | 6/2011 | Gupta et al. | |
| 2011/0289433 A1 | 11/2011 | Whalin et al. | |
| 2012/0117590 A1 | 5/2012 | Agnihotri et al. | |
| 2013/0067346 A1 | 3/2013 | Rosenstein et al. | |
| 2013/0086382 A1* | 4/2013 | Barnett | G06F 21/00 713/168 |
| 2013/0191708 A1 | 7/2013 | Song | |
| 2014/0033288 A1* | 1/2014 | Wynn | H04W 12/08 726/7 |
| 2015/0237031 A1* | 8/2015 | Neuman | H04L 63/08 713/176 |
| 2015/0351004 A1* | 12/2015 | Ko | H04W 4/008 455/411 |
| 2016/0066187 A1* | 3/2016 | Wynn | H04W 12/08 726/7 |
| 2016/0164959 A1* | 6/2016 | Kim | H04L 67/104 709/218 |
| 2016/0227412 A1* | 8/2016 | Li | H04W 12/08 |

* cited by examiner

FIG. 37

SYSTEMS AND METHODS FOR ENHANCED ENGAGEMENT

CROSS-REFERENCE TO RELATED APPLICATIONS

The present application is a continuation of U.S. patent application Ser. No. 13/951,417, entitled "Systems and Methods for Enhanced Engagement," filed Jul. 25, 2013, now U.S. Pat. No. 9,170,718, which claims priority to U.S. Provisional Patent Application Ser. No. 61/675,798, entitled "Systems and Methods for Enhanced Engagement with Access Point Users," filed Jul. 25, 2012, which are incorporated by reference herein.

The present application is related to U.S. Nonprovisional patent application Ser. No. 13/951,428, entitled "Systems and Methods for Enhanced Engagement," filed Jul. 25, 2013, which claims priority to U.S. Provisional Patent Application Ser. No. 61/675,798, entitled "Systems and Methods for Enhanced Engagement with Access Point Users," filed Jul. 25, 2012; U.S. Nonprovisional patent application Ser. No. 13/396,552, entitled "Systems and Methods for Network Curation," filed Feb. 14, 2012, now U.S. Pat. No. 8,667,596, which claims priority to U.S. Provisional Patent Application Ser. No. 61/442,780, entitled "Systems and Methods for Network Curation," filed Feb. 14, 2011; U.S. Nonprovisional patent application Ser. No. 12/240,969, entitled "Systems and Methods for Wireless Network Selection Based on Attributes Stored in a Network Database," filed Sep. 29, 2008, now U.S. Pat. No. 8,194,589, which claims priority to U.S. Provisional Patent Application Ser. No. 60/976,344, entitled "Systems and Methods for Opportunistic Access to Free and Open Wireless Networks," filed Sep. 28, 2007; U.S. Nonprovisional patent application Ser. No. 12/240,920, entitled "Systems and Methods for Wireless Network Selection," filed Sep. 29, 2008, now U.S. Pat. No. 8,554,830, which is a continuation-in-part of U.S. Nonprovisional patent application Ser. No. 11/899,739, entitled "Systems and Methods for Providing Network Credentials," filed Sep. 6, 2007, now U.S. Pat. No. 8,196,188, which claims priority to U.S. Provisional Patent Application Ser. No. 60/824,756, entitled "Network Credential Discovery Using DNS," filed Sep. 6, 2006; U.S. Nonprovisional patent application Ser. No. 11/899,697, entitled "System and Method for Acquiring Network Credentials," filed Sep. 6, 2007, now U.S. Pat. No. 8,191,124, which claims priority to U.S. Provisional Patent Application Ser. No. 60/824,756, entitled "Network Credential Discovery Using DNS," filed Sep. 6, 2006; and U.S. Nonprovisional patent application Ser. No. 11/899,638, entitled "Systems and Methods for Obtaining Network Access," filed Sep. 6, 2007, now U.S. Pat. No. 8,549,588, which claims priority to U.S. Provisional Patent Application Ser. No. 60/824,756, entitled "Network Credential Discovery Using DNS," filed Sep. 6, 2006, which are incorporated by reference herein.

BACKGROUND

1. Field of the Invention

The present invention generally relates to accessing communication networks. More particularly, the invention relates to the access of wireless communication networks.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology. Various cellular (e.g. GSM, CDMA and the like), Wi-Fi (i.e. IEEE 802.11), WiMAX (i.e. IEEE 802.16), and other technologies have enabled a wide range of access options for a potential network user. Many wireless access points or "hotspots" are accessible only with local geographic regions—in some cases as small as a specific business or other address. In addition, strategically placed hotspots may provide public or private network access for a diverse group of people.

The owners or managers of hotspots often require password and the like to enable user access. As a result, a user of multiple hotpots may have to store, remember, or otherwise manage a large number of passwords. Many users may store their passwords on a laptop computer they use to access the hotspot. However, not all devices capable of accessing hotspots are laptop computers; cellular phones, personal digital assistants (PDAs), and many other devices are now capable of wireless access. Unfortunately, users often cannot easily enter the password on the device or store the password within the device. For example, some devices capable of wireless access may not have a keyboard. Even when a device includes a keyboard, the keyboard is often small and may be of limited functionality, especially for users with limited finger dexterity.

When users store passwords on a laptop computer, the user must first access the laptop computer and store the correct password within the computer. When a password changes, the user is required to update the password within the computer. Additionally, having the username and password stored in the device presents a security problem should the device be lost or stolen.

Further, users are typically required to enter a password, username, and navigate a website to obtain network access. This process is time consuming and the user may enter the wrong information and be forced to re-enter data.

When users enter a password manually, they are less apt to remember difficult passwords. As a result, simple password access is susceptible to hacking and may compromise the user's network access, the hotspot, and/or the user's personal information. Moreover, the user's network access may be stolen if the user's simple password is hacked or simply guessed.

Connecting to wireless networks has traditionally been a complex process for users of wireless devices for other reasons. Typically, the user enters an area where two or more Wi-Fi networks are present, selects the Wi-Fi function on their laptop, and views a series of 'scan results' listing the available Wi-Fi networks. In one example, the listing of available Wi-Fi networks comprises a list of Wi-Fi network SSID identifiers. Users must often identify which Wi-Fi networks do not have encryption or other security mechanisms (e.g., a login page). To add to user frustration, some of the wireless networks may be functional while others may be misconfigured in such a way that renders the network unusable.

The user typically makes an arbitrary decision which Wi-Fi network to connect to based on the listing. In making a decision of which Wi-Fi network to connect, the user typically does not know whether the selected Wi-Fi network will provide adequate quality of service or even if the network will be able to provide an IP address via Dynamic Host Configuration Protocol (DHCP).

Wi-Fi networks, in homes, business and Hotspots can be identified by a human readable name (e.g., the SSID identifier). An example of an SSID identifier might be "My Home Network," or "tmobile." In addition to the SSID identifier, when a secure Wi-Fi network is first connected, various security parameters may need to be entered to configure either the WEP (Wired Equivalency Privacy), WPA (Wi-Fi Protected Access), or other security schemes.

Many Wi-Fi networks are left "open" with no encryption mechanism. Often this is intentionally done by the owner of the Wi-Fi network to enable easy access without the need for a WEP or WPA network key. However, Wi-Fi networks are also left "open" with no encryption mechanism because the owner is either unaware that the network is open or does not know how to secure the network. As a result, although the Wi-Fi network is "open," the network is not being intentionally shared. Such networks are very convenient for a user of a Wi-Fi enabled device, however, the user may not know that they do not have permission to use an otherwise open network.

Unfortunately, some countries have instituted laws which make it illegal to access a wireless network that is not purposefully shared. As a result, users may be unaware that an "open" network is not shared and, as a result, unintentionally commit a criminal act by accessing the network.

Further, today, there are a large number of access locations that are an aggregation of free and open networks. In the prior art, there is a combination of two lists including a whitelist and a blacklist. The whitelist may identify networks that are intentionally shared and the blacklist may include networks where access has been forbidden. Unfortunately, the simplistic blacklist and whitelist approach fails to take into consideration some of the more subtle complexities of the realities in WiFi hotspots. In addition to networks that are intentionally shared, there may be cases where the owner of the network unintentionally shared the network or might intend to share the network as long as the mobile device user has explicitly confirmed their agreement with the terms of use for the network. Further, there may be cases where the owner of the network may allow sharing of the network but only if the owner can display a message to the user on connection as a form of compensation for providing the access.

SUMMARY OF THE INVENTION

Exemplary methods and systems for providing network credentials for network access are described. The exemplary method comprises receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

The method may further comprise decrypting the credential request, authenticating the credential request, and encrypting the credential request response. Further, the method may also comprise retrieving an encryption key based on the digital device. The credential request may be received over a standard protocol of the network device. The standard protocol may be DNS.

The credential request may comprise a location identifier. The method may further comprise receiving a confirmed access response from the digital device.

An exemplary system for providing network credentials may comprise a credential request module and a credential request response module. The credential request module may be configured to receive a credential request from a digital device over a network device. The credential request response module may be configured to identify a network record based on at least some information within the credential request, retrieve a network credential from a plurality of network credentials based on the network record, and transmit a credential request response containing the network to the digital device.

An exemplary computer readable medium may have embodied thereon a program. The program may be executable by a processor for performing a method for providing network credentials. The method may comprise receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

Systems and methods for selecting a wireless network are disclosed. In some embodiments, a method comprises receiving a first network device identifier for a first network device and a second network device identifier for a second network device, obtaining a first network profile comprising a first attribute, the first network profile based on the first network device identifier, obtaining a second network profile comprising a second attribute, the second network profile based on the second network device identifier, and selecting either the first network device identifier or the second network device identifier based on an attribute analysis of the first attribute and the second attribute.

In various embodiments, the first network device identifier and the second network device identifier are received from a digital device by a server. The method may further comprise providing a wireless network selection based on the selection. The method may also further comprise providing a credential request response based on the selection.

In some embodiments, the network selection identifier comprises the first network device identifier. The network selection identifier may also comprise a sorted list including the first network device identifier and the second network device identifier wherein the list is sorted based on the attribute analysis of the first attribute and the second attribute. An attribute may comprise a performance metric, a shared indicator, and a service identifier.

The method may further comprise comparing the first attribute and the second attribute to minimum requirements wherein selecting either the first network identifier or the second network device identifier is also based, at least in part, on the comparison of the attributes to the minimum requirements. The method may also further comprise comparing the first attribute and the second attribute to personalized settings wherein selecting either the first network identifier or the second network device identifier is also based, at least in part, on the comparison of the attributes to personalized settings. The method may also further comprise receiving a user identifier and retrieving the personalized settings from a user account based on the user identifier.

In various embodiments, a system comprises a digital device and a server. The digital device may be coupled to a communication network and configured to transmit a first network device identifier for a first network device and a second network device identifier for a second network device over the communication network. The server may also be coupled to the communication network and configured to receive the first network device identifier and the second network device identifier from the digital device, to obtain a first network profile comprising a first attribute, the first network profile based on the first network device identifier, to obtain a second network profile comprising a second attribute, the second network profile based on the second network device identifier, and to select either the first network device identifier or the second network device identifier based on an attribute analysis of the first attribute and the second attribute.

A computer readable storage medium may be configured to store instructions, the instructions comprising a method, the method comprising the steps of receiving a first network device identifier for a first network device and a second network device identifier for a second network device, obtaining a first network profile comprising a first attribute, the first network profile based on the first network device identifier, obtaining a second network profile comprising a second attribute, the second network profile based on the second network device identifier, and selecting either the first network device identifier or the second network device identifier based on an attribute analysis of the first attribute and the second attribute.

Systems and methods for wireless network selection based on attributes stored in a network database are disclosed. In some embodiments, a method comprises receiving a network identifier associated with a wireless network, determining if a network profile associated with the network identifier is stored within a network profile database comprising a plurality of network profiles, and if the network profile associated with the network identifier is stored within the network profile database, retrieving the network profile, or if the network profile associated with the network identifier is not stored within the network profile database, initiating the network profile, obtaining an attribute associated with the network device identifier, and storing the attribute within the network profile.

The method may further comprise comparing an attribute from within the network profile to personalized settings, determining if the wireless network associated with the network identifier meets user requirements based on the comparison, and providing a credential request response based on the determination. The method may also further comprise comparing an attribute from within the network profile to minimum requirements, determining if the wireless network associated with the network identifier meets the minimum requirements based on the comparison, and providing a credential request response based on the determination.

In some embodiments, the method may further comprise comparing an attribute from within the network profile to another attribute from within another network profile stored within the network database and providing a credential request response based on the comparison. The method may also further comprise comparing an attribute from within the network profile to minimum requirements, determining if the wireless network associated with the network identifier meets the minimum requirements based on the comparison, comparing an attribute from within the network profile to another attribute from within another network profile stored within the network database, and selecting the wireless network based, at least in part, on the comparisons.

The network identifier may be received from a digital device by a server. The network identifier may comprise an SSID identifier and the attribute may comprise a performance metric, a shared indicator, and a service identifier.

Storing the attribute within the network profile may comprise averaging one or more existing attributes with the obtained attribute and storing the result in the network profile. In some embodiments, storing the attribute within the network profile may comprise performing an algorithm on one or more existing attributes with the obtained attribute and storing the result in the network profile.

The method may also further comprise updating other network profiles within the network database by updating a shared indicator within each network profile that is associated with an identical attribute. The attribute may be an SSID identifier.

In various embodiments, a system comprises a digital device and a server in communication with a communication network. The digital device may be configured to provide a network identifier associated with a wireless network over a communication network. The server may be configured to receive the network identifier, determine if a network profile associated with the network identifier is stored within a network profile database comprising a plurality of network profiles, and if the network profile associated with the network identifier is stored within the network profile database, retrieve the network profile, or if the network profile associated with the network identifier is not stored within the network profile database, initiate the network profile, obtain an attribute associated with the network device identifier, and store the attribute within the network profile.

In some embodiments, a computer readable storage medium is configured to store instructions. The instructions may comprise a method. The method may comprise the steps of receiving a network identifier associated with a wireless network, determining if a network profile associated with the network identifier is stored within a network profile database comprising a plurality of network profiles, and if the network profile associated with the network identifier is stored within the network profile database, retrieving the network profile, or, if the network profile associated with the network identifier is not stored within the network profile database, initiating the network profile, obtaining an attribute associated with the network device identifier, and storing the attribute within the network profile.

Systems and methods for network curation are disclosed. In some embodiments, a method comprises scanning, by a mobile device, an area to identify a network device for accessing a network, receiving, by the mobile device, a network identifier associated with the network device, providing a curation indicator request to a curation server, the curation indicator request comprising the network identifier, receiving a curation indicator from the curation server, the curation indicator being retrieved, based on the network identifier, from a database of a plurality of curation indicators, the curation indicator associated with a likelihood of intent to publicly share the network by the network device, comparing the curation indicator to an access setting, the access setting indicating acceptability of network access based on the likelihood of intent to publicly share the network by the network device, and accessing the network via the network device based on the comparison.

The method may further comprise receiving a terms and conditions indicator indicating that terms and conditions are associated with use of the network device, providing, by the mobile device, a terms and conditions request over the network device to a T&C server, receiving a terms and conditions request response over the network device from the T&C server, displaying terms and conditions associated with the network device, and receiving an indication of acceptance of the terms and conditions from the user, wherein accessing the network via the network device based on the comparison comprises accessing the network via the network device based on the comparison and acceptance of the terms and conditions. The terms and conditions request response may comprise text and a link to a web page associated with terms and conditions. Displaying the terms and conditions on the mobile device may comprise displaying at least a portion of the text from the terms and conditions request response, depicting an indication of acceptance to enable the user to accept terms and conditions associated with the network device, and displaying the terms and conditions associated with the network device. The T&C server may be a curation server.

In various embodiments, providing the curation indicator request and receiving the curation indicator may comprise providing, by the mobile device, a credential request over the network device to a credential server, and receiving a credential request response over the network device from the credential server, the credential request response comprising the curation indicator and a terms and conditions indicator indicating that terms and conditions are required to access network services provided by the network device, wherein the credential server is the curation server. The method may further comprise providing, by the mobile device based on the terms and conditions indicator, a terms and conditions request over the network device to the credential server, receiving terms and conditions request response over the network device from the credential server, displaying terms and conditions associated with network services provided by the network device, and receiving an indication of acceptance of the terms and conditions from the user, wherein accessing the network via the network device based on the comparison comprises accessing the network via the network device based on the comparison and acceptance of the terms and conditions.

In some embodiments, the curation indicator indicates a likelihood that the network is intentionally publicly shared by the network device. The curation indicator may indicate a likelihood that the network is unintentionally publicly shared by the network device. The curation indicator may indicate that the likelihood of intent to publicly share the network by the network device is unknown.

Providing the curation indicator request and receiving the curation indicator may comprise providing, by the mobile device, a credential request over the network device to a credential server, and receiving a credential request response over the network device from the credential server, the credential request response comprising the curation indicator and a message indicator indicating a message associated with network services provided by the network device is available, wherein the credential server is the curation server. The method may further comprise providing, by the mobile device based on the message indicator, a message request over the network device to the credential server, receiving a message request response over the network device from the credential server, displaying, based on the message request response, a notification of a message associated with an operator of the network device to a user, receiving an indication by the user to access the message, and displaying the message based on the received indication.

An exemplary system may comprise a scan module, a credential request module, a network character determination module and an access control module. The scan module may be configured to scan an area to identify a network device for accessing a network and to receive a network identifier associated with the network device. The credential request module may be configured to provide a curation indicator request to a curation server on the network, the curation indicator request comprising the network identifier, and to receive a curation indicator from the curation server, the curation indicator being retrieved, based on the network identifier, from a database of a plurality of curation indicators, the curation indicator associated with a likelihood of intent to publicly share the network by the network device. The network character determination module may be configured to compare the curation indicator to an access setting, the access setting indicating acceptability of network access based on the likelihood of intent to publicly share the network by the network device. The access control module may be configured to access the network via the network device based on the comparison.

An exemplary computer readable storage medium may be configured to store instructions. The instructions may comprise a method. The method may comprise the steps of scanning, by a mobile device, an area to identify a network device for accessing a network, receiving, by the mobile device, a network identifier associated with the network device, retrieving, based on the network identifier, a curation indicator from a database of a plurality of curation indicators, the curation indicator associated with a likelihood of intent to publicly share the network by the network device, comparing the curation indicator to an access setting, the access setting indicating acceptability of network access based on the likelihood of intent to publicly share the network by the network device, and accessing the network via the network device based on the comparison.

An exemplary method may comprise receiving an indication of message associated with a network device, the indication of the message being provided by a message server, providing, by the mobile device, based on the indication, a message request over the network device to the message server, receiving a message request response over the network device from the credential server, displaying, based on the message request response, a notification of a message associated with the network device to a user, receiving an indication by the user to access the message associated with the network services provided by the network device to a user, and displaying the message associated with the network services.

The method may further comprise providing, by the mobile device, a message indicator request over an open port of the network device to the message server, the mobile device providing the message indicator request without logging onto the network device, wherein the indication of the message is received over the network device from the message server. Providing, by the mobile device, based on the indication, the message request over the network device to the message server may comprise providing, by the mobile device, based on the message indicator, a message request over the network device to the message server, the mobile device providing the message request without logging onto the network device.

An exemplary method comprises receiving, from a digital device by a virtual network server, a wireless network identifier, the wireless network identifier associated with a wireless network, retrieving a network record associated with the wireless network identifier from a plurality of network records, identifying one or more notification messages based on the retrieved network record, the one or more notification messages being associated with one or more customer experience interfaces displayable to a user upon engagement with the respective one or more notification message, and delivering the one or more notification message and the one or more customer experience interface to the digital device thereby enabling a user to view and engage at least one of the one or more notification messages to access at least one of the one or more customer experience interfaces.

In some embodiments, at least one of the one or more customer experience interfaces comprises a URL to a web page. The web page may be locally stored on the digital device. The wireless network identifier may be a BSSID.

In some embodiments, the method further comprises retrieving login information associated with the network record and providing the login information to the digital device to enable the digital device to provide the login information to obtain network access over a network device. In various embodiments, the method may further comprise receive quality of experience information from the digital device, assessing the quality of experience information from the digital device with quality of experience information received from other digital devices, and providing the assessed quality of experience information with a venue owner associated with the wireless network. The quality of experience information may comprise at least one of latency, jitter, speed, signal strength, or radio frequency signal to noise ratio associated with the wireless network.

In some embodiments, at least one of the one or more notification messages is created by an owner of the wireless network. The at least one of the one or more customer experience interfaces may comprise a community wall interface. The at least one of the one or more customer experience interfaces may comprise a rating interface.

In some embodiments, the method may further comprise retrieving, based on the network record, secure network information and providing the secure network information to the digital device to enable the digital device to obtain access to the wireless network.

An exemplary system may comprise a memory, a processor, and a virtual network communication module. The virtual network communication module may be executable by the processor. The virtual network communication module may be configured to receive, from a digital device, a wireless network identifier, the wireless network identifier associated with a wireless network, retrieve a network record from a network record storage storing a plurality of network records, the network record associated with the wireless network identifier, identify one or more notification messages based on the retrieved network record, the one or more notification messages being associated with one or more customer experience interfaces displayable to a user upon engagement with the respective one or more notification message, and deliver the one or more notification message and the one or more customer experience interface to the digital device thereby enabling a user to view and engage at least one of the one or more notification messages to access at least one of the one or more customer experience interfaces.

In some embodiments, at least one of the one or more customer experience interfaces comprises a URL to a web page. The web page may be locally stored on the digital device. The wireless network identifier may be a BSSID. The virtual network communication module may be further configured to retrieve login information associated with the network record and provide the login information to the digital device to enable the digital device to provide the login information to obtain network access over a network device.

In some embodiments, the system further comprises a QoE module executable by the processor, the QoE module configured to receive quality of experience information from the digital device, to assess the quality of experience information from the digital device with quality of experience information received from other digital devices, and to provide the assessed quality of experience information with a venue owner associated with the wireless network. The quality of experience information may comprise at least one of latency, jitter, speed, signal strength, and/or radio frequency signal to noise ratio associated with the wireless network.

In some embodiments, at least one of the one or more notification messages is created by an owner of the wireless network. The at least one of the one or more customer experience interfaces may comprise a community wall interface. The at least one of the one or more customer experience interfaces may comprise a rating interface.

In some embodiments, the system further comprises a secure share module configured to retrieve, based on the network record, secure network information and provide the secure network information to the digital device to enable the digital device to obtain access to the wireless network.

An exemplary non-transitory computer readable medium may comprise instructions executable by a processor to perform a method. The method may comprise receiving, from a digital device by a virtual network server, a wireless network identifier, the wireless network identifier associated with a wireless network, retrieving a network record associated with the wireless network identifier from a plurality of network records, identifying one or more notification messages based on the retrieved network record, the one or more notification messages being associated with one or more customer experience interfaces displayable to a user upon engagement with the respective one or more notification message, and delivering the one or more notification message and the one or more customer experience interface to the digital device thereby enabling a user to view and engage at least one of the one or more notification messages to access at least one of the one or more customer experience interfaces.

An exemplary method may comprise inviting a venue owner or operator to provide permission to share a wireless network associated with a venue with users of a curated wireless network, receiving a registration request to allow one or more venue attendees explicit permission to access the wireless network, the registration request comprising a representation by the venue owner or operator that the venue owner or operator is authorized to be able to provide the explicit permission, receiving a selection of one or more notification messages to provide to the one or more venue attendees, receiving an indication that the one or more venue attendee devices are connected to the wireless network, the indication comprising at least one wireless network identifier, and providing at least one of the one or more selected notification messages to at least one of the one or more venue attendee devices connected to the wireless network.

The method may further comprise providing a default notification message to at least one of the one or more venue attendees prior to receiving the registration request. Further, the method may comprise, prior to receiving the registration request, detecting an engagement with the default notification message and providing, based on the detection, a predetermined customer experience interface to the at least one of the one more venue attendees.

In some embodiments, the method may further comprise receiving a selection of one or more customer experience interfaces from the venue owner or operator to provide to the one or more venue attendees. The method may further comprise detecting an engagement with the at least one of the one or more selected notification messages and providing, based on the detection, at least one of the selected one or more customer experience interfaces to the one more venue attendees. The at least one of the selected one or more customer experience interfaces may comprise a community wall interface.

In various embodiments, the method may further comprise receiving quality of experience information from the one or more venue attendee devices, assessing the quality of experience information and providing the quality of experience information to the venue owner or operator. The registration request may comprise a wireless network identifier associated with the wireless network. The invitation to provide permission to share the wireless network may comprise an embedded wireless network identifier associated with the wireless network. The wireless network identifiers may comprise a BSSID.

In some embodiments, the method further comprises entering secure network information, the secure network information for enabling access to the wireless network, and associating the secure network information with a network record which is further associated with the wireless network.

An exemplary system may comprise a registration module, a notification module, and a virtual network communication module. The registration module may be configured to invite a venue owner or operator to provide permission to share a wireless network associated with a venue with users of a curated wireless network and to receive a registration request to allow one or more venue attendees explicit permission to access the wireless network, the registration request comprising a representation by the venue owner or operator that the venue owner or operator is authorized to be able to provide the explicit permission. The notification module may be configured to receive a selection of one or more notification messages to provide to the one or more venue attendees. The virtual network communication module may be configured to receive an indication that the one or more venue attendee devices are connected to the wireless network, the indication comprising at least one wireless network identifier and to provide at least one of the one or more selected notification messages to at least one of the one or more venue attendee devices connected to the wireless network.

The notification module may be further configured to provide a default notification message to at least one of the one or more venue attendees prior to receiving the registration request. The system may further comprise a client interaction module configure to, prior to receiving the registration request, detect an engagement with the default notification message and provide, based on the detection, a predetermined customer experience interface to the at least one of the one more venue attendees.

In some embodiments, the system may comprise a customer experience module configured to receive a selection of one or more customer experience interfaces from the venue owner or operator to provide to the one or more venue attendees. The system may further comprise a client interaction module configure to detect an engagement with the at least one of the one or more selected notification messages and to provide, based on the detection, at least one of the selected one or more customer experience interfaces to the one more venue attendees. The at least one of the selected one or more customer experience interfaces may comprise a community wall interface.

The system may further comprise a quality of experience module configured to receive quality of experience information from the one or more venue attendee devices, to assess the quality of experience information, and to provide the quality of experience information to the venue owner or operator. The registration request may comprise a wireless network identifier associated with the wireless network. The invitation to provide permission to share the wireless network may comprise an embedded wireless network identifier associated with the wireless network. The wireless network identifier comprises a BSSID.

The system may further comprise a secure share module configured to receive secure network information, the secure network information for enabling access to the wireless network, and to associate the secure network information with a network record which is further associated with the wireless network.

An exemplary non-transitory computer readable medium may comprise instructions executable by a processor to perform a method. The method may comprise inviting a venue owner or operator to provide permission to share a wireless network associated with a venue with users of a curated wireless network, receiving a registration request to allow one or more venue attendees explicit permission to access the wireless network, the registration request comprising a representation by the venue owner or operator that the venue owner or operator is authorized to be able to provide the explicit permission, receiving a selection of one or more notification messages to provide to the one or more venue attendees, receiving an indication that the one or more venue attendee devices are connected to the wireless network, the indication comprising at least one wireless network identifier, and providing at least one of the one or more selected notification messages to at least one of the one or more venue attendee devices connected to the wireless network.

An exemplary method may comprise displaying a pre-registration invitation on a first digital device connected to a wireless network, determining one or more wireless network identifiers associated with the wireless network, generating a pre-registration code request, the request including the one or more wireless network identifiers, providing the pre-registration code request to a virtual network server, the server generating a pre-registration code in response to the pre-registration code request, the pre-registration code associated with the one or more wireless network identifiers, receiving the pre-registration code, providing a registration request from a second digital device, the registration request comprising the pre-registration code, and provisioning an account based on the registration request and the wireless network identifiers, the wireless network identifiers identified based on the pre-registration code.

The method may further comprise receiving options for notification messages in response to provisioning the account, receiving notification message selections associated with the options for notification messages, and providing at least one notification message selection to be associated with the account and provided to at least one user that shares the wireless network. Further, the method may comprise detecting the at least one user accessing or who has accessed the wireless network and providing the at least one of the notification messages to a user that accessed the wireless network. In some embodiments, the method further comprises receiving options for customer experience interfaces in response to provisioning the account, receiving customer experience interface selections associated with the options for customer experience interfaces, and providing at least one customer experience interface selections to be associated with the account and provided to at least one user that shares the wireless network. The method may also further comprise detecting the at least one user accessing or who has engaged with at least one of the notification messages and providing at least one of the customer experience interfaces. In some embodiments, the method further comprises receiving feedback associated with content provided by the at least one user of the at least one of the customer experience interfaces. The at least one of the one or more customer experience interfaces may comprise a community wall interface. The at least one of the one or more customer experience interfaces may comprise a rating interface.

In various embodiments, the first digital device and the second digital device may be the same device. The wireless network may be accessible by a plurality of users before provisioning the account.

An exemplary system may comprise a display, a wireless network identification module, a virtual network communication module, and a registration module. The display may be configured to display a pre-registration invitation on a first digital device connected to a wireless network. The wireless network identification module may be configured to determine one or more wireless network identifiers associated with the wireless network. The virtual network communication module may be configured to generate a pre-registration code request, the request including the one or more wireless network identifiers, to provide the pre-registration code request to a virtual network server, the server configured to generate a pre-registration code in response to the pre-registration code request, the pre-registration code associated with the one or more wireless network identifiers, to receive the pre-registration code, to provide a registration request from a second digital device, the registration request comprising the pre-registration code. The registration module may be configured to provision an account based on the registration request and the wireless network identifiers, the wireless network identifiers identified based on the pre-registration code.

The virtual network communication module may be further configured to receive options for notification messages in response to provisioning the account, to receive notification message selections associated with the options for notification messages, and to provide at least one notification message selection to be associated with the account and provided to at least one user that shares the wireless network.

The system may further comprise a client interaction module configured to detect the at least one user accessing or who has accessed the wireless network and provide the at least one of the notification messages to a user that accessed the wireless network.

In some embodiments, the virtual network communication module may be further configured to receive options for customer experience interfaces in response to provisioning the account, to receive customer experience interface selections associated with the options for customer experience interfaces, and to provide at least one customer experience interface selections to be associated with the account and provided to at least one user that shares the wireless network. The system may also further comprise a client interaction module configured to detect the at least one user accessing or who has engaged with at least one of the notification messages and to provide at least one of the customer experience interfaces. Further, the virtual network communication module may be further configured to receive feedback associated with content provided by the at least one user of the at least one of the customer experience interfaces. The at least one of the one or more customer experience interfaces may comprise a community wall interface. The at least one of the one or more customer experience interfaces may comprise a rating interface.

The first digital device and the second digital device may be the same device. The wireless network may be accessible by a plurality of users before provisioning the account.

An exemplary non-transitory computer readable medium may comprise instructions executable by a processor to perform a method. The method may comprise displaying a pre-registration invitation on a first digital device connected to a wireless network, determining one or more wireless network identifiers associated with the wireless network, generating a pre-registration code request, the request including the one or more wireless network identifiers, providing the pre-registration code request to a virtual network server, the server generating a pre-registration code in response to the pre-registration code request, the pre-registration code associated with the one or more wireless network identifiers, receiving the pre-registration code, providing a registration request from a second digital device, the registration request comprising the pre-registration code, and provisioning an account based on the registration request and the wireless network identifiers, the wireless network identifiers identified based on the pre-registration code.

BRIEF DESCRIPTION OF THE DRAWINGS

FIG. 37 is a screen shot or interface for providing secure share information in some embodiments.

DETAILED DESCRIPTION OF THE INVENTION

Embodiments of the present invention provide systems and methods for providing network credentials. In exemplary embodiments, a credential server receives a request for network credentials from a digital device at a hotspot. The request may be formatted as a standard protocol which is relayed from the hotspot to the credential server. The credential server may identify a network record based on at least some information contained within the request and transmit network credentials associated with the network record to the digital device. The digital device may receive the network credentials and provide them to network device in order to obtain network access.

In various embodiments, a rules server may identify a preferred network from a plurality of available networks that the digital device may connect based on a variety of network attributes. In one example, a digital device may scan a physical region for available networks and generate a list of available wireless networks. The list may be provided to a rules server which identifies and retrieves a network profile for each wireless network on the list. The rules server may then compare each network profile (e.g., via attributes contained within each profile) to select a preferred network from the list. The rules server may then transmit the wireless network selection to the digital device which may then access the network.

In some embodiments, the digital device accesses the selected wireless network using credentials provided by the credential server. In one example, when the rules server selects the preferred wireless network, the rules server (or another server in communication with the rules server) may simultaneously (or nearly simultaneously) provide a credential request response including network credentials associated with the selected wireless network.

Figure 1:
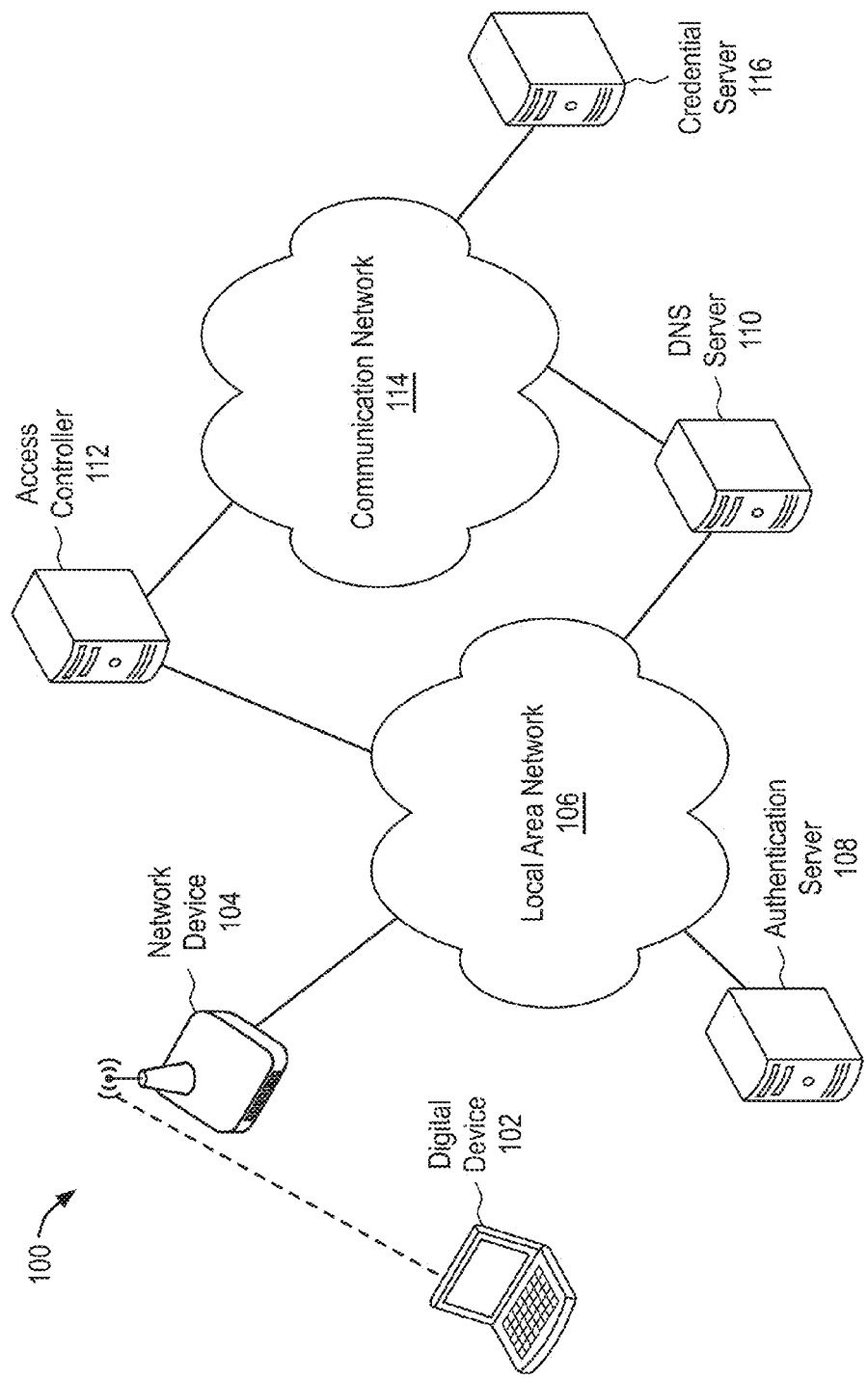
FIG. 1 is a diagram of an environment in which embodiments of the present invention may be practiced.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access the communication network 114. The DNS server 110 provides DNS services over the local area network 106 and may relay requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (e.g., such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request. More details regarding the process for acquiring network credentials are provided in U.S. patent application Ser. No. 11/899,697, entitled "System and Method for Acquiring Network Credentials," filed Sep. 6, 2007, and incorporated by reference herein.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password, and/or login procedure information. The login procedural information may comprise, for example, HTML form element names, a submission URL, or a submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server. More details regarding the process for obtaining network access are provided in U.S. patent application Ser. No. 11/899,638, entitled "System and Method for Obtaining Network Access," filed Sep. 6, 2007, and incorporated by reference herein.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
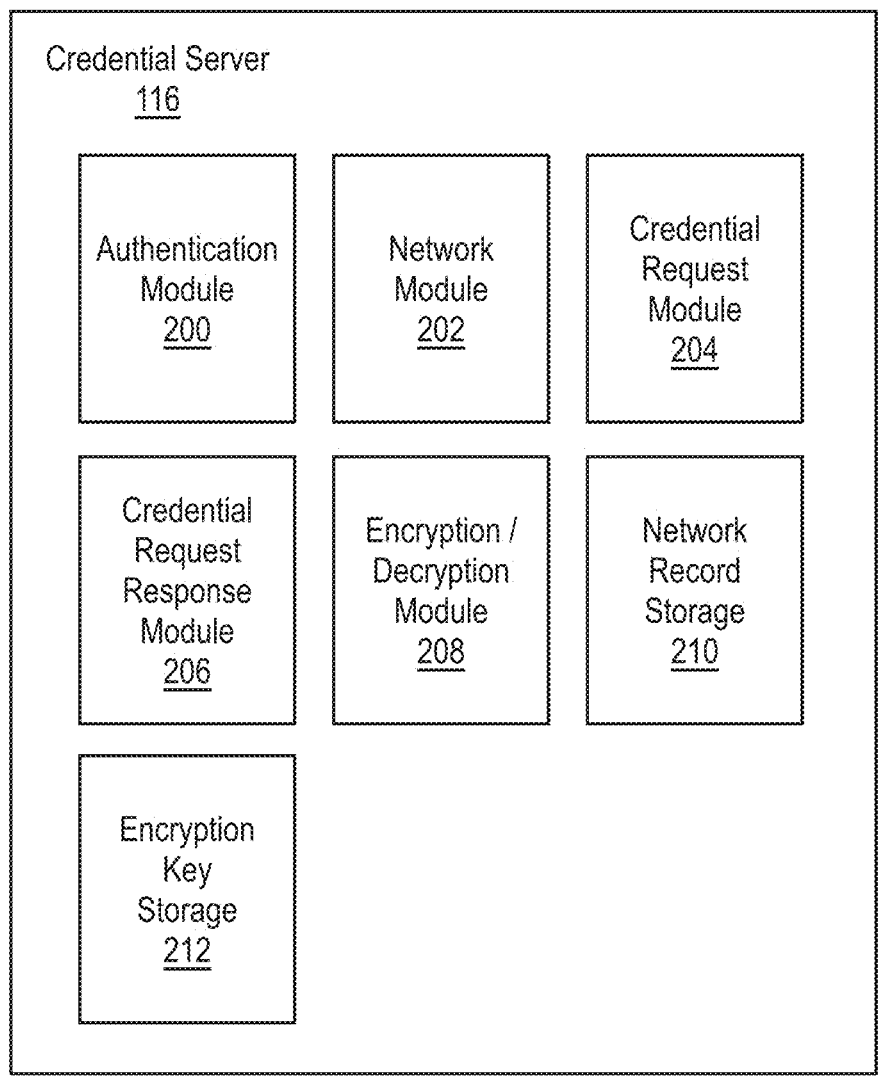
FIG. 2 is a block diagram of an exemplary credential server.

FIG. 2 is a block diagram of an exemplary credential server 116. The credential server 116 comprises an authentication module 200, a network module 202, a credential request module 204, a credential request response module 206, an encryption/decryption module 208, a network record storage 210, and an encryption key storage 212. A module may comprise, individually or in combination, software, hardware, firmware, or circuitry.

The authentication module 200 may be configured to authenticate the credential request and provide security to the credential request response. In various embodiments, the digital device 102 may encrypt or digitally sign the credential request using an encryption key (e.g., a shared encryption key or an encryption key that is a part of a key pair). The authentication module 200 may authenticate the credential request by decrypting the credential request with the proper encryption key retrieved from the encryption key storage 212. In one example, the digital device 102 generates a hash of the credential request and stores the hash within an encrypted portion of the credential request. The authentication module 200 may decrypt the credential request, generate hash of the credential request response, and compare the generated hash to the hash contained within the credential request for authentication.

In other embodiments, the digital device 102 may generate a nonce (i.e., a random value) and store the nonce within a portion of the credential request that is digitally signed. The authentication module 200 may decrypt the digital signature to authenticate the credential request and retrieve the nonce. In various embodiments, when the credential request response module 206 generates the credential request response (described hereafter), the authentication module 200 may include the nonce within the credential request response. The authentication module 200 or the encryption/decryption module 208 may then encrypt the credential request response. When the digital device 102 decrypts the credential request response, the digital device 102 may retrieve the nonce from the credential request response and compare the nonce to the nonce that was transmitted within the credential request for further authentication.

The network module 202 may be configured to receive the credential request and transmit the credential request response over the communication network 114.

The credential request module 204 may receive the credential request from the network module 202. The credential request may be a standard protocol. In one example, the credential request is a UDP protocol (e.g., DNS).

In exemplary embodiments, the credential request module 204 may retrieve the DDID and the SSID from the credential request. The DDID may identify the digital device 102, the user of the digital device 102, and/or the user associated with a network record. The SSID may identify the hotspot or the service provider (i.e., operator) of the hotspot.

The credential request module 204 or the credential request response module 206 may identify a network record based on the DDID and the SSID. A network record is a record associated (either directly or indirectly (e.g., a relational database)) with the DDID and the SSID. In one example, a network record contains network credentials necessary to provide network access to a digital device 102 associated with the DDID at the hotspot associated with the SSID. Network records may be stored within the network record storage 210.

The credential request response module 206 may generate the credential request response. In various embodiments, the credential request response module 206 receives the network credential associated with the DDID and SSID from the network record. In some embodiments, the network credential may comprise a credit card number. In one example, the digital device 102 receives the network credential, retrieves the credit card number, and provides the credit card number to the authentication server 108. In some examples, the authentication server 108 may then charge a fee to a credit card associated with the credit card number or use the information to confirm the identity of the user prior to granting network access.

Further, in various embodiments, the network credentials may comprise login procedural information. In one example, the credentials include a username and password which are to be provided within a form (e.g., an authentication form) retrieved from the authentication server 108 by the digital device 102. In some embodiments, the login procedural information may instruct the digital device 102 to populate specific fields within the form with the network credentials before submitting the completed form to the authentication server 108. Those skilled in the art will appreciate that there are many ways to provide credentials to the authentication server 108. The process of providing the credentials to the authentication server is further discussed in U.S. patent application Ser. No. 11/899,638, entitled "System and Method for Obtaining Network Credentials," filed Sep. 6, 2007.

The credential request response module 206 or the encryption/decryption module 208 may encrypt the credential request response with an encryption key associated with the DDID or the credential request. In one example, the credential server 116 stores one or more shared encryption keys. Each shared encryption key may be shared by at least one digital device 102. The credential request response module 206 may encrypt the credential request response with the shared encryption key associated with the digital device 102 (e.g., the shared encryption key may be associated with the DDID). The credential request response module 206 or the encryption/decryption module 208 may also encrypt the credential request with an encryption key that is part of a key pair. There may be many ways in which the encryption/decryption module 208 encrypts the credential request.

The encryption/decryption module 208 may decrypt the credential request and encrypt the credential request response. As previously discussed, the encryption/decryption module 208 may decrypt the digital signature of the credential request. In one example, the encryption/decryption module 208 decrypts the digital signature based on an encryption key that is associated with the DDID contained within the credential request. The encryption/decryption module 208 may also encrypt the credential request response. In one example, the encryption/decryption module 208 encrypts the credential request response based on an encryption key associated with the DDID (e.g., a shared encryption key or an encryption key that is part of a key pair).

In various embodiments, the encryption/decryption module 208 may encrypt the network records contained within the network record storage 210 and manage the encryption key storage 212. The encryption/decryption module 208 may also establish secure communications (e.g., via SSL and HTTPS) with a digital device when storing network credentials. This process is further described in FIG. 7. In accordance with some embodiments, the encryption/decryption module 208 may be optional.

The network record storage 210 and the encryption key storage 212 may store network records and encryption keys, respectively. The network record storage 210 and the encryption key storage 212 may comprise one or more databases. In one example, the network record storage 210 may store network records. A network record may comprise a DDID, SSID, and network credentials. The network record may also comprise a username and password for the user to access, alter, update, or store network records within the credential server 116.

In various embodiments, the network record may also allow multiple digital devices 102 to use the same network credentials. In one example, the user may own multiple digital devices 102. Multiple DDIDs, each DDID associated with a different digital device 102, may be included in the same network record. In some embodiments, multiple devices may be associated with one or more network records, and the one or more network records are associated with a user. As a result, the user may retrieve the network credentials for a hotspot using any number of digital devices 102. Those skilled in the art will appreciate that there are many ways in which the network records and/or the information contained therein may be stored and organized (e.g., different data structures, databases, records, organizing schemes, and/or methodologies).

Figure 3:
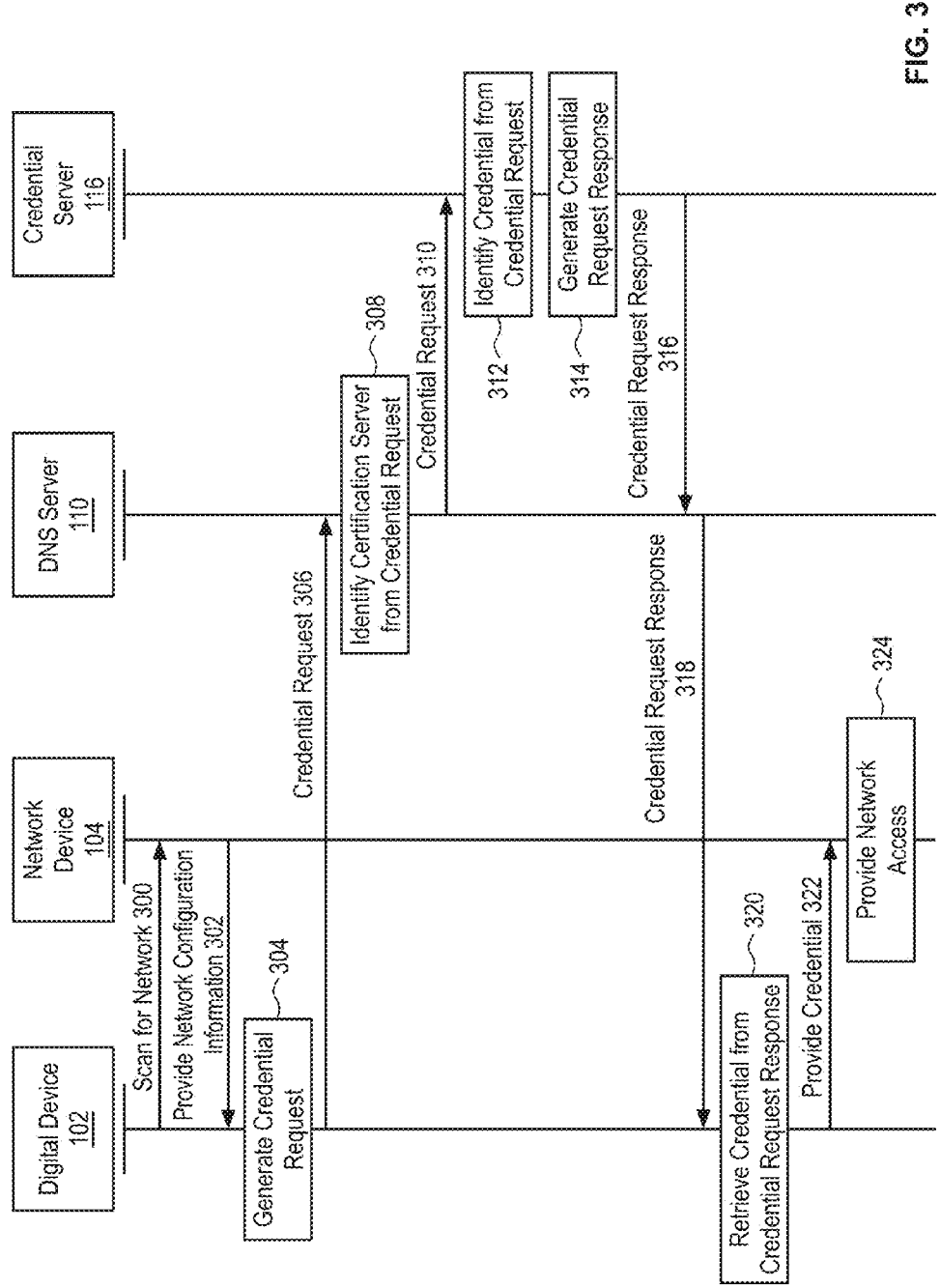
FIG. 3 is a flow diagram of an exemplary process for providing network access to the digital device.

FIG. 3 is a flow diagram of an exemplary process for providing network access to the digital device 102. When the digital device 102 first enters into a hotspot, the digital device 102 may scan for the local area network 106 in step 300. As a result of the scan, the network device 104 may provide network configuration information in step 302. The network configuration information may comprise one or more IP addresses for access to the DNS server 110.

In step 304, a credential request is generated by the digital device 102. Subsequently, the credential request may be sent to the DNS server 110 in step 306 using one of the IP addresses previously received from the network device 104.

Based on the credential request, the credential server 116 is identified by the DNS server 110 in step 308. In other embodiments, the DNS server 110 forwards the credential request to the credential server 116. When the DNS server 110 is unable to locally resolve the DNS request, the credential request is forwarded to another DNS server on the communication network 114 (e.g., over port 53) which may then forward the credential request to the credential server 116. The credential request is forwarded, either directly or indirectly through one or more other DNS servers on the communication network 114, to the credential server 116 in step 310.

The credential server 116 identifies the network credential needed based on the credential request in step 312. For example, the credential request may comprise an identifier (i.e., the DDID) for the digital device 102 as well as an identifier for the hotspot SSID (e.g., the service provider such as an operator). The identifiers may be compared against a table (e.g., network record) of such identifiers by the credential request module 204 or the credential request response module 206 to determine the proper network credential. A credential request response is then generated by the credential request response module 206 in step 314 and relayed back to the DNS server 110 in step 316. The DNS server 110 forwards the credential request response back to the digital device in step 318.

The digital device 102 may then retrieve the network credentials from the credential request response in step 320. The network credential may then be provided to the network device 104 in step 322. Upon verifying the network credentials, the network device 104 provides network access to the digital device 102 in step 324.

Figure 4:
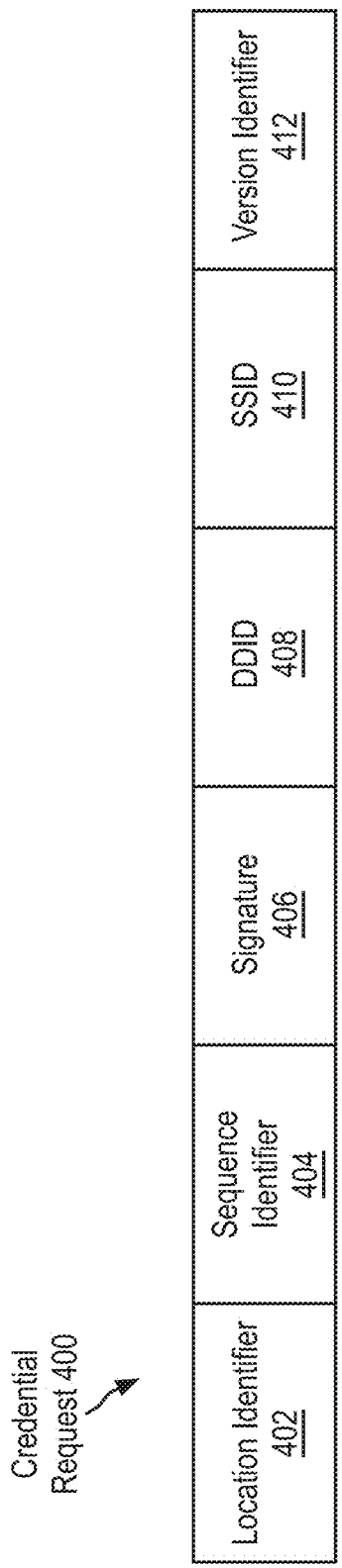
FIG. 4 is a block diagram of an exemplary credential request.

Referring now to FIG. 4, an exemplary credential request 400 is shown in more detail. According to exemplary embodiments, the credential request module 204 may generate the credential request 400. In one embodiment, the credential request 400 may be a DNS string having a structure that comprises a location identifier 402, a sequence identifier 404, a signature 406, the DDID 408, a service set identifier (SSID) 410, and a version identifier 412.

The optional location identifier 402 may indicate a physical or geographic location of the digital device 102, the network device 104, the authentication server 108, or the access controller 112. In various embodiments, the location identifier 402 may be used by the credential server 116 to track the usage of hotspots, users of the digital device 102, as well as the digital device 102.

The sequence identifier 404 may comprise any number or set of numbers used to correspond to a subsequent request to the credential server 116 to determine if the login is successful. That is, the sequence identifier 404 provides a correlation mechanism by which verification of the login process may be made by the credential server 116.

In exemplary embodiments, the signature 406 comprises a cryptographic signature (i.e., digital signature) that is utilized to prevent spoofing. The signature 406 of the request from digital device 102 is verified by the credential server 116. If the signature 406 is not valid, then the request is rejected by the credential server 116.

The DDID 408 comprises an identifier of the digital device 102. For example, the DDID 408 may comprise a MAC address or any other identifier of the digital device 102.

The SSID 410 comprises an identifier of the network access point or Wi-Fi service provider. For example, the SSID 410 may comprise the name of the service provider or the name of the venue operating the network device 104.

The version identifier 412 may identify the protocol or format of the credential request 400. For example, a digital device 102 may generate the credential request 400 and organize the data in a number of different formats. Each different format may be associated with a different version identifier. In some embodiments, the components of the credential request response module 206 may be updated, reconfigured, or altered over time, which may affect the structure of the credential request 400. As a result, the credential server 116 may receive a plurality of credential requests 400 which are formatted differently. The credential server 116 may access the required information from each credential request based on the respective version identifier.

Figure 5:
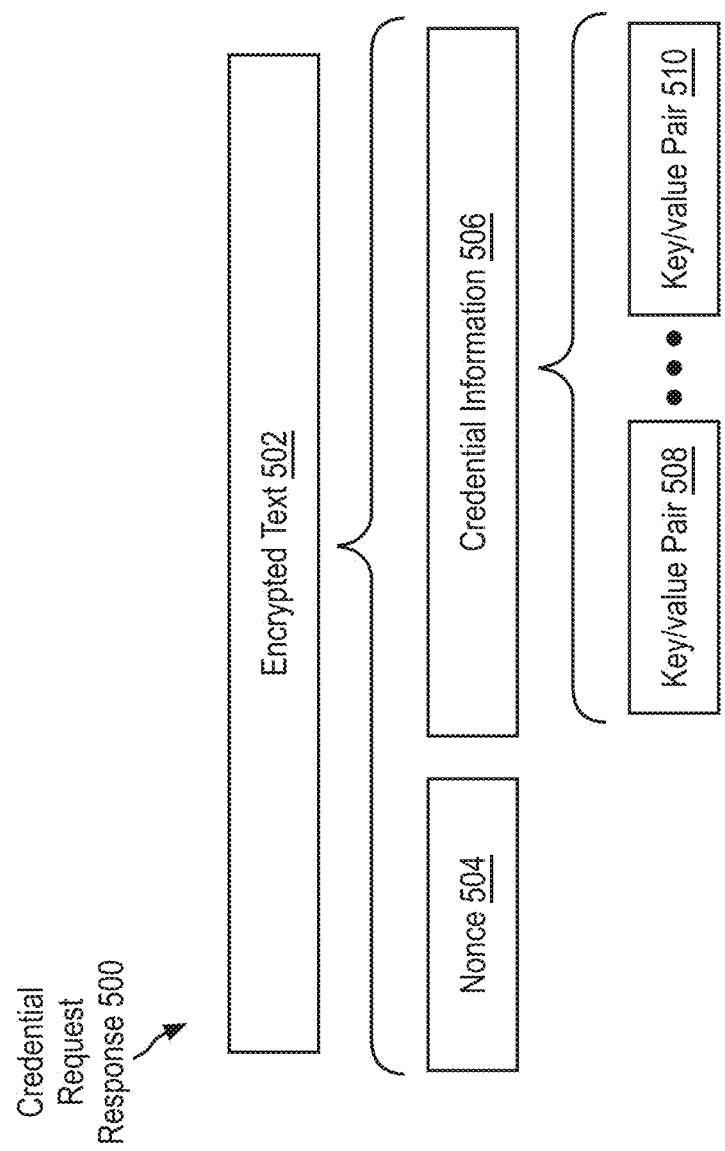
FIG. 5 is a block diagram of an exemplary credential request response.

FIG. 5 is a block diagram of an exemplary credential request response. According to exemplary embodiments, the credential request response module 206 may generate the credential request response 500. In one embodiment, the credential request response 500 may comprise encrypted text 502. The encrypted text may comprise an optional nonce 504 and credential information 506. The credential information may comprise key/value pairs 508 through 510.

As previously discussed, the credential request response may be formatted as a DNS response comprising encrypted text 502. The encrypted text 502 includes the network credentials (e.g., username, password, and login procedure information). Although the credential request response 500 is depicted as including encrypted text 502, the text within the credential request response 500 need not be encrypted.

The encrypted text 502 may comprise the nonce. The nonce, as previously discussed, may be retrieved from the credential request. Once the credential request response 500 is received by the digital device 102, the digital device 102 may compare the nonce within the credential request response 500 to the nonce transmitted within the credential request for authentication. Although the nonce is depicted as within the credential request response 500 in FIG. 5, the nonce is optional.

The credential information 506 may comprise a username, password, login procedure information, or a combination of these. The credential information 506 may comprise key/value pairs 508 through 510. Any number of key/value pairs may be within the credential information 506. The key/value pairs may represent the credential information to be received and translated by the digital device 102. The credential information 506 is depicted as key/value pairs for exemplary purposes only; the credential information may be within any format not necessarily limited to key/value pairs.

Figure 6:
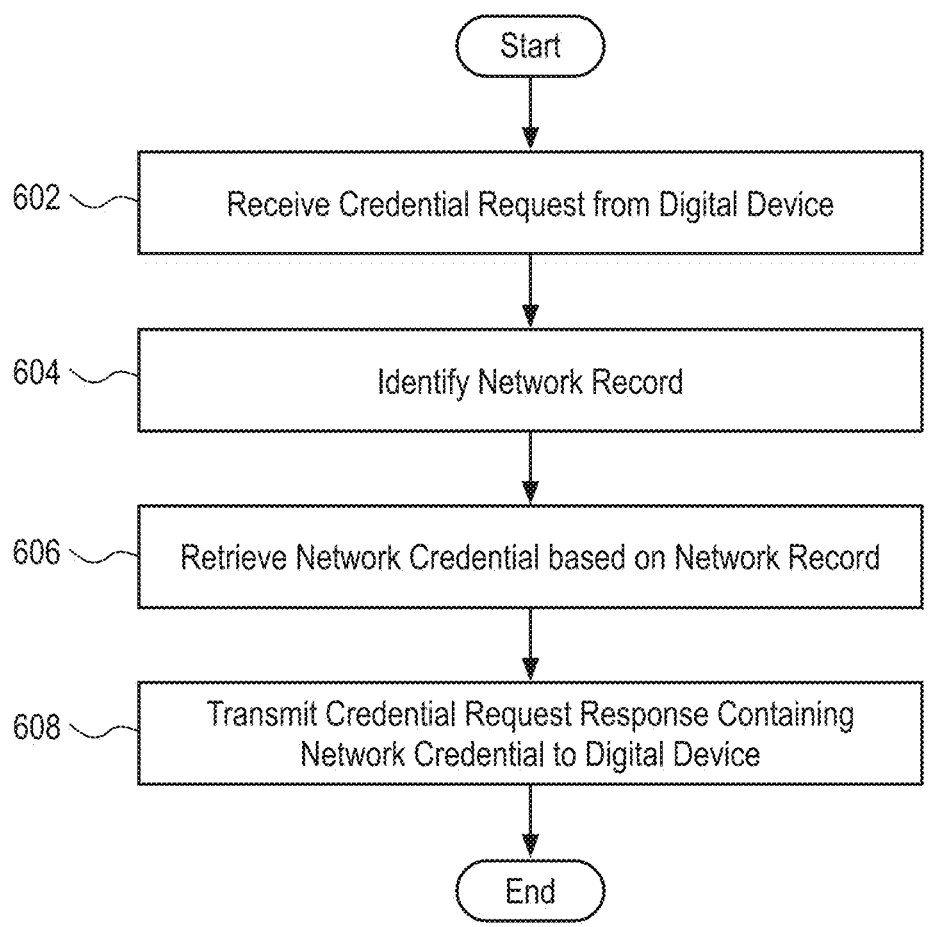
FIG. 6 is a flow diagram of the exemplary method for providing network credentials.

FIG. 6 is a flow diagram of the exemplary method for providing network credentials. In step 602, the credential server 116 receives the credential request from the digital device 102.

In various embodiments, the credential server 116 decrypts and authenticates the digital signature with an encryption key. The credential server 116 may then identify a network record based on the DDID and the SSID contained within the network record in step 604. In one example, the credential request response module 206 retrieves one or more network records associated with the DDID within the credential request. The credential request response module 206 then identifies at least one network credential associated with the SSID within the retrieved network record(s).

In step 606, the credential request response module 206 retrieves the identified network credential(s) from the selected network record. In one example, the credential request response module 206 identifies a username and password that the user of the digital device 102 must provide to the authentication server 108 to obtain network access. The credential request response module 206 generates the credential request response comprising the network credentials (e.g., username, password) to the digital device 102 in step 608.

In some embodiments, the credential request response module 206 may identify login procedural information as part of the network credentials. The credential request response module 206 may retrieve the login procedural information from the network record (e.g., the same network record containing a password associated with the SSID). The login procedural information may contain a form identifier and instructions (e.g., parameters) for the digital device 102 to follow to obtain network access. In one example, the digital device 102 retrieves the form identifier and instructions from the network credential within the credential request response. The digital device 102 may identify forms received from the authentication server 108 and input data based on the form identifier and instructions. In another example, the digital device 102 provides information to the authentication server 108 to obtain network access based on the login procedural information included within the credential request response. The process of providing information to the authentication server 108 is further described in U.S. patent application Ser. No. 11/899,638 entitled "Systems and Methods for Obtaining Network Access," filed Sep. 6, 2007.

Figure 7:
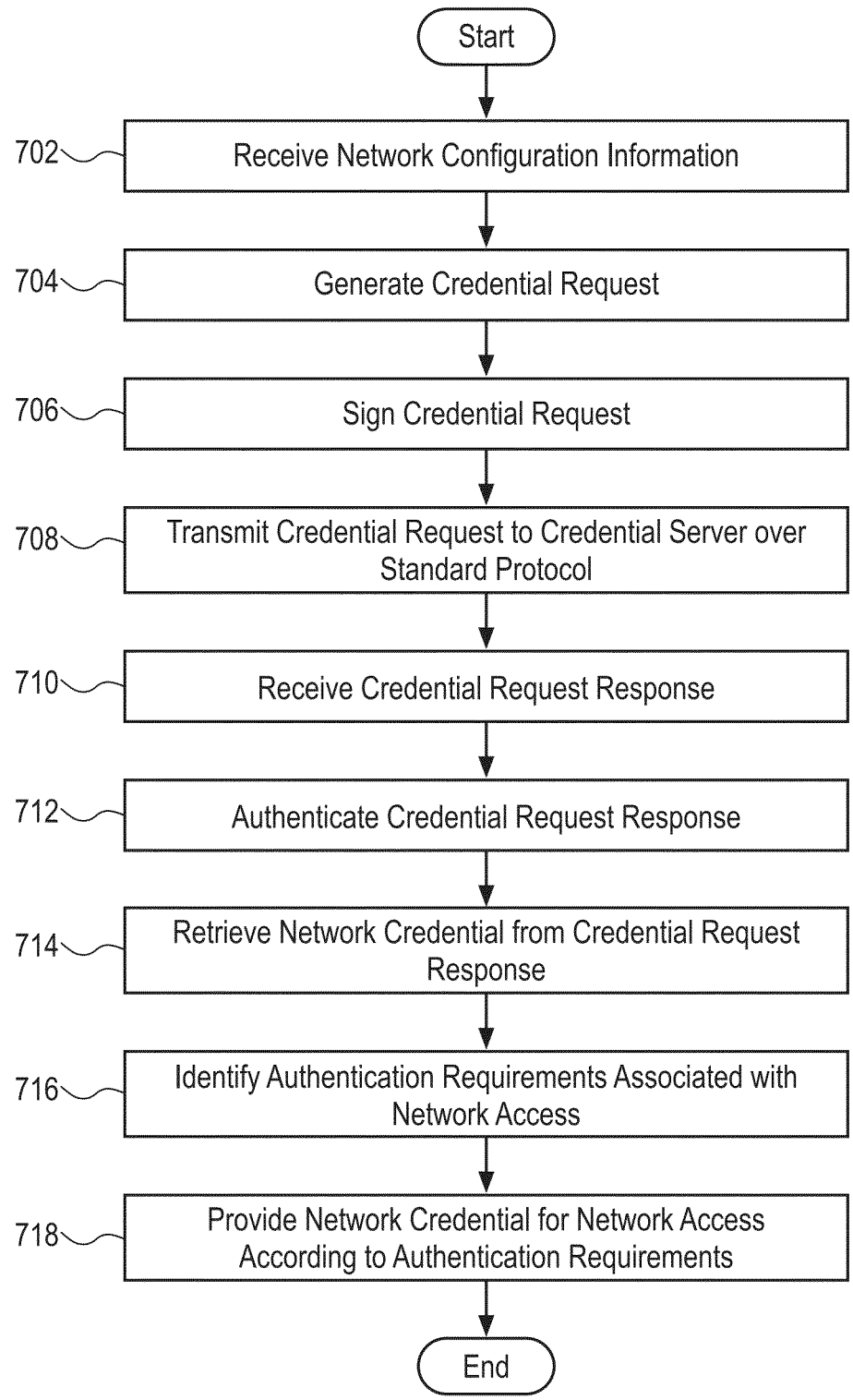
FIG. 7 is another flow diagram of the exemplary method for providing network credentials.

FIG. 7 is another flow diagram of the exemplary method for providing network credentials. The digital device 102 may search and find an available wireless network via the network device 104. While connecting to the hotspot, the digital device 102 may receive network configuration information in step 702. Network configuration information may comprise an identifier for the network device 104, or the DNS server 110. In one example, the digital device 102 receives a DNS server IP address (e.g., for the DNS server 110) during the connection process.

In step 704, the digital device 102 generates the credential request. The credential request may comprise a sequence identifier, DDID, and SSID. In step 706, the digital device 102 optionally generates a nonce and digitally signs the credential request with an encryption key. The digital device 102 transmits the credential request as a standard protocol in step 708. The network device 104 may receive and forward the credential request to the communication network 114. In various embodiments, the network device 104 may provide the credential request to the DNS server 110 which may forward the credential request to the credential server 116.

In exemplary embodiments, the credential request module 204 of the credential server 116 receives the credential request. The credential request module 204 may retrieve an encryption key associated with the DDID within the credential server from the encryption key storage 212. The credential request module 204 may then decrypt the digital signature of the credential request for authentication. The credential request module 204 may further retrieve the nonce and a sequence identifier from the credential request.

The credential request response module 206 of the credential server 116 may then retrieve a network record associated with the DDID and the SSID from the network record storage 210. The credential request response module 206 retrieves network credentials from the network record and generates the credential request response. The credential request response may comprise the network credentials and the nonce. The encryption/decryption module 208 may encrypt the credential request response with an encryption key associated with the DDID retrieved from the encryption key storage 212. In some embodiments, the credential request response is formatted as a standard protocol (e.g., DNS).

In step 710, the digital device 102 receives the credential request response. The digital device 102 subsequently authenticates the credential request response in step 712. In one example, the digital device 102 decrypts the credential request response with the same encryption key used to digitally sign the credential request. The digital device 102 may further retrieve the nonce within the credential request response and compare the nonce to the nonce transmitted within the credential request for further authentication. If the credential request response is found to be authentic, the digital device 102 retrieves the network credentials from the credential request response in step 714.

In step 716, the digital device 102 identifies the authentication requirements associated with network access. In various embodiments, the digital device 102 determines the correct information and network credentials to provide to the authentication server 108. In one example, the digital device 102 retrieves one or more network access pages from the authentication server 108. The digital device 102 may access the correct network access page from the authentication server and automatically make selections. In one example, the digital device 102 may automatically activate selections (e.g., activate buttons within the network access page, check boxes, and select radio buttons).

For example, the credential request response module 206 may provide instructions to the digital device 102 for the automatic selections within a network access page. As discussed herein, a network access page may comprise one or more web pages, one or more tags, or a combination of both retrieved from the authentication server 108. In one example, software within the digital device 102 may automatically check all selection boxes within a network access page. The digital device 102 may then uncheck select boxes based on the login procedure information. Those skilled in the art will appreciate that there may be many methods with which selections may automatically be made. In other embodiments, the digital device 102 receives XML tags from the authentication server 108. The digital device 102 may provide information based on the XML tags and instructions within the login procedural information to the authentication server 108 to obtain network access.

In step 718, the digital device 102 provides the network credential to the network device 104 to obtain network access to the communication network 114. In one example, the credential request response module 206 retrieves one or more forms from the authentication server 108, populates the forms with one or more network credentials, and provides the completed forms to the authentication server 108. In another example, the credential request response module 206 provides the network credentials as needed to the authentication server 108. Once the network credentials are received by the authentication server 108, the authentication server 108 may allow communication between the digital device 102 and the communication network 114. In one example, the authentication server 108 commands the access controller 112 to allow the digital device 102 access to the communication network 114.

The digital device 102 may subsequently test network connectivity to confirm network access. In one example, the digital device 102 transmits a request to the credential server 116 to determine if the communication network 114 is available. In some embodiments, the query or command contains the sequence identifier previously submitted within the credential request. If network access is successful, the credential server 116 may receive the request and retrieve the sequence identifier. The credential server 116 may then confirm that network access was successful.

Figure 8:
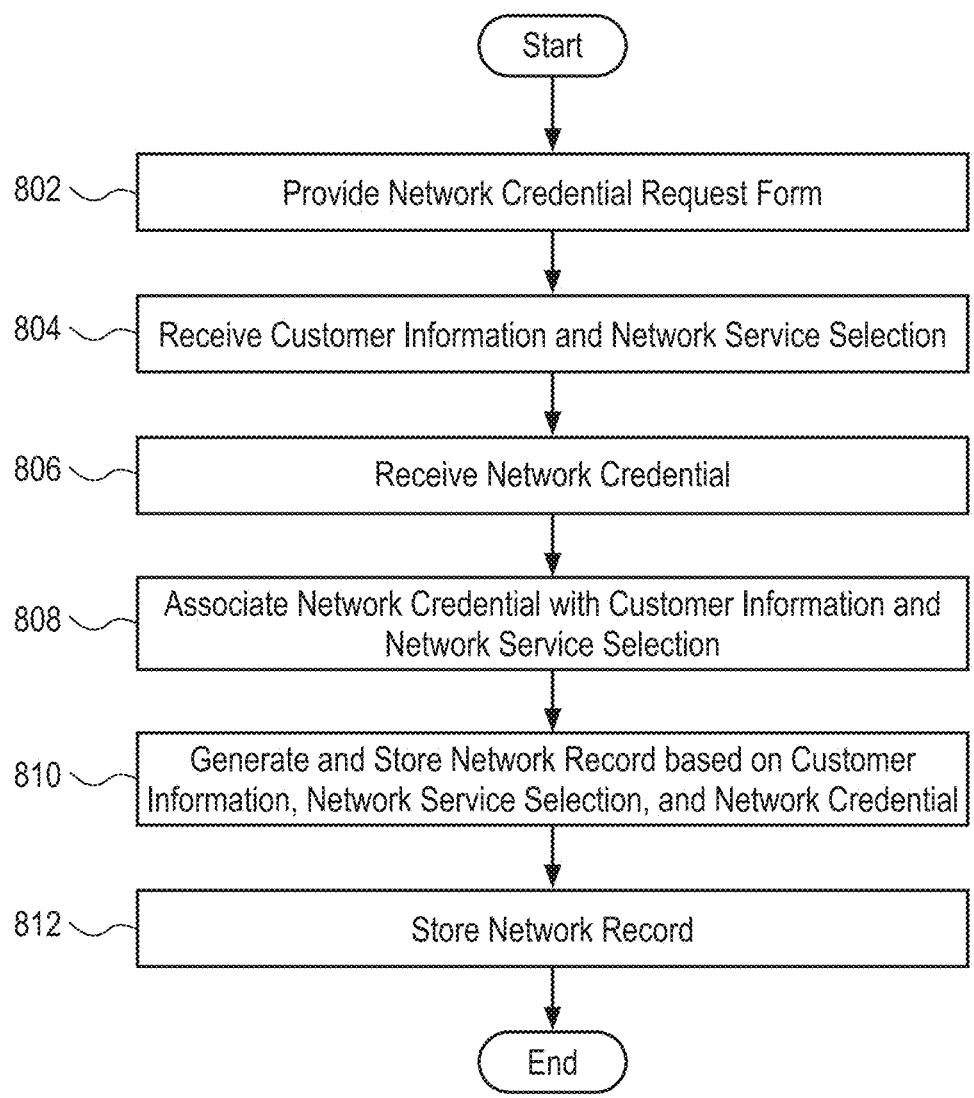
FIG. 8 is a flow diagram of an exemplary method for receiving and storing network credentials.

FIG. 8 is a flow diagram of an exemplary method for receiving and storing network credentials. In various embodiments, users may create and store network records within the credential server 116. For example, the credential server 116 may comprise a credential storage module (not depicted) that provides a graphical user interface (GUI) that allows users to create, store, update, remove, and modify network records.

In step 802, the credential server 116 provides the user with a network credential request form. In one example, the credential server 116 provides the network credential request form to a user as one or more web pages over the Internet. The network credential request form is configured to receive the service provider's name (e.g., operator's name) and/or SSID and network credentials.

The service provider's name may comprise the name of the entity that operates the hotspot, one or more components related to the hotspot (e.g., the network device 104), or the infrastructure of the local area network 106. In some embodiments, the service provider's name comprises the name of an organization that manages one or more hotspots for another service provider. In one example, a coffee shop and bookstore may both use a third-party manager to manage the hotspots, even if the hotspots have different service providers. In some embodiments, the network credential request form may be configured to receive the third-party manager's name. In some embodiments, the service provider's name comprises the name of an organization that resells access to a hotspot network (e.g., an aggregator).

The network credential request form may also receive the SSID as a network service selection. In one example, the network credential request form comprises a pull down menu of different service providers and/or hotspots that the user may select. For example, a user may select "Starbucks" or "San Francisco International Airport" as a hotspot. The user may be given further options to such as geographic locations of the hotspot. The user may also select the service provider. For example, the user may select "T-Mobile" as a service provider. The network credential request form may then allow the user to select among one or more various hotspots associated with T-mobile. The selection(s) may then be stored as a network record. Alternately, a network service identifier associated with the selection(s) is generated as the SSID.

Further, the network credential request form may receive the network credential from the user. For example, the user may enter a username, password, passcode as network credentials within the network credential request form. In some embodiments, after the network credential request form receives the SSID, the network credential request form determines the type of network credentials required. For example, the network credential request form identifies the information required to access a network at a hotspot at the San Francisco International Airport previously selected by the user. The network credential request form then generates fields or selections to allow the user to enter only the information necessary (e.g., username, password) to obtain network access at the hotspot.

The credential server 116 may also require the user to register prior to receiving the network credential request form. During registration, the user may be required to agree to terms of service and enter customer information. Customer information comprises a username and a password to access the credential server 116 to store network credentials. Optionally, the customer information may comprise the user's address, contact information, and payment options for the user to use services offered by the credential server 116.

In step 804, the credential server 116 receives the customer information and network service selections over the network credential request form. In step 806, the credential server may retrieve the network credential. In step 808 the credential server 116 receives the customer information. The credential server 116 associates the network credential with the customer information, network service selection and network credential(s) in step 810 to create a network record. The network record is then stored in step 812.

In some embodiments, the user may manually access the credential server 116 via the Internet. In other embodiments, the user may download and install network credential software on the digital device 102. The network credential software may identify and send the DDID of the digital device 102 to the credential server 116. In other embodiments, the network credential software may be pre-installed on the digital device 102. When the digital device 102 first activates the network credential software, the network credential software may identify and send the DDID of the digital device 102 to the credential server.

The user may input the SSID (e.g., identify the service provider or hotspots) into the network credential software. The user may also input the network credentials within the network credential software. After the network credential software has obtained the DDID, SSID, and network credentials, the network credential software may upload the information to the credential server 116 which stores the information within a network record. In various embodiments, the network credential software may be downloaded from the credential server 116.

Figure 9:
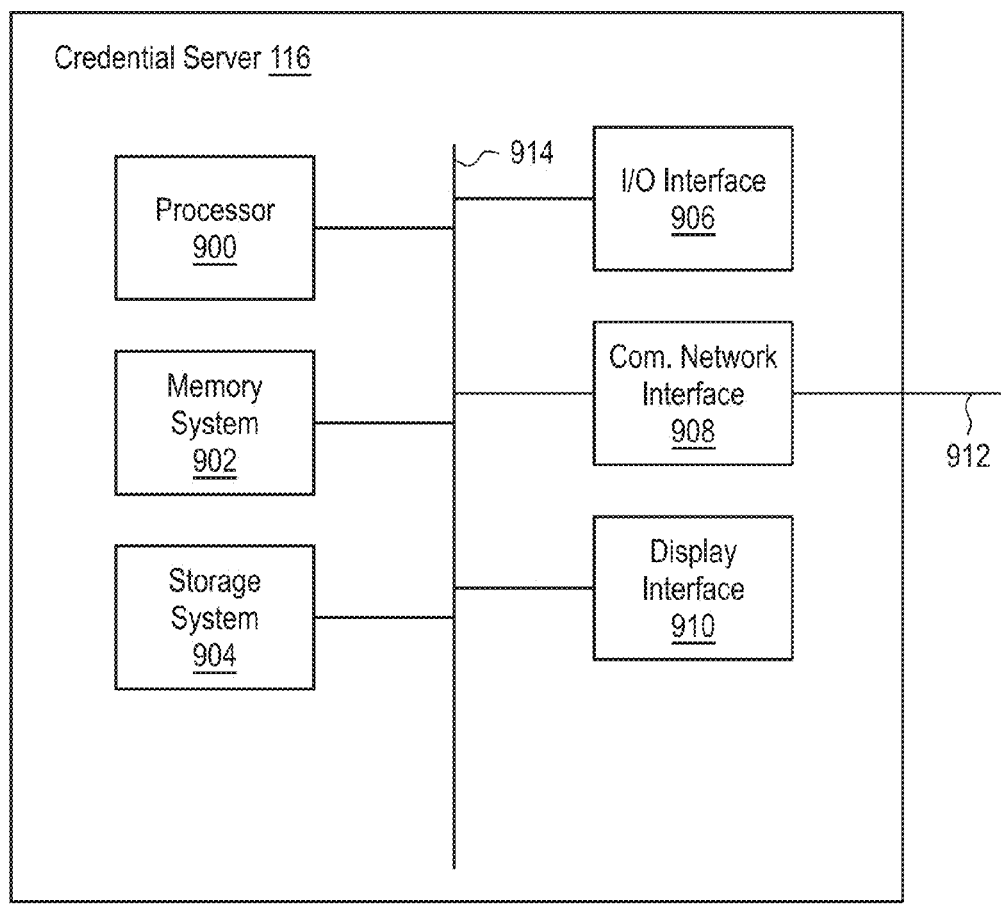
FIG. 9 is a block diagram of an exemplary credential server.

FIG. 9 is a block diagram of an exemplary digital device. The credential server 116 comprises a processor 900, a memory system 902, a storage system 904, an I/O interface 906, a communication network interface 908, and a display interface 910. The processor 900 is configured to execute executable instructions (e.g., programs). In some embodiments, the processor 900 comprises circuitry or any processor capable of processing the executable instructions.

The memory system 902 is any memory configured to store data. Some examples of the memory system 902 are storage devices, such as RAM or ROM. The memory system 902 can comprise the ram cache. In various embodiments, data is stored within the memory system 902. The data within the memory system 902 may be cleared or ultimately transferred to the storage system 904.

The storage system 904 is any storage configured to retrieve and store data. Some examples of the storage system 904 are flash drives, hard drives, optical drives, and/or magnetic tape. In some embodiments, the credential server 116 includes a memory system 902 in the form of RAM and a storage system 904 in the form of flash data. Both the memory system 902 and the storage system 904 comprise computer readable media (e.g., non-transitory computer readable media) which may store instructions or programs that are executable by a computer processor including the processor 900.

The optional input/output (I/O) interface 906 is any device that receives input from the user and output data. The optional display interface 910 is any device that is configured to output graphics and data to a display. In one example, the display interface 910 is a graphics adapter. It will be appreciated that not all digital devices 102 comprise either the I/O interface 906 or the display interface 910.

The communication network interface (com. network interface) 908 can be coupled to a network (e.g., the local area network 106 and communication network 114) via the link 912. The communication network interface 908 may support communication over an Ethernet connection, a serial connection, a parallel connection, or an ATA connection, for example. The communication network interface 908 may also support wireless communication (e.g., 802.11 a/b/g/n, WiMax). It will be apparent to those skilled in the art that the communication network interface 908 can support many wired and wireless standards.

In various embodiments, systems and methods are described that enable a digital device to automatically select and access an available wireless network from a plurality of available wireless networks based on rules to achieve a satisfactory quality of service. Such rules could be implemented in the digital device itself, on a server in communication with the digital device, or a combination of both. In various embodiments, a wireless network is a network that allows wireless access between a digital device and a communication network such as the Internet.

In accordance with some embodiments, a user of a wireless digital device (e.g., digital device capable of Wi-Fi communication) creates an account on a web server and registers one or more digital devices (e.g., computers, laptops, personal digital assistants, and cell phones) with that account. The registered digital devices can be managed and a network record provisioned by a central server (e.g., a profile server or a credential server) via a network communication mechanism, such as HTTP.

Figure 10:
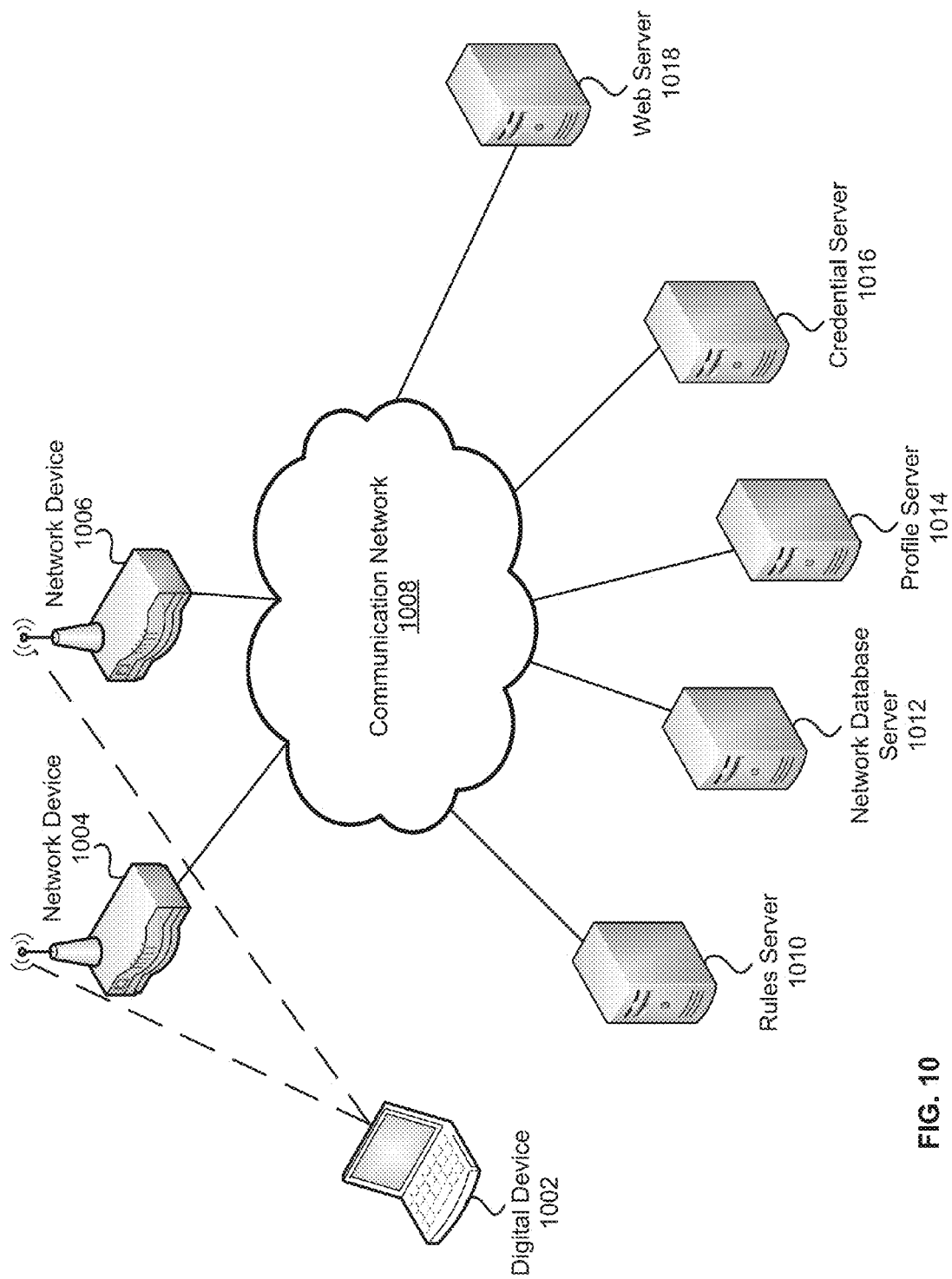
FIG. 10 is a diagram of another environment in which embodiments of the present invention may be practiced.

FIG. 10 is a diagram of another environment in which embodiments of the present invention may be practiced. In various embodiments, a user with a digital device 1002 enters an area located near the network devices 1004 and 1006. In one example, the network devices 1004 and 1006 are separate access points which may each be used to establish communication between the digital device 1002 and the communication network 1008.

The digital device 1002 may scan the area surrounding the digital device 1002, detect the two network devices 1004 and 1006, and generate a list of available wireless networks with which the digital device 1002 may establish communication. In some embodiments, the list of available wireless networks comprises DDID, SSID, and/or BSID identifiers of the network devices 1004 and 1006.

Subsequently, the digital device 1002 provides the list of available wireless networks to a rules server 1010. In one example, the digital device 1002 provides the list of available wireless networks as a standard protocol over an open port of either the network device 1004 or the network device 1006 to the communication network 1008 and, ultimately, to the rules server 1010. In another example, the digital device 1002 provides the list of available wireless networks over another network such as a cellular communication network (e.g., via CDMA, GSM, 3G, or EVDO) or other wireless network (e.g., Wi-Fi, Wimax, or LTE network) not depicted.

The rules server 1010 receives the list of available wireless networks and may retrieve a network profile for each wireless network identified within the list. A network profile is a record that is associated with a wireless network and comprises attributes concerning performance and/or quality of service provided by the associated network. In one example, the rules server 1010 identifies each network within the list and provides the SSID and/or BSID for each network to the profile server 1014. The profile server 1014 may then provide a network profile (based on the SSID and/or BSID) for each network to the rules server 1010. In some embodiments, the profile server 1014 retrieves the network profile from a database or other server (e.g., network database server 1012).

The rules server 1010 may select a preferred wireless network from the list of available wireless networks based on attributes within the network profiles and/or any attributes received from the digital device 1002. An attribute is a characteristic of a wireless network. In various embodiments, an attribute includes a performance metric, a shared indicator, or a service identifier. A performance metric of a wireless network is any measure of network performance. In some examples, a performance metric may comprise a latency metric, a bandwidth metric, or a quality of service (QOS) metric. Those skilled in the art will appreciate that a performance metric may include any type of metric that represents performance of a wireless network.

A latency metric is a measurement that represents time to send a packet of data from the digital device to a server on a network. In some embodiments, the digital device 1002 may send an ICMP "echo request" packet to a server and listen for an ICMP "echo response" reply. The latency metric may comprise an estimate of the round-trip time (generally in milliseconds) and/or include any packet loss. In another example, the latency metric is half of the estimated round-trip time.

A bandwidth metric is a measurement of the available bandwidth of a wireless network. In one example, the digital device may test available bandwidth by sending a block of data over the wireless network to a server and timing the response.

A QOS metric is any metric that measures the quality of service of the wireless network, the access device 1004, the access device 1006, and/or the communication network 1008. In one example, the QOS metric represents a reliability of the DHCP which is determined by timing the length of time required to get an IP address. The reliability of the DHCP may comprise a statistical measurement, a probability of receiving an IP address at all, and/or a distribution of time.

A shared indicator indicates if a wireless network is shared. In some embodiments, the shared indicator may be one of three states including "shared," "not shared," and "unknown". Although the shared indicator may only include a single state (e.g., "not shared"), those skilled in the art will appreciate that the shared indicator can have any number of states. A wireless network with a shared indicator that indicates that the network is "shared" may indicate that the owner of the wireless network intends for others to use the network. One example of a "shared" network may include a wireless network which is intentionally "open" (e.g., unencrypted) for others to use.

A wireless network with a shared indicator that indicates that the network is "not shared" may indicate that the owner of the wireless network does not desire anyone who does not have express permission to access the network. In one example, wireless networks that are not shared are often intentionally encrypted (e.g., through WEP or WPA) so as to limit access to unauthorized users. Not all networks that are "not shared," however, are encrypted. For example, the owner of the network may misconfigure the network device or, through error, allows a network to be open (i.e., unencrypted) even though the network is not intended to be shared.

A wireless network with a shared indicator that indicates that the network is "unknown" may indicate that the wireless network may either be "shared" or "not shared." For example, the intent of the owner of an open network may not be known.

A service identifier may identify one or more services supported by the wireless network. In one example, one or more service identifiers indicate that a wireless network supports VOIP, teleconferencing, and/or video conferencing. The service identifier may identify any kind of service supported by the wireless network. In some embodiments, the service identifier may identify services that are not supported by the wireless network.

Those skilled in the art will appreciate that the network profile may comprise any number of attributes. Further, those skilled in the art will appreciate that the network profile may comprise only one or more performance metrics, only one shared indicator, or only one or more service identifiers.

In various embodiments, the rules server 1010 selects one or more wireless networks from the list of available wireless networks based on the attribute analysis. In one example, the rules server 1010 applies rules to the attributes. The rules may comprise minimum requirements, personalized settings, and attribute comparisons. In one example, the rules applied by the rules server 1010 may compare the attributes of one or more wireless networks to one or more minimum requirements. If the attributes for a wireless network are below the minimum requirements, then the wireless network may not be selected or removed from the list of available wireless networks.

In some embodiments, the rules applied by the rules server 1010 may be based on personalized settings by the user. For example, the user of the digital device 1002 may indicate personalized settings that indicate that the digital device 1002 is only to connect over wireless networks that have been designated as "shared." In this example, the rules server 1010 may select only those wireless networks with an attribute that comprises a shared indicator that identifies the wireless network as "shared."

In various embodiments, the rules applied by the rules server 1010 may be based on a comparison of the attributes of one wireless network to another. In one example, the attributes may indicate that one wireless network has a greater bandwidth and shorter latency than another. In this example, the rules server 1010 may select one wireless network that has better performance or valuable services in comparison to another. Those skilled in the art will appreciate that there may be any kind of rule used to select or to assist in the selection of a wireless network from the list of available wireless networks.

More than one rule may be applied by the rules server 1010 in making the wireless network selection. In one example, the rules server 1010 may apply personalized settings of the user before comparing attributes from different wireless networks and making a selection. In another example, the rules server 1010 may apply minimum requirements to the attributes before comparing the attributes.

Once the rules server 1010 selects the wireless network based on the comparison of attributes from the network profiles, the rules server 1010 may provide the wireless network selection to the digital device 1002. A wireless network selection includes one or more identifiers (e.g., network identifiers) that identify at least one wireless network. The wireless network selection may identify a single wireless network or comprise a sorted list of wireless networks which is sorted in order of preference.

In some embodiments, the rules server 1010 provides credentials (e.g., a credential request response) for the selected wireless network in addition to the wireless network selection to the digital device 1002. In one example, the rules server 1010 provides the selected wireless network to the credential server 1016 which then provides a credential request response (even though no credential request has been made) for the selected wireless network to the digital device 1002. In other embodiments, the digital device 1002 receives the wireless network selection and then proceeds to transmit a credential request to the credential server 1016 to receive the credentials as discussed herein.

Further, in various embodiments, the digital device 1002 attempts to establish a connection based the selected wireless network. If the connection fails, the digital device 1002 may transmit a credential request to the credential server 1016 to retrieve credentials for network access as described herein. The digital device 1002 may provide the credential request to the credential server 1016 over an open port of the network device 1004. In another example, the digital device 1002 may provide a credential request over any other network including a connection with a different network device or over a cellular connection.

Although the rules server 1010, network database server 1012, profile server 1014, the credential server 1016, and the web server 1018 are depicted as separate servers in FIG. 1, the servers may all be combined as one or more servers. Similarly, the functions of any of the servers may be performed by one of the other servers depicted or any other server.

Although FIG. 10 depicts multiple servers (e.g., rules server, network database server, profile server, credential server, and web server) for performing the selection of a wireless network from the plurality of available wireless networks, it will be appreciated by those skilled in the art that the selection of the wireless networks may occur within the digital device 1002. In one example, the digital device 1002 retrieves the scan results listing available wireless networks and selects a wireless network based on configuration preferences. The configuration preferences may be based on one or more locally executed rules, preferred signal strength, or any other attribute or attributes. In another example, the digital device 1002 selects a wireless network that supports a desired service (e.g., VOIP), meets a minimum latency standard, and meets a minimum QOS standard. In another example, the profile server 1014 provides the desired network profiles to the digital device 1002 which performs the analysis to determine the preferred wireless network.

Figure 11:
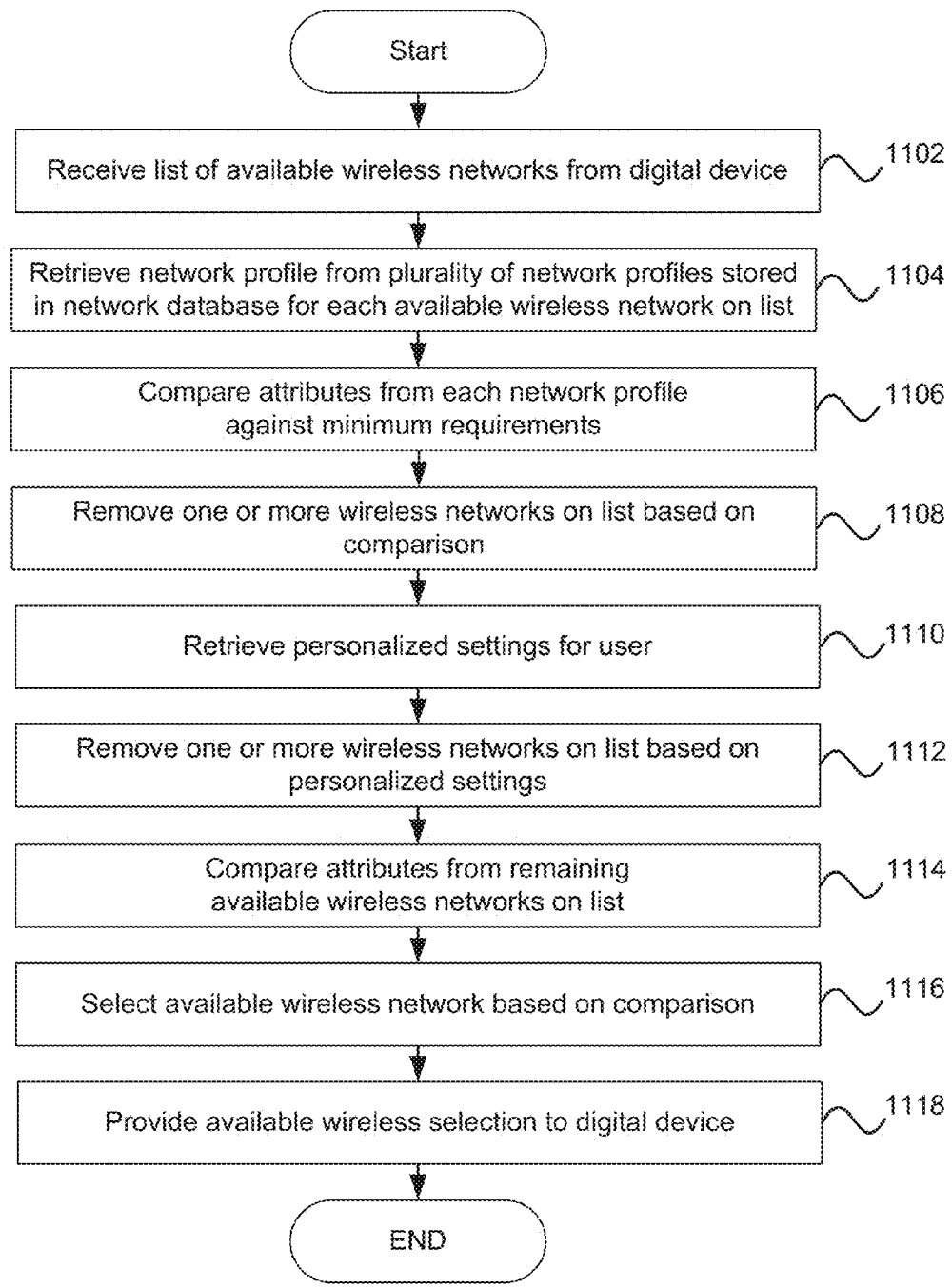
FIG. 11 is a flow diagram of an exemplary process for providing a selection of a wireless network.

FIG. 11 is a flow diagram of an exemplary process for providing a selection of a wireless network. In step 1102, a server (e.g., rules server 1010, network database server 1012, profile server 1014, credential server 1016, or web server 1018) receives a list of available wireless networks from the digital device 1002. In some examples, the list comprises the SSIDs or BSIDs of one or more network devices (e.g., network device 1004 and network device 1006). The list can comprise any information that identifies a network and/or network device.

In some embodiments, the server also receives one or more attributes associated with a network and/or network device. In various embodiments, the digital device 1002 measures signal strength, determines available services, or takes a performance metric for one or more networks and/or network devices that are identified on the list of available wireless networks.

In step 1104, the server retrieves a network profile from a plurality of network profiles stored in a network database for each available wireless network on the list of available wireless networks. Each network profile may comprise at least one attribute. In some embodiments, not all wireless networks on the list have a network profile. When a network profile for a wireless network on this list is not found, a network profile associated with the wireless network may be then created. If attributes are received from the digital device 1002, the server may determine which attribute received from the digital device 1002 is associated with which network, network device, and/or network profile.

In step 1106, the server compares attributes from each network profile against minimum requirements. In one example, the server compares latency metrics from all network profiles in the list (if available) against a minimum latency metric. The server may also compare attributes received from the digital device 1002 against the minimum requirements. In step 1108, the server removes one or more wireless networks from the list of available wireless networks and/or wireless network profiles based on the comparison(s). For example, any wireless network with a latency metric that falls below the minimum latency metric may not be selected. In other embodiments, a wireless network with a latency metric that falls below the minimum latency metric may receive a weighted value that will be compared to other wireless networks to assist in the selection process.

In some embodiments, the user of the digital device 1010 determines the minimum requirements. In other embodiments, the minimum requirements may be selected for the user (e.g., by an administrator).

In step 1110, the server retrieves personalized settings for a user. The personalized settings may be sent by the user to the server. In some embodiments, the user has an account with the web server 1018 which contains the personalized settings. In one example, the server receives a user identifier along with the list of available wireless networks. The server then accesses the user's account and receives the personalized settings which are then applied to the attributes of the network profiles associated with a wireless network on the list. In various embodiments, users may configure personalized settings (e.g., the "aggressiveness") at which a digital device 1002 may connect to a wireless network. Such configurations could include:

(a) Connect to anything open regardless of shared indicator;
(b) connect to anything open except those with default manufacturer SSIDs (e.g., "linksys") that likely indicate the owner simply left the access point open out of the box and is unaware how to configure security functions;
(c) connect to anything open that the profile server 108 has seen (or stored information regarding the Wi-Fi network); or
(d) connect to anything open with a shared indicator of "shared," or has been marked as shared by some other means.

Those skilled in the art will appreciate that there may be many personalized settings.

In step 1112, the server removes one or more wireless networks from the list or network profiles based on the personalized settings. For example, the personalized settings may indicate that the user only wishes to connect to wireless networks that support videoconferencing and maintain a user defined QOS requirement. The server may then remove any wireless networks from the list of available wireless networks based on the attributes either from the network profiles or recently received from the digital device 1002 that do not meet the user's personalized settings.

In some embodiments, the personalized settings may then be taken into account either before or after comparison of attributes from the network profiles. In one example, personalized settings indicate that the user does not wish to connect to a wireless network that is not designated as "shared" or providing certain services. In one example, the rules server 1010 either does not retrieve the network profiles associated with networks that do not provide the necessary service and/or does not compare attributes associated with those networks. In other embodiments, the digital device 1002 applies personalized settings to results (e.g., the wireless network selection) received from the rules server 1010 before accessing a preferred wireless network.

In step 1114, the server compares the attributes of the remaining wireless networks on the list. In various embodiments, the server will apply a weight and normalize one or more of the attributes (e.g., metrics) from within the network profiles. In some embodiments, older attributes may be removed or weighed less than other attributes that are newer. In one example, any metric that is over one week old may receive less weight than a similar newer metric. In another example, a metric that is over one month old may be removed from the network profiles or not considered in the comparison. Those skilled in the art will appreciate that not all attributes or information from within the network profiles may be taken into account in the comparison.

Each network profile may comprise any number of attributes. In one example, the rules server 1010 makes a wireless network selection based on comparing a metric from two different network profiles. In some embodiments, the rules server 1010 selects a wireless network based on a comparison between two similar metrics (i.e., the latency metric from the first network profile is compared to the latency metric from the second network profile). Those skilled in the art will appreciate that the rules server 1010 may select a wireless network based on comparisons between two similar recently received metrics or a recently received metric and another within a network profile.

In other embodiments, the rules server 1010 selects a wireless network based on a comparison of two dissimilar metrics (i.e., the latency metric from the first network profile is compared to a bandwidth metric from the second network profile). The rules server 1010 may execute an algorithm to weigh and normalize similar and/or dissimilar metrics or attributes in order to make a comparison for selecting the appropriate wireless network. In one example, the rules server 1010 compares a latency metric in the first network profile to a bandwidth metric in the second network profile. The rules server 1010 may execute an algorithm to weigh and normalize the metrics. The algorithm may weigh the latency metric more than the bandwidth metric since latency may have a greater impact on network performance.

An attribute or metric may receive different weights depending on any number of factors. For example, a latency metric may receive a given weight when the metric falls within an acceptable range, otherwise the latency metric may be significantly less weight. A metric recently received from the digital device 1002 may receive greater weight than a metric of a similar type within a network profile. Those skilled in the art will appreciate that there are many ways to compare similar and/or dissimilar performance and/or qualitative metrics.

In step 1116, the server selects a wireless network based on the comparison of attributes. The wireless network selection may comprise a single preferred wireless network or a list of wireless networks sorted in order of preference. In one example, the rules server 1010 identifies the most preferred network, the second most preferred network, and so on. The rules server 1010 then provides the wireless network selection to the digital device 1002 in step 1118.

In various embodiments, the rules server 1010 only compares metrics that are recently received from the digital device 1002. In one example, two latency metrics are received from the digital device 1002. Each latency metric is associated with a separate wireless network identified on a list of available networks. In this example, the rules server 1010 may select a wireless network based on a comparison of the two attributes.

Figure 12:
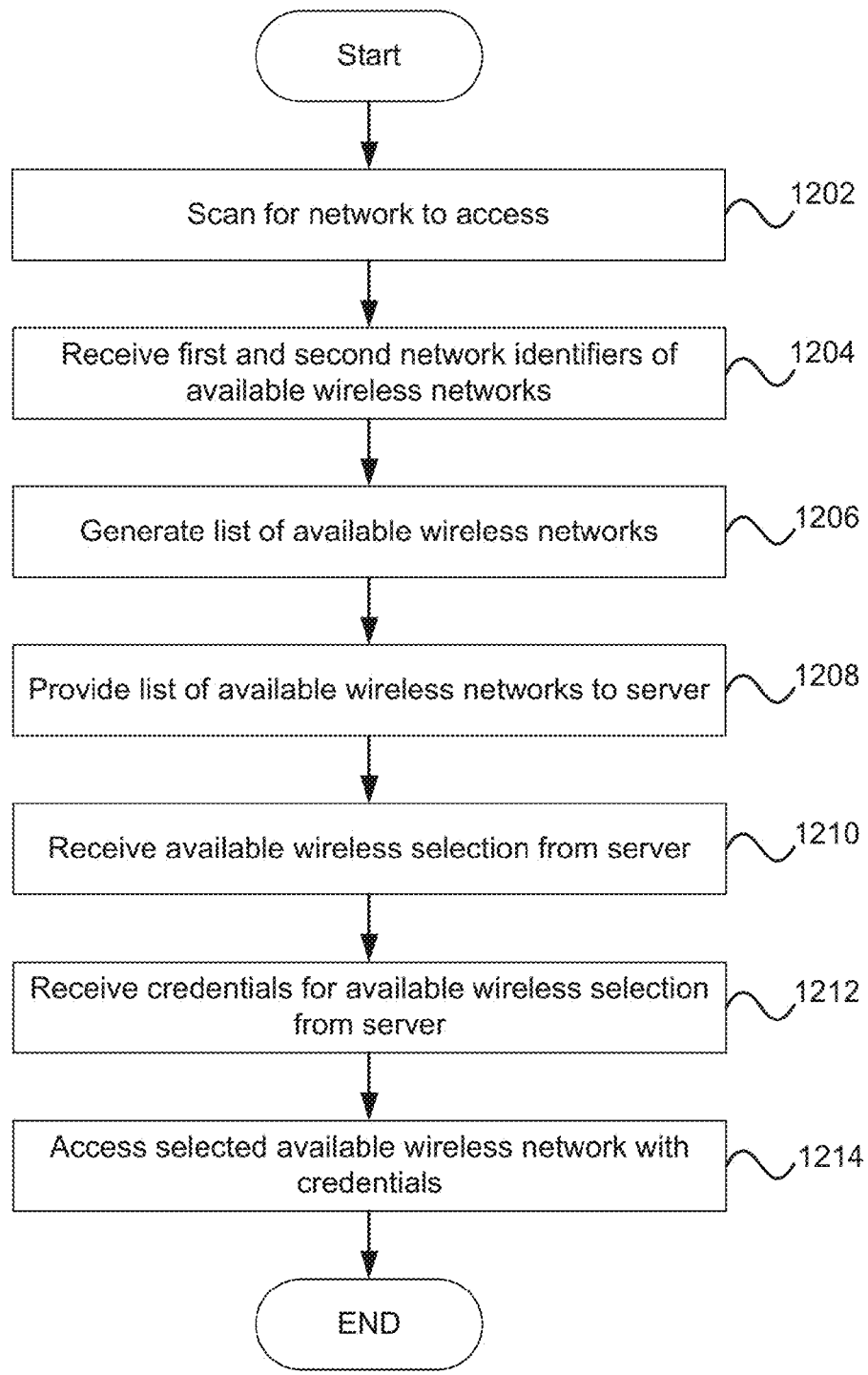
FIG. 12 is a flow diagram of an exemplary process for selecting a wireless network.

FIG. 12 is a flow diagram of an exemplary process for selecting a wireless network. In step 1002, the digital device 1002 enters into an area with two wireless networks and the digital device 1202 scans for networks to access. In step 1204, the digital device 1002 receives a first and a second network identifier of available wireless networks. As discussed herein, the first and second network identifiers may comprise BSIDs, SSIDs, or any other network identifiers. For example, the first network identifier may comprise a BSID and the second network identifier may comprise an SSID identifier. In another example, the first network may provide multiple identifiers including a BSID and an SSID while the second network provides only an SSID. In this example, the first network identifier may comprise both the BSID and the SSID of the first network device while the second network identifier is only an SSID of the second network device.

In step 1206, the digital device 1002 generates a list of available wireless networks. For example, the digital device 1002 may generate a list comprising the first network identifier and the second network identifier. The list is then provided to a server in step 1208.

In step 1210, the digital device 1002 receives a wireless network selection from the server. The wireless network selection may comprise an identifier that identifies the selected wireless network or identifies the network device associated with the selected wireless network (e.g., a BSID and/or SSID of the network device). In various embodiments, the wireless network selection may comprise a list of wireless networks sorted by preference. The list may comprise two or more identifiers that identify a selected wireless network or network device.

In step 1212, the digital device 1002 receives credentials for the wireless network selection from the server. In some embodiments, the credentials are received from the same server that received the list of available wireless networks from the digital device 1002.

In various embodiments, the digital device 1002 receives the wireless network selection from the server and then provides a credential request to receive the credentials for the desired network. In one example, the digital device 1002 provides the credential request in the same manner that the digital device 1002 provided the list of available wireless networks (e.g., over an open port of a network). In some embodiments, the preferred network does not require credentials or the credentials are stored locally on the digital device 1002.

In step 1214, the digital device 1002 accesses the selected wireless network with the credentials. The process of applying the credentials to a login page or the like is discussed herein.

In various embodiments, the digital device 1002 may provide the list of available wireless networks to the server over an open port of a network device in a manner similar to providing a credential request discussed herein. In other embodiments, the digital device 1002 may provide the list to the server over another network. In one example, the digital device 1002 generates a list of available Wi-Fi networks and provides the list over a cellular network (e.g., EVDO or 3G network). In this example, the wireless network selection may be returned to the digital device over the cellular network and then the digital device 1002 may attempt to access the preferred Wi-Fi network.

In another example, the digital device 1002 accesses one wireless network. The digital device 1002 can then provide a list of the available wireless networks to the server. The server may return the wireless network selection to the digital device 1002. If the preferred wireless network is not the network that the digital device 1002 has originally accessed, then the digital device 1002 may drop the connection and access the preferred wireless network.

Although FIGS. 10-12 contemplate a server receiving a list of available wireless networks, determining a wireless network selection, and providing the selection to the digital device 1002, those skilled in the art will appreciate that a server is not necessary. In one example, the digital device 1002 generates a list of available wireless networks and then retrieves any available information regarding the networks on the list (e.g., from locally stored network profiles, from one or more network devices, from a local or remote database, and/or retrieving information from another network such as the Internet). The digital device 1002 may then make comparisons based on what attributes associated with the networks are available to make a selection or generate a prioritized list. The digital device 1002 may then access the selected wireless network.

In various embodiments, the digital device 1002 may generate and provide attributes regarding one or more networks to update the network profiles. In one example, the digital device 1002 determines the quality of the signal, bandwidth, or any other metrics and provides those metrics along with the list of available wireless networks to a server. In another example, as the digital device 1002 accesses a selected wireless network, measures attributes, and provides the attributes update metrics within a network profile. Attributes (e.g., latency metrics, bandwidth metrics, and QOS metrics) may be taken by the digital device 1002 at any time and used to update the network profiles.

Figure 13:
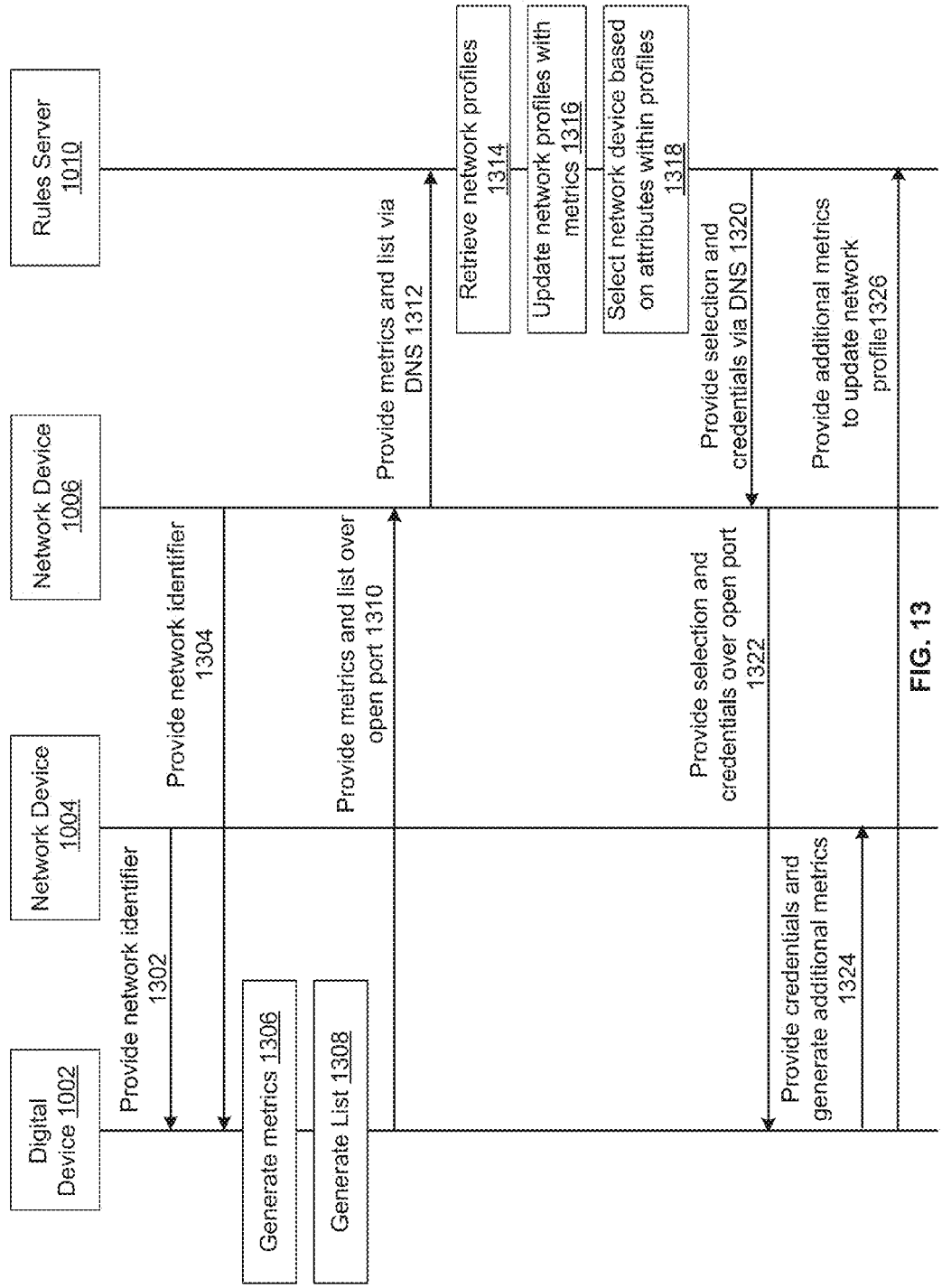
FIG. 13 is a diagram for selecting a wireless network and accessing the selected wireless network.

FIG. 13 is a diagram for selecting a wireless network and accessing the selected wireless network. In various embodiments, the network device 1004 and network device 1006 provide a first and second network identifiers to the digital device 1002 in steps 1302 and 1304. In step 1306, the digital device 1002 generates metrics (i.e., attributes) by taking measurements regarding wireless networks associated with the network device 1004 and network device 1006. In some examples, the metrics may include latency, strength of signal, or QOS metric.

In step 1308, the digital device 1002 generates a list of available wireless networks which may include the network identifier from the network device 1004 as well as the network identifier from the network device 1006. In some embodiments, the digital device 1002 may also comprise personalized settings which may indicate a preference between the two network identifiers or eliminate one or both of the network identifiers. In one example, the personalized settings indicate that only open networks that do not have a default manufacturer SSID (e.g., "linksys") may be accessed. In this example, if the network identifier from the network device 1004 indicates a default manufacturer SSID, the digital device 1002 may not include that network identifier for the network device 1004 in the list of available wireless networks.

In some embodiments, if the digital device 1002 cannot generate a list identifying at least two or more networks, the digital device 1002 does not send the list. In one example, if the digital device 1002 can only identify one available wireless network that meets the user's requirements, then the digital device 1002 may attempt to access the wireless network directly or send a credential request for to a server to retrieve any necessary credentials for access.

In step 1310, the digital device 1002 provides the attributes and the list of available wireless networks over an open port (e.g., port 53) of the network device 1006 which acts like a proxy in providing the attributes and list of available networks to the rules server 1010. In other embodiments, the digital device 1002 provides the attributes and the list over an open port of the network device 1004. Alternately, the digital device 1002 may provide the attributes and the list over separate networks (e.g., the attributes over an open port of one of the network devices and the list over a cellular network). In step 1312, the network device 1006 acts as a proxy by providing the attributes and list via DNS to the rules server 1010.

In step 1314, the rules server 1010 retrieves network profiles. In one example, the rules server 1010 retrieves the network identifiers from the list and retrieves network profiles associated with the network identifiers.

In step 1316, the rules server 1010 (or profile server 1014) updates attributes within the network profiles with the attributes received from the digital device 1002. In one example, a new latency metric from the digital device 1002 is used to update the network profile associated with the network identifier from the network device 1004. A time-to-live value associated with the attribute may also be updated to indicate that the new latency metric is recent.

In step 1318, the rules server 1010 selects a network device based on comparing the attributes from within the network profiles. In some embodiments, the rules server 1010 also applies personalized settings from the digital device 1002 or from an account associated with the digital device 1002 (e.g., via the web server 1018) before making a selection. The rules server 1010 may prepare a prioritized list of the two network devices from the list provided by the digital device 1002. The list is prioritized based on which of the two network devices provides the most desirable service based on the metrics from the network profiles.

In step 1320, the rules server 1010 provides the wireless network selection and credentials via DNS back to the network device 1006 to function as a proxy to send the information to the digital device 1002. In one example, the rules server 1010 selects the network device 1004. The rules server 1010 may retrieve credentials for the network device 1004 based on the network identifier of the network device 1004. For example, the rules server 1010 may provide a credential request to the credential server 1016. The credential server 1016 may provide a credential request response containing necessary credentials to the rules server 1010 which then sends both the credentials received from the credential server 1016 as well as the wireless network selection to the digital device 1002.

In step 1322, then network device 1006 provides the network selection and the credentials over the open port to the digital device 1002. In step 1324, the digital device 1002 provides the credentials to access the network device 1004 and generates additional attributes regarding the network (i.e., take additional measurements). Once a connection is established, the new attributes are provided to the rules server 1010 or profile server 1014 to update the network profile associated with the network device 1004 in step 1326. In one example, the digital device 1002 may measure the time required to establish the connection with the network device 1004. The time required to establish the connection may then be used to update attributes in a network profile. If a connection is not established or fails, that information may also be provided to update the associated network profile.

In some embodiments, if the network connection with the selected network fails, the digital device 1002 may re-attempt to make the connection. If multiple attempts to make the connection fail, information regarding the failure is sent to update the associated network profile. The digital device 1002 may then attempt to make a connection with another network device (e.g., the network device 1006). In some embodiments, the digital device 1002 re-scans the area, generates a new list of available networks which may not include the network that the digital device 1002 failed to connect. The new list may be sent to the rules server 1010 to receive a new wireless network selection and the process may repeat.

In some embodiments, the rules server 1010 provides a prioritized list of available wireless networks sorted by preference. In one example, the rules server 1010 provides a prioritized list of three networks to the digital device 1002. The digital device 1002 may then attempt to access the first wireless network on the prioritized list. If the digital device 1002 is unable to connect to the first wireless network, then the digital device 1002 may proceed to attempt to connect to the next network on the list. Those skilled in the art will appreciate that the prioritized list may contain all, one, or some of the wireless networks identified in the list of available wireless networks. For example, the rules server 1010 may not identify wireless networks which are known to provide poor performance, do not provide desired service (e.g., VOIP service), and/or are otherwise blacklisted.

In various embodiments, the user of the digital device 1002 may override the wireless network selection to access any wireless network. In one example, the user chooses the priority of available wireless networks. In some embodiments, the user may configure the digital device 1002 or configure an account with the web server 1018 to include personal preferences that may reorder or otherwise alter a prioritized list of wireless networks from the rules server 1010. For example, the list of available wireless networks may be altered based on user preferences by the digital device 1002 or the web server 1018 prior to being provided to the rules server 1010.

In some embodiments, in addition to one or more open Wi-Fi networks, there may also be one or more encrypted Wi-Fi networks in a given location. A digital device 1002 may connect to an open Wi-Fi network and transmit the SSID of other Wi-Fi networks, including encrypted Wi-Fi networks, to the rules server 1010 via a network communication protocol such as HTTP.

The rules server 1010 may then determine, based on personalized settings or other rules, that an available encrypted Wi-Fi network is the preferred choice for a network connection. The rules server 1010 may transmit the necessary encryption keys to the digital device 1002 over the current open Wi-Fi network connection and send instructions to the digital device 1002 to switch to the encrypted Wi-Fi network.

In various embodiments, a network database may be used to centralize information regarding many different networks. A network database may store a plurality of network profiles. Each network profile within the network database may be associated with a separate network. In some examples, the network profile is associated with a separate network by an BSID, DDID, SSID, or other identifier. Each network profile may comprise attributes from one or more users.

As more digital devices access new and existing wireless networks, attributes (e.g., metrics and other information) may be collected and stored within the network profiles of the network database. The attributes from many digital devices that access the same wireless network may be weighted and/or averaged to produce an attribute with a higher probability that the attribute will match expected future network performance. Further, users may contribute information or attributes directly (e.g., indicating that a network is shared) to more accurately characterize the wireless network.

As attributes associated with available wireless networks are gathered and organized, the quality of selections of wireless networks based on the attributes from the network database may increase. For example, a latency metric from a single user's experience with a wireless network may not be representative of the performance of the network. However, a latency metric that is formed from averaging the latency metrics received from twenty separate users who use the same wireless network may be a very accurate indicator of future performance. As more attributes and information is gathered on an increasing number of wireless networks and stored within the network database, the quality and service of wireless networks may be measured. As a result, a digital device may automatically access a wireless network and receive an expected or at least a minimum level of performance.

Figure 14:
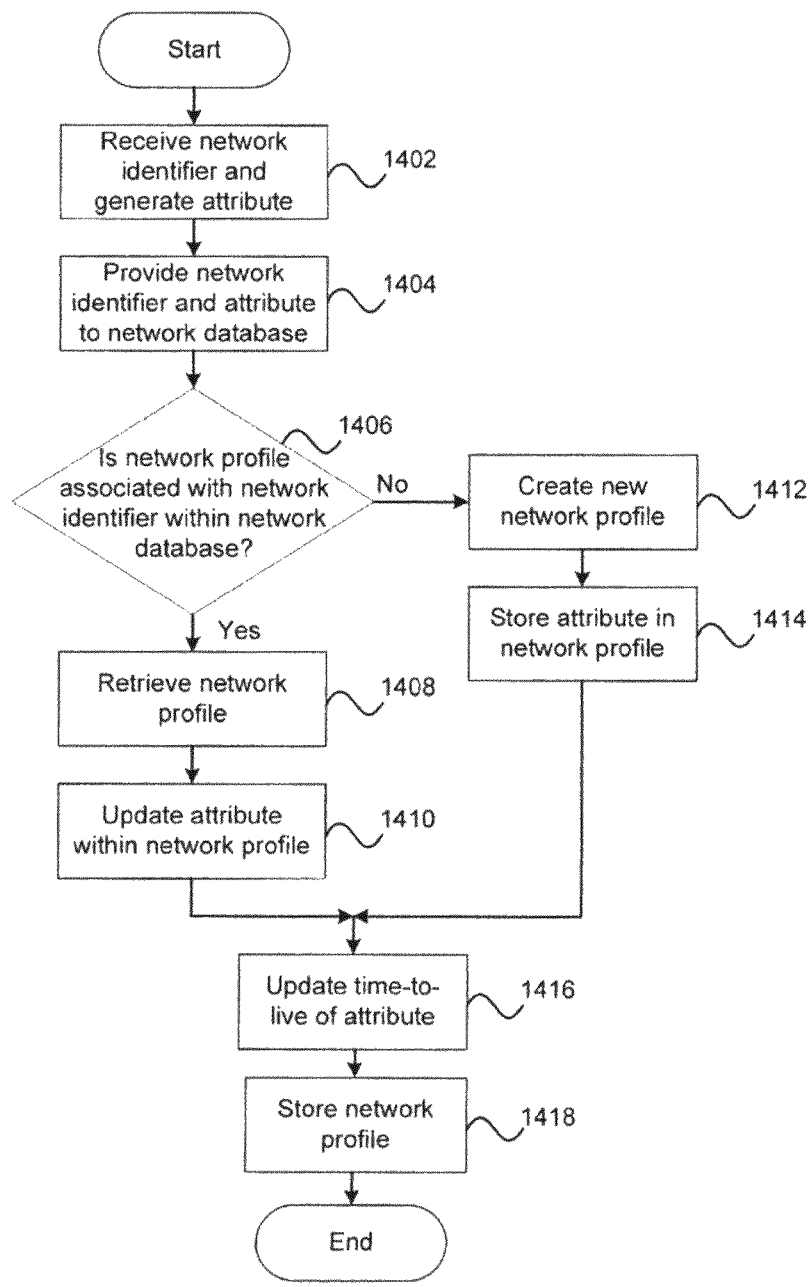
FIG. 14 is a flowchart of an exemplary process for updating and storing attributes associated with wireless networks within a network database.

FIG. 14 is a flowchart of an exemplary process for updating and storing attributes associated with wireless networks within a network database. Digital devices may scan or receive attributes regarding different network devices and/or networks. These attributes may be provided to a network database where the information will be stored and aggregated with other attributes for the same network. The digital device may provide that attributes to the network database in many ways. For example, the digital device may provide the attributes to the network database over an open port of a network device. Alternately, the digital device may provide the attributes to the network database through a cellular network or any kind of network.

The digital device may provide attributes to the network database at any time. In one example, the digital device provides the attributes to the network database prior to logging into a wireless network (e.g., as a standard protocol over an open port). In another example, the digital device may transmit one or more attributes along with a list of available wireless networks as discussed in FIG. 13. Further, attributes may be collected by the digital device while using a wireless network. In one example, the digital device may be logged into a wireless network for two or more hours. During that time, the digital device may take a latency metric every ten minutes. Similarly, during that time, the digital device may take a bandwidth metric or measure a QOS metric. The attributes may be sent at any time to the network database which may analyze and/or store the attributes.

In step 1402, a digital device 1002 receives a network identifier and generates an attribute associated with the network identifier. In one example, the network identifier is a BSID of the wireless network. The attribute may comprise a performance metric, shared indicator, or service identifier. In one example, the digital device 1002 measures a bandwidth metric of a wireless network associated with the network identifier.

In step 1404, the digital device 1002 provides the network identifier and attribute to a server to store the attribute within the network database. The digital device 1002 may provide the attribute to the network database as the attribute becomes available. Alternatively, the digital device 1002 may provide one or more attributes to the network database at predetermined intervals or at a given time. Those skilled in the art will appreciate that the digital device 1002 may be configured by a user or an administrator to control how and when the digital device 1002 generates attributes or tests the network to generate one or more attributes. Further, the user or administrator may configure how and when the digital device 1002 provides the attributes to the network database.

The server may be any kind of server (e.g., a rules server 1010, network database server 1012, profile server 1014, credential server 1016, or web server 1018). In one example, the profile server 1014 receives the network identifier and attribute from the digital device 1002. The profile server 1014 may determine if a network profile associated with the network identifier is within the network database in step 1406. In one example, the profile server 1014 queries the network database server 1012 for a network profile associated with the network identifier. The network database server 1012 may control the network database.

If the network profile exists, then another user or administrator has identified or had experience with the wireless network associated with the network identifier. If the network profile does not exist, then the network database may not have previously received an attribute for the wireless network associated with the network identifier. If the network profile exists, the network profile is retrieved in step 1408. In one example, the network database server 1012 provides the requested network profile to the profile server 1014.

The profile server 1014 may then update an existing attribute already within the network profile with the newly received attribute in step 1410. In one example, a latency metric may already exist within the network profile. The older latency metric may be averaged with the new attribute to form a new latency metric that is then stored within the network profile. If an attribute of the same type as the received attribute does not already exist within the network profile, the attribute may be stored within the network profile. For example, the recently received attribute may be a service identifier that indicates that the network supports VOIP. If no such attribute exists within the network profile, the service identifier is then stored within the network profile.

Those skilled in the art will appreciate that attributes may be combined by any kind of algorithm. In various embodiments, each quantitative attribute (e.g., performance metric) may be weighted based on any number of factors. In one example, individual quantitative attributes for the same metric are all stored within a network profile. The profile server 1012 may execute an algorithm that weighs each individual quantitative attribute based on the number of individual attributes and/or when the attributes were received (older attributes are weighted less than newer attributes). As the number of attributes for each type is received, the accuracy of a weighted representation (e.g., a weighted average) may increase.

If the network database server 1012 finds that the network profile did not previously exist, the network database server 1012 or the profile server 1014 may create a new network profile associated with the network identifier. The profile server 1014 may then store the attribute within the network profile in step 1414.

In various embodiments, the digital device 1002 enters into an area with five wireless networks. The digital device 1002 may generate a list of available wireless networks comprising network device identifiers for all five networks. If any of the five networks have not been previously identified, the network database server 1012 (or any serve) may automatically create a new network profile for each network not previously identified.

In step 1416, the profile server 1012 optionally updates a time-to-live characteristic of the attribute. The time-to-live characteristic is a predetermined time that may affect the weight of the attribute in an algorithm and/or may be a deadline from which the attribute is considered expired. In one example, an attribute may be weighted less as the attribute get older (e.g., received two to three weeks before the current time). In some embodiments, when an attribute is thirty days old, the attribute is automatically expired. In one example, an expired attribute may be removed from the network profile automatically. In another example, the attribute may continue to exist in the network profile but is either ignored or weighted very lightly in comparison to newer or "fresher" attributes of the same type.

In some embodiments, a weighted average of all attributes of a certain type (e.g., the last twenty latency metrics associated with a single wireless network received over the last two weeks) is also associated with a time-to-live characteristic. If the average is not updated, the average itself may be weighted in a manner consistent with the stale attributes. In some embodiments, averages may expire based on the time-to-live characteristic if the average is not updated regularly.

In step 1418, the profile server 1014 or the network database server 1012 stores the network profile within the network database.

In another example metrics are provided by the digital device 1002 to update one or more network profiles. In one example, a wireless network is recently upgraded to support VOIP. In this example, the digital device 1002 may detect the new capability and provide a service identifier that indicates this capability to the rules server 1010. The rules server 1010 may retrieve and update a network profile from the profile server 1014 to indicate the new capability. The updated network profile may then be stored within the network database.

In various embodiments, attributes received from a digital device 1002 may be stored within a plurality of network profiles associated with different network device identifiers. In one example, an attribute comprises a physical location of the network and/or network device identifier. If the digital device 1002 provides a list of available wireless networks, and the location of one of the wireless networks is known, then the network database server 1012 may conclude that all networks on the list of available wireless networks must also be in the same general location. As a result, the network database server 1012 may create or update attributes in all network profiles associated with the list to specify a location even if one or more of those wireless networks are otherwise encrypted (e.g., WEP or WPA).

A server (e.g., the profile server 1014, the credential server 1016, or the web server 1018) may also be able to determine the location of the digital device 1002. In one example, the profile server 1014 receives a BSID from the digital device 1002. The profile server 1014 may refer to a database of locations for different BSIDs to determine the location of the user. In another example, the profile server 1014 may query a GPS unit in the digital device 1002 or a GPS unit within the network device associated with the network device identifier to receive location information. In yet another example, the location of the digital device 1002 may be determined by using an IP address of the digital device 1002. The location attribute for all wireless networks in the area may then be updated to indicate the general location of related wireless networks or network devices.

In some embodiments, the location of the user may be determined or retrieved from a network profile in order to identify the general physical location of the user. The general physical location of the user can be used to update attributes of networks in the user's area as discussed. In various embodiments, a location directory of available wireless networks may be created. In one example, a graphical user interface allows a user to interact (e.g., via a web site) with a location database thereby allowing the user to browse a directory of available wireless networks and their respective locations. Further, the directory may indicate one or more attributes or functions of attributes. In one example, the directory identifies the expected latency of one or more wireless networks as well as the location, service offered, and whether the wireless network is intentionally shared.

Further, targeted advertising may be directed to the digital device 1002 depending on the location of the user or the user's proximity to goods and services. In various embodiments, a database of locations of wireless networks may be generated. Access to the database may then be sold to advertisers to create or direct advertisements.

Figure 15:
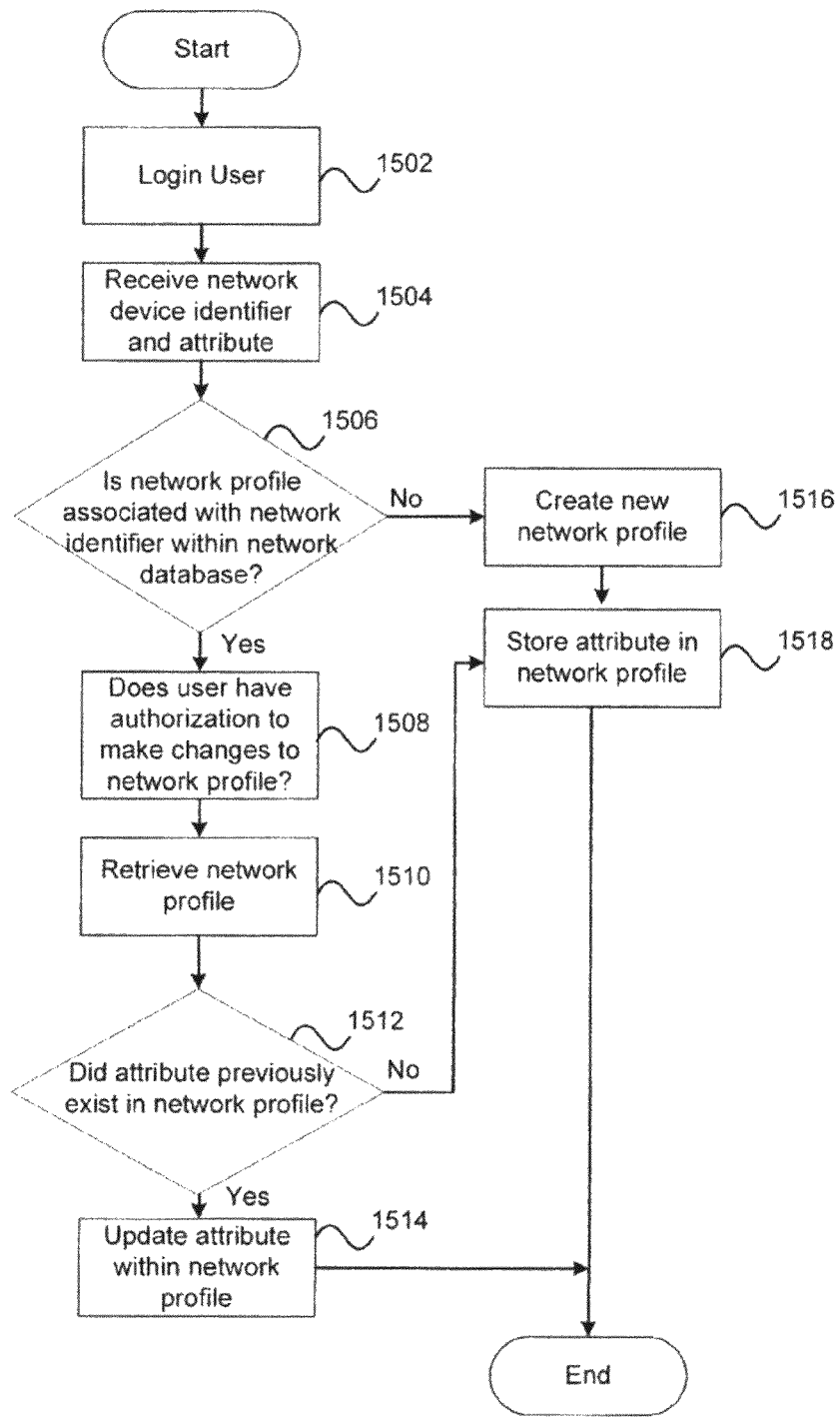
FIG. 15 is another flowchart of an exemplary process for updating and storing attributes associated with wireless networks within a network database.

FIG. 15 is another flowchart of an exemplary process for updating and storing attributes associated with wireless networks within a network database. In various embodiments, an owner of a wireless network, user of a digital device 1002, and/or administrator may log onto a web server 1018 to create, update, or access one or more network profiles. In one example, network owners registered with the web server 1018 have the ability to add information and/or attributes within a network profile regarding their own network. For example, the user may indicate that, although the network is open, it is not to be shared (e.g., storing a shared indicator that indicates that the wireless network is "not shared" within the network profile). Alternately, the user may designate their network as "shared." Further, the user may indicate what services may be used over the network (e.g., by the performance of the network is suitable for VOIP or online conference calling but not online video conferencing). The user may also provide information regarding the location of their network device and other network devices in the area.

In another example, a user of a digital device 1002 registered with the web server 1018 may add attributes regarding wireless networks they have experience with. For example, a user of a digital device 1002 may log onto the web server 1018 to store a shared indicator that indicates a local coffee-shop network is "shared." In some embodiments, the user of the digital device 1002 may be authorized to store an attribute to all network profiles of all coffee shops of the same chain to indicate that their networks are "shared." In other embodiments, an administrator of the coffee-shops or an administrator of the network database may store a shared indicator indicating that all of the wireless networks offered by coffee-shops of the chain are "shared."

In step 1502, the web server 1018 logs in a user. The user may log in or register with the web server 1018 over a network such as the Internet. In one example, the user browses to a web page to enter a username or password. In some embodiments, the connection between the user and the web server 1018 are encrypted before or after the user logs in.

In various embodiments, any user with a digital device 1002 capable of wireless access may have the option to register with the web server 1018. In some embodiments, the user is authenticated to confirm authorization. Owners of networks may have the option to change the attributes of their own network but not the attributes of any other networks. Administrators, on the other hand, may have the authorization to change attributes associated with a plurality of networks.

In step 1504, the web server 1018 receives a network device identifier and an attribute from the user or administrator. In some embodiments, the network device identifier is associated with a single wireless network. In one example, the network device identifier is a BSID identifier of a network device. In other embodiments, the network device identifier is associated with a plurality of wireless networks. For example, the network device identifier may be an SSID identifier such as "Starbucks." The SSID identifier may be shared by many network devices. In this example, every wireless network at a Starbucks coffee shop may have the same SSID identifier.

In step 1506, the web server 1018 determines if a network profile associated with the network identifier is within a network database. In some embodiments, the network database is local to the web server 1018. In other embodiments, the network database server 1012 comprises the network database. In one example, the web server 1018 provides a request for one or more network profiles that are associated with the network device identifier to the network database server 1012. In another example, the web server 1018 may query the network database directly or provide a request to the network database server 1012 to determine if the network profile exists.

If the network profile exists, then the web server 1018 or the network database server 1012 determines if the user has authorization to the changes to the network profile in step 1508. In some embodiments, the network profile comprises or is associated with security settings that indicate if the user or administrator has rights to access, view, or modify the network profile. In one example, the web server 1018 confirms the authorization of the user with the security settings. Assuming the user is authorized, the network profile is retrieved in step 1510. If the user is not authorized, the web server 1018 may provide a message indicating that the user is unauthorized to perform the requested action.

In step 1512, the web server 1018 determines if the attribute already exists in the network profile. In other words, the web server 1018 determines the type of attribute (e.g., a shared indicator, service identifier, or QOS metric) received from the user and determines if that type of attribute is already present. If the type of attribute is already present then the web server 1018 may update the attribute within the network profile in step 1514. As discussed previously, if the attribute is quantitative, the web server 1018 may average or perform a weighted algorithm on the different attributes. The result may then be stored within the network profile. In some embodiments, many attributes from the same network device indicator may be averaged or otherwise transformed by one or more algorithms and the results stored within the respective network profile.

If the attribute is not quantitative, then the existing attribute may be replaced by the new value. For example, the owner of a network may have previously indicated that the network is "shared." The owner may log into the web server 1018, and request that the network profile for their network be updated to indicate that the network is no longer shared (e.g., replace the shared indicator indicating "shared" with a shared indicator indicating "not shared"). In another example, an administrator may be aware of a chain restaurant that offers free wireless access. The administrator may log onto the web server 1018 and request that all of the network profiles for the chain restaurant be updated to indicate that the networks are "shared."

If the network profile does not exist in the network database, than the web server 1018 or network database server 1012 creates a new network profile in step 1516. In some embodiments, the web server 1018 checks to determine if the user is authorized to create a new network profile. The attribute associated with the network device identifier is then stored within the network profile in step 1518. Similarly, if an existing network profile retrieved did not have the same type of attribute as the one received form the user, the attribute is stored in the retrieved network profile.

It will be appreciated by those skilled in the art, that although FIG. 15 is discussed with respect to the web server 1018 and the network database server 1012, the functions described herein may be performed by any server. For example, the functions described in FIG. 15 may be performed by a single server. Alternately, different servers than those described in FIG. 15 may perform the different described functions.

In various embodiments, the web server 1018 may store personalized settings. In one example, a digital device user creates a user account on web server 1018 and stores the personalized settings. The personalized settings, as described herein, may be used by the rules server 1010 in selecting wireless networks for the user's digital device 1002. For example, when the user's digital device 1002 provides a list of available wireless networks to the rules server 1010 as well as a user identifier. The rules server 1010 may check with the web server 1018 if there are any personalized settings associated with the user identifier. If personalized settings exist, then the rules server 1010 may apply one, some, or all of the personalized settings to eliminate undesirable wireless networks and/or assist in the wireless network selection process.

Figure 16:
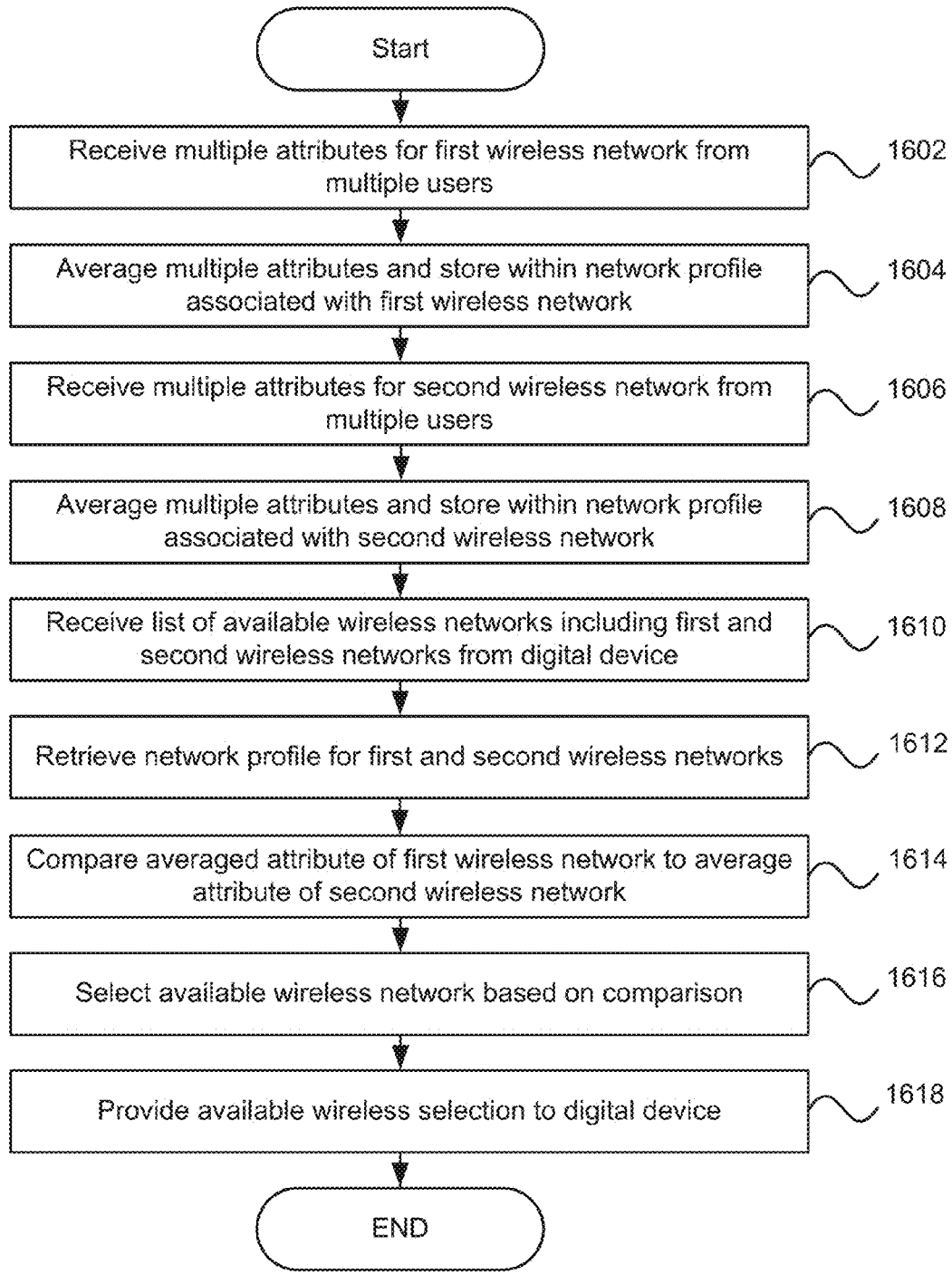
FIG. 16 is a flow diagram of an exemplary process of using a network database in selecting a wireless network.

FIG. 16 is a flow diagram of an exemplary process of using a network database in selecting a wireless network. By collecting the attributes into a network database from different users (as discussed in FIGS. 14 and 15), the rules server 1010 may provide accurate wireless network selections with an increased likelihood of meeting a desired level of performance.

In step 1602, the profile server may receive multiple attributes for a first wireless network from multiple users. In one example, many users access the same wireless network (e.g., a wireless network at a busy airport). Each digital device may provide attributes to a server such as the profile server 1014. The attributes may be collected over a long period of time or nearly simultaneously.

In step 1604, the server, such as the profile server 1014 averages the multiple attributes and stores the average within a network profile associated with the first wireless network. In some embodiments, the server retrieves a network profile associated with the first wireless network. The server may then perform an algorithm, including a function that averages attributes of a similar type (e.g., latency metric or bandwidth metric). The result may be stored in the network profile of the first wireless network.

In step 1606, the server receives multiple attributes for a second wireless network from multiple users. The second wireless network may be located in the same area as the first wireless network. In step 1608, the server may average the multiple attributes and store the average within a network profile associated with the second wireless network. Similar to step 1604, in some embodiments, the server retrieves a network profile associated with the second wireless network. The server may then perform an algorithm, including a function that averages attributes of a similar type and store the result in the network profile of the second wireless network.

In step 1610, the server receives a list of available wireless networks including the first and second wireless networks from a digital device 1002. In one example, the digital device 1002 scans for available wireless networks and receives network device identifiers for the first and second wireless networks. The list of available wireless networks comprising the two network device identifiers may be provided to a server such as the rules server 1010.

In step 1612, the server retrieves a network profile for the first and second wireless networks. For example, the server may retrieve the first and second network profiles based on the two network device indicators within the list of available wireless networks. The first and second network profiles comprise the results of the multiple attributes received from steps 1602 and 1604. The first and second network profiles may be retrieved from a network database comprising a plurality of network profiles.

In step 1614, the server compares the averaged attribute of the first wireless network to the average attribute of the second wireless network. In taking many attributes of a similar type from many users, the results of the averaging function or algorithm tend to be more accurate and, therefore, may be representative of an expected level of performance of the wireless networks. Similarly as the expectations of performance are more accurate, the comparison of these attributes in the aggregate may also product more accurate results.

In step 1616, the server selects an available wireless network based on the comparison. For example, by comparing the averaged attributes of the first wireless network to the average attributes of the second wireless network, the selection of wireless network with the best performance can be made with a higher confidence. As a result, as more users add more attributes to network profiles within the network database, current and increasingly accurate information may be used to help users find and utilize the high quality wireless networks. In step 1618, the server may provide the network wireless selection to the digital device.

In various embodiments, the attributes of the different wireless networks may also indicate the usage and/or quality of the wireless networks. The attributes may also indicate the services used. This information may then be analyzed and/or offered to various businesses and services. In one example, a potential business may wish to know the current usage of wireless networks in hotels, airports, and restaurants. Another business may wish to know which services are most popular in certain locations or are most popular with networks associated with a certain kind of business (e.g., convention centers). Similarly, businesses may be interested in eliminating unpopular services or wireless networks that fall below a usage threshold.

Although many networks are accessible (e.g., not secured), the owner of the network may wish the network to be restricted or may wish for users to agree to terms and conditions prior to use. In various embodiments, a mobile device, such as a smartphone or laptop, may retrieve information from a server regarding an indication of a likelihood that a network device is intentionally shared and if terms and conditions are required. The mobile device may receive terms and conditions information which may be used to provide a user the option to accept or decline terms and conditions.

In some embodiments, the mobile device may retrieve information regarding the likelihood that the network device is intentionally shared. A network device and/or services provided by a network device may be intentionally shared when an owner of the network device, operator of the network device, or business associated with the network device intentionally or purposefully shares the network device and/or services provided by the network device with the public, patrons, community, or group. A network device, for example, may be accessible because the owner did not correctly configure security settings, however, the insecure network device may not have been intentionally shared with others. In another example, a network device may be purposefully insecure so that network services will be available to members of a family, friends or employees but the owner may desire that the network device and/or network services not be shared with anyone else.

A likelihood that the network device is intentionally shared is an indication that the network device or at least some of the network services offered by the network device may be intentionally shared. If a network device is part of a coffee shop or a local wireless hotspot, there is a strong likelihood that the owner or operator intends to share the network device or network services. If a network device is in a residential neighborhood or if the network device includes one or more identifiers that are part of a default configuration, then the likelihood that the owner or operator intends to share the network device or network services is low. If the owner or operator of the network device has configured an identifier associated with the network device to indicate that the network device is not to be shared or has otherwise expressly stated that the network device is not to be shared, the network device may be blacklisted. In various embodiments, a blacklist of intentionally unshared network devices and/or network services as well as a whitelist of intentionally shared network devices and/or services may have a value (e.g., 0 or 1) associated with a likelihood that the network device is intentionally shared.

In various embodiments, a network device may be associated with an indicator that indicates that the network device is intentionally shared if the owner or operator of the network device likely intentionally allows the public or patrons to access the Internet. The network device may be associated with the indicator that indicates that the network device is intentionally shared as long as some network services are to be shared even if there are one or more other network services that are not to be shared (e.g., Internet access is intentionally shared but access to business servers is not intentionally shared).

Based on the retrieved information and previously stored access settings, the mobile device may determine to use or not use a network device. In one example, the mobile device may comprise one or more access settings that indicate that the only network devices that may be accessed are those network devices that have been intentionally shared or are very likely intentionally shared. If the likelihood that the network device is shared is unknown or it is determined that the network device is likely not to be intentionally shared, then, based on the previously stored access settings, the mobile device may determine that the network device is not to be used.

The mobile device may also determine if terms and conditions are required based on a terms and conditions indicator provided by a server on a network. If terms and conditions are required, the server may provide the mobile device a link to terms and conditions and require that the user accept or decline the terms and conditions before enabling further access. In one example, the mobile device may send a terms and conditions indication request to the server. The server may provide an indication that terms and conditions are required to be accepted before providing any further access to network services provide by a network device. The server may provide a link to terms and conditions that must be accepted. The mobile device may provide the terms and conditions in as a text message, email, or web page and subsequently log off of the network device until the user accepts the terms and conditions. If the user accepts the terms and conditions, the mobile device may access or log onto the network device. If the user chooses not to accept the terms and conditions, the smart device may not log back on to the network device and the network device may be associated with a blacklist.

In various embodiments, the owner or operator of a network device may desire users to receive a message such as an advertisement, special, or any other information associated with a business or the like. The mobile device may be configured to request message information from a server and receive message information. The message information may, for example, comprise a link and text. A notification message, based on the message information received from the server, may be presented to the user as a notification message, text message, SMS message, or the like indicating the text. The notification message may be formatted for the user's mobile device (e.g., Samsung Galaxy S smart phone). The user may interact with the text and/or otherwise activate the link to access a document or web page presenting the user with the advertisement, special offer, or any other kind of information.

Figure 17:
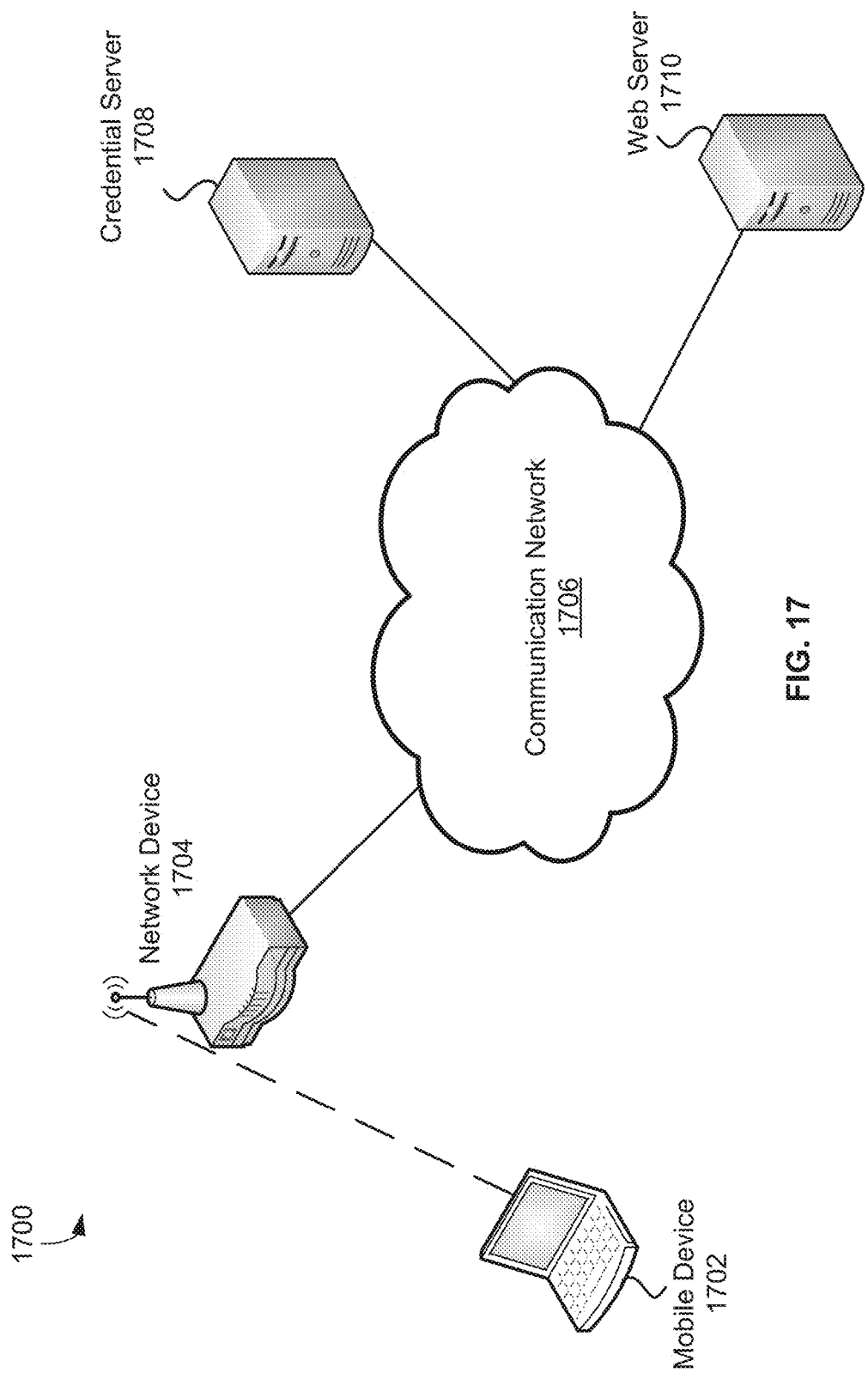
FIG. 17 depicts an exemplary environment in which some embodiments may be practiced.

FIG. 17 depicts an exemplary environment 1700 in which some embodiments may be practiced. The exemplary environment 1700 comprises a mobile device 1702 in communication with a network device 1704. The network device 1704 may be in communication with a credential server 1708 and a web server 1710 over communication network 1706. The mobile device 1702, network device 1704, credential server 1708, and/or web server 1710 may be digital devices.

The mobile device 1702 may be any digital device that is portable. For example, the mobile device 1702 may include, but is not limited to, a smart phone, cellular device, media device (e.g., iPod), tablet, notebook computer, PDA, or the like. As discussed herein, the mobile device 1702 may obtain network access via the network device 1704 by providing the network device 1704 credentials received from the credential server 1708. For example, the mobile device 1702 may identify the network device 1704, request credentials from the credential server 1708 over an open port of the network device 1704 (e.g., by formatting the request using the DNS protocol), and receive a credential request response including credentials from the credential server 1708 over the open port of the network device 1704.

The credential request response may include an indicator which indicates the likelihood that the services provided by the network device 1704 are intentionally shared. Further, the credential request response may include a terms and conditions indicator as well as a message indicator. The terms and conditions indicator which may indicate that terms and conditions are required to access network services over the network device 1704. The message indicator which may indicate that a message or notification is to be provided to the user of the mobile device 1702.

In various embodiments, the likelihood that the network device 1704 was likely or intentionally shared with the user and/or the mobile device 1702 may determine whether the mobile device 1702 may utilize the network device 1704 for network access. For example, if the network device 1704 was unintentionally allowed to be shared (e.g., the operator or administrator of the network device 1704 unintentionally failed to enable security services on the network device 1704), it may be undesirable for one or more mobile devices to access the network over the network device 1704.

In some embodiments, one or more lists of available network devices 1704 may be generated. The list may be used to identify any number of network devices 1704 that a mobile device or any digital device may obtain access. In various embodiments, one or more of the identified network devices 1704 on the list may be associated with a curation indicator indicating the likelihood that the associated network device 1704 is to be shared.

In one example, the mobile device 1702 may request a curation indicator from the credential server 1708 or other server. The curation indicator may indicate the likelihood that the network device 1704 is to be shared with the mobile device 1702 (e.g., publicly shared) or any other mobile device. The mobile device 1702 may determine whether to use the network device 1704 to access a network based on the curation indicator.

For example, if the network device 1704 is part of a local establishment or business, it is likely that the network device 1704 may be shared with the business' patrons. However, if the network device 1704 is a home router, even if the network device 1704 does not have any security services enabled, the network device 1704 may be deemed to not intentionally be publicly shared. As such, the mobile device 1702 may determine not to utilize the network device 1704 based on the curation indicator associated with the network device 1704.

The curation indicator may be analogized as being a "shade of gray" from white to black. One curation indicator value may be associated with "white" which may indicate that the related network device 1704 is on a whitelist (e.g., intentionally shared). Another curation indicator value may be associated with "black," which may indicate that the related network device 1704 is on a blacklist (e.g., intentionally not shared). Other curation indicator values may include varying shades of gray, such as "unknown," "likely not intentionally shared," or "likely intentionally shared." Other curation indicator values may include, for example, "intentionally shared but only upon acceptance of terms and conditions."

In various embodiments, the mobile device 1702 may determine that the network device 1704 or an operator associated with the network device 1704 requires terms and conditions to be agreed to before utilizing network services of the network device 1704. In some embodiments, the mobile device 1702 may request terms and conditions from a server such as the credential server 1708. The credential server 1708 may receive the terms and conditions request and determine if terms and conditions are associated with the network device 1704. If terms and conditions are required, the credential server 1708 may provide the mobile device 1702 terms and conditions information.

The mobile device 1702 may provide the user with a notification of the terms and conditions and, further, may require that the user accept or decline the terms and conditions. If the user accepts the terms and conditions, the mobile device 1702 may enable or otherwise allow access to the network device 1704 (e.g., by logging into the network device 1704). If the user denies the terms and conditions, the mobile device 1703 may disable or not log onto the network device 1704. Further, the mobile device 1702 may add the network device 1704 to a blacklist or otherwise indicate that the user does not wish to access the network device 1704. There are many ways in which the mobile device 1702 may receive the terms and conditions associated with the network device 1704, provide the terms and conditions to the user, and determine to access network services of the network device 1704 based on the user's response to the terms and conditions.

In some embodiments, the mobile device 1702 may determine if a message is to be displayed. In one example, the mobile device 1702 may request a message server or credential server 1708 if a message associated with the network device 1704 is to be displayed by the mobile device 1702. The server may receive the message request and provide message information. The mobile device 1702 may notify the user based on the message information. The notification to the user may include a text message, SMS message, pop-up, notification message or the like. In one example, the mobile device 1702 comprises an Android operating system and the notification message may appear in the notification status bar. The user may activate the notification message and see text or graphic with an embedded link. The text or graphic may indicate an offer, advertisement, or any other information. The user may, in some embodiments, activate the embedded ink (e.g., by clicking on or touching the text) to access a web page, graphic, image, or other media that displays information or otherwise informs the user.

The communication network 1706 may be any network including a LAN, WAN, or combination of networks. The communication network 1706 may comprise wired, wireless, and/or cellular connections. The communication network 1706 may be similar to the communication network 114.

The credential server 1708 may be any server configured to provide network credentials to the mobile device 1702. The credential server 1708 may perform similar actions as the credential server 106 as discussed regarding FIG. 1 and/or credential server 1016 as discussed regarding FIG. 10.

In some embodiments, when the credential server 1708 receives a credential request response, the credential server 1708 may identify a network record associated with the network device 1704. The network record may indicate or allow the credential server 1708 to retrieve a curation indicator, a terms and conditions indicator, and/or message indicator. The curation indicator may indicate the likelihood that the network device 1704 and/or the network services provided by the network device 1704 are intentionally shared. The terms and conditions indicator may indicate that acceptance of terms and conditions associated with the network device 1704 and/or the network services provided by the network device 1704 are required. The message indicator may indicate that a message may be provided to the mobile device 1702. The credential server 1708 may include the curation indicator, the terms and conditions indicator, and/or the message indicator within the credential request response that is provided to the mobile device 1702. In some embodiments, the credential server 1708 may provide the curation indicator, terms and conditions indicator, and/or message indicator as part of the credential request response, as part of a separate response, or as individual messages to the mobile device 1702.

Once the mobile device 1702 receives the terms and conditions indicator and/or the message indicator, the mobile device 1702 may request the terms and conditions and/or the message information from the credential server 1708 or any server(s). The terms and conditions and/or the post login information may be provided to the mobile device as a part of a notification, text message, SMS, pop-up, or any other kind of notification.

Although only the credential server 1708 is depicted in FIG. 1, those skilled in the art will appreciate that there may be any number of servers. For example, the mobile device 1702 may request terms and conditions information from a T&C server and/or post login information from a message server.

The web server 1710 may be a digital device configured to provide one or more web pages to the mobile device 1702. The web pages may be associated with the network device 1704. In one example, the network device 1704 is a wireless router at a coffee shop. The web server 1710 may provide web pages associated with the coffee shop (e.g., a homepage of the coffee shop) including, for example, terms and conditions or messages.

Although only one mobile device 1702, network device 1704, credential server 1708, and web server 1710 are depicted in FIG. 17, those skilled in the art will appreciate that there may be any number of mobile devices 1702, network devices 1704, credential servers 1708, and web servers 1710. For example, any number of mobile devices 1702 may communicate with and/or over network device 1704. Similarly, for example, any number of credential server 1708 may provide credentials and other information to the mobile devices 1702.

Figure 18:
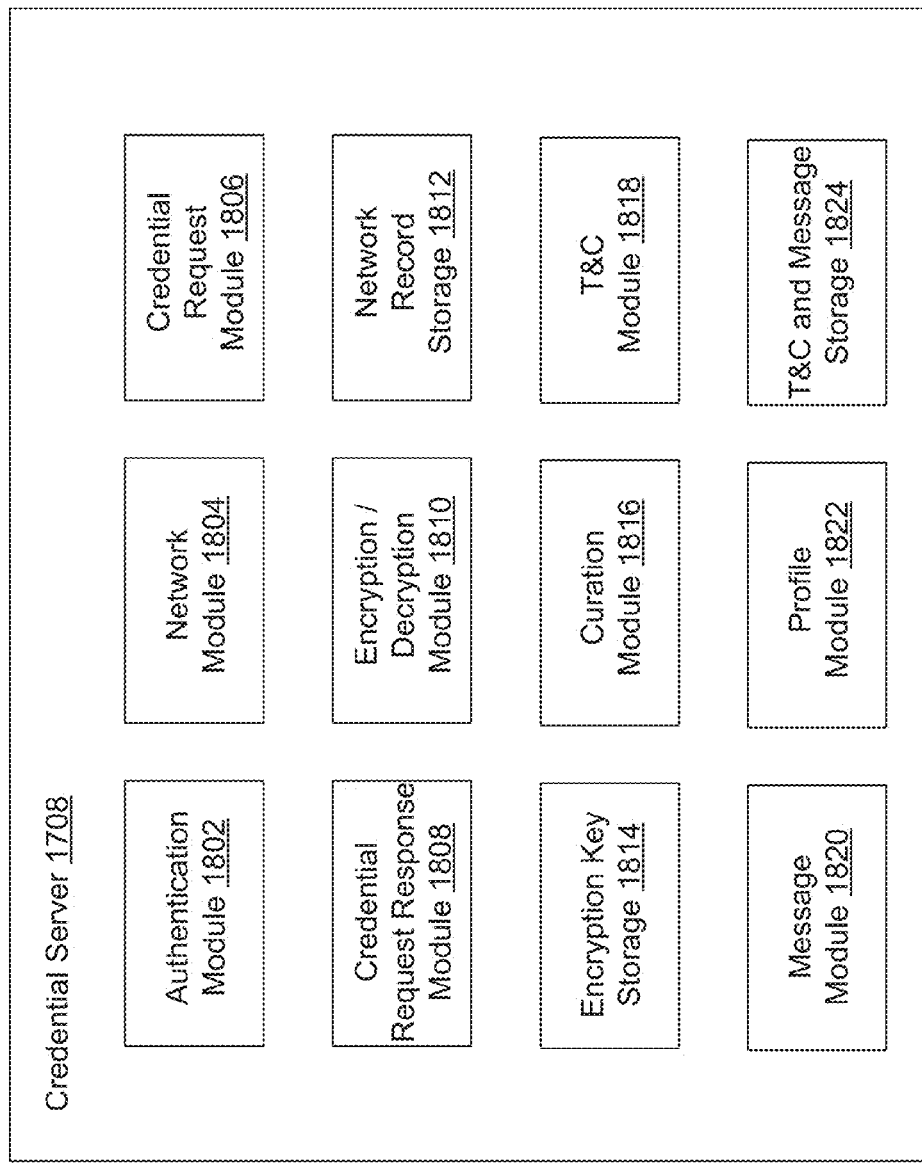
FIG. 18 is a block diagram of an exemplary credential server in some embodiments.

FIG. 18 is a block diagram of an exemplary credential server 1708. The credential server 1708 comprises an authentication module 1802, a network module 1804, a credential request module 1806, a credential request response module 1808, an encryption/decryption module 1810, a network record storage 1812, an encryption key storage 1814, a curation module 1816, a T&C module 1818, a message module 1820, a profile module 1822, and a T&C and message storage 1824.

The authentication module 1802 may be similar to the authentication module 200. The authentication module 1802 may be configured to authenticate the credential request and provide security to the credential request response. In various embodiments, the digital device 102 may encrypt or digitally sign the credential request using an encryption key (e.g., a shared encryption key or an encryption key that is a part of a key pair). The authentication module 1802 may authenticate the credential request by decrypting the credential request with the proper encryption key retrieved from the encryption key storage 1814. In one example, the mobile device 1702 generates a hash of the credential request and stores the hash within an encrypted portion of the credential request. The authentication module 1802 may decrypt the credential request, generate hash of the credential request response, and compare the generated hash to the hash contained within the credential request for authentication.

In other embodiments, the digital device 1702 may generate a nonce (i.e., a random value) and store the nonce within a portion of the credential request that is digitally signed. The authentication module 1802 may decrypt the digital signature to authenticate the credential request and retrieve the nonce. In various embodiments, when the credential request response module 1808 generates the credential request response (described herein), the authentication module 1802 may include the nonce within the credential request response. The authentication module 1802 or the encryption/decryption module 1810 may then encrypt the credential request response. When the mobile device 1702 decrypts the credential request response, the mobile device 1702 may retrieve the nonce from the credential request response and compare the nonce to the nonce that was transmitted within the credential request for further authentication.

The network module 1804 may be configured to receive the credential request and transmit the credential request response over the communication network 1706.

The credential request module 1806 may receive the credential request from the network module 1804. The credential request may be a standard protocol. In one example, the credential request is a UDP protocol (e.g., DNS).

In exemplary embodiments, the credential request module 1806 may retrieve the DDID and the SSID from the credential request. The DDID may identify the mobile device 1702, the user of the mobile device 1702, and/or the user associated with a network record. The SSID may identify the hotspot or the service provider (i.e., operator) of the hotspot.

The credential request module 1806 or the credential request response module 1808 may identify a network record based on the DDID and the SSID. A network record is a record associated (either directly or indirectly (e.g., a relational database)) with the DDID and the SSID. In one example, a network record contains network credentials necessary to provide network access to a mobile device 1702 associated with the DDID at the hotspot associated with the SSID. Network records may be stored within the network record storage 1812.

The credential request response module 1808 may generate the credential request response. In various embodiments, the credential request response module 1808 receives the network credential associated with the DDID and SSID from the network record. In some embodiments, the network credential may comprise a credit card number. In one example, the mobile device 1702 receives the network credential, retrieves the credit card number, and provides the credit card number to the authentication server. In some examples, the authentication server may then charge a fee to a credit card associated with the credit card number or use the information to confirm the identity of the user prior to granting network access.

Further, in various embodiments, the network credentials may comprise login procedural information. In one example, the credentials include a username and password which are to be provided within a form (e.g., an authentication form) retrieved from the authentication server by the mobile device 1702. In some embodiments, the login procedural information may instruct the mobile device 1702 to populate specific fields within the form with the network credentials before submitting the completed form to the authentication server. Those skilled in the art will appreciate that there are many ways to provide credentials to the authentication server. The process of providing the credentials to the authentication server is further discussed in U.S. patent application Ser. No. 11/899,638, entitled "System and Method for Obtaining Network Credentials," filed Sep. 6, 2007.

The credential request response module 1808 or the encryption/decryption module 1810 may encrypt the credential request response with an encryption key associated with the DDID or the credential request. In one example, the credential server 1708 stores one or more shared encryption keys. Each shared encryption key may be shared by at least one mobile device 1702. The credential request response module 1808 may encrypt the credential request response with the shared encryption key associated with the mobile device 1702 (e.g., the shared encryption key may be associated with the DDID). The credential request response module 1808 or the encryption/decryption module 1810 may also encrypt the credential request with an encryption key that is part of a key pair. There may be many ways in which the encryption/decryption module 1810 encrypts the credential request.

The encryption/decryption module 1810 may decrypt the credential request and encrypt the credential request response. As previously discussed, the encryption/decryption module 1810 may decrypt the digital signature of the credential request. In one example, the encryption/decryption module 1810 decrypts the digital signature based on an encryption key that is associated with the DDID contained within the credential request. The encryption/decryption module 1810 may also encrypt the credential request response. In one example, the encryption/decryption module 1810 encrypts the credential request response based on an encryption key associated with the DDID (e.g., a shared encryption key or an encryption key that is part of a key pair).

In various embodiments, the encryption/decryption module 1810 may encrypt the network records contained within the network record storage 1812 and manage the encryption key storage 1814. The encryption/decryption module 1810 may also establish secure communications (e.g., via SSL and HTTPS) with a digital device when storing network credentials. This process is further described in FIG. 7. In accordance with some embodiments, the encryption/decryption module 1810 may be optional.

The network record storage 1812 and the encryption key storage 1814 may store network records and encryption keys, respectively. The network record storage 1812 and the encryption key storage 1814 may comprise one or more databases. In one example, the network record storage 1812 may store network records. A network record may comprise a DDID, SSID, and network credentials. The network record may also comprise a username and password for the user to access, alter, update, or store network records within the credential server 1708.

In various embodiments, the network record may also allow multiple mobile devices 1702 to use the same network credentials. In one example, the user may own multiple mobile devices 1702. Multiple DDIDs, each DDID associated with a different mobile devices 1702, may be included in the same network record. In some embodiments, multiple devices may be associated with one or more network records, and the one or more network records are associated with a user. As a result, the user may retrieve the network credentials for a hotspot using any number of mobile devices 1702. Those skilled in the art will appreciate that there are many ways in which the network records and/or the information contained therein may be stored and organized (e.g., different data structures, databases, records, organizing schemes, and/or methodologies).

The curation module 1816 is configured to retrieve, store, and update a plurality of curation indicators associated with a plurality of network devices. In some embodiments, the credential server 1708 may receive a network device identifier associated with a previously unknown network device. The curation module 1816 may assign a curation indicator indicating that the likelihood that the network device is intentionally shared is "unknown." As the credential server 1708 receives more requests for credentials and/or curation indicators associated with the network identifier, the curation module 1816 may update the curation indicator. For example, if a large number of different mobile devices seek access to network services over a network device during the day, the curation module 1816 may change the curation indicator from "unknown" to "likely" or "very likely" that the network device is intentionally shared.

Those skilled in the art will appreciate that the curation module 1816 may update a curation indicator based on any number of factors. For example, the curation module 1816 may determine the location of a network device through location information received by various mobile devices and/or proximity of other known network devices. If a particular network device is in a residential community, the curation module 1816 may update the associated curation indicator to indicate that the network device is likely unintentionally shared. If a particular network device is located in a business district, then the curation module 1816 may update the associated curation indicator to indicate that the network device is likely intentionally shared.

The curation module 1816 may also set the curation indicator based on SSID of the network device, BSSID of the network device, or any other information. If the network device is associated with a known SSID or BSSID of a business that likely intentionally shares network access, the curation module 1816 may set the associated curation indicators accordingly. Further, if the network device includes default identifiers (e.g., a network identifier that is identified as "linksys"), the curation module 1816 may identify the associated network device as being unlikely intentionally shared.

Those skilled in the art will appreciate that the curation module 1816 may perform heuristics or statistical modeling to set curation indicators. Curation indicators may be set or updated based on the number of mobile devices that access a network device, time of day of majority of access, location of network device, zoning of neighborhood of device, or any other information.

In various embodiments, an owner of the network device, operator of the network device, or business associated with the network device may request a particular curation indicator be set. In some embodiments, an administrator may set the curation indicator (e.g., whitelist, blacklist, or "intentionally shared but with terms and conditions required") based on a request or input from others. In some embodiments, the credential server 1708 may allow the owner of the network device, operator of the network device, or business associate to log onto the credential server 1708 and manage credentials, terms and conditions, messages, and/or one or more curation indicator(s).

The curation module 1816 is also configured to retrieve the curation indicator based on a network identifier. In some embodiments, the credential server 1708 receives a credential request with a network device identifier. The curation module 1816 may retrieve a curation indicator based on the network device identifier (e.g., on a BSSID, SSID, or any other information associated with the network device) received form the credential request. The curation module 1816 may retrieve the curation indicator from a plurality of previously stored curation indicators.

The curation indicator may be analogized to "shading" of networks and/or network devices. In one example, the "shading" of a network is includes classifying the networks by permission(s) granted or inferred by a network owner, network device owner, or network device operator.

Between whitelist and blacklist, a network "shade" may be used to manage the grey areas between.

The following exemplary table shows some of the shades in some embodiments:

| | |
|---|---|
| Black | Blacklisted networks which have been explicitly asked not to use |
| Dark grey | Most likely networks which are unintentionally shared |
| Grey | Unknown |
| Light grey | Most likely networks which are ok to share |
| Whitewashed | Networks which required acceptance of terms and conditions |
| White | Networks for which we have explicit approval from the network owner |

In various embodiments, the curation module 1816 may receive a curation indicator request which requests a curation indicator associated with a network and/or network device. The curation module 1816 may retrieve a curation indicator associated with a network device identifier, or any other identifier, and provide the curation indicator within a curation indicator request response back to the requestor.

In some embodiments, the curation module 1816 may retrieve the curation indicator and then compare the indicator to an access setting associated with the requestor. For example, the curation module 1816 may identify a user or a requesting digital device (e.g., via a digital device indicator within the curation indicator request such as an IP address, MAC address, UUID, or any other identifier) and retrieve an associated access setting related to the user or requesting digital device. The access setting may indicate what "shade" is acceptable to the user. In one example, an access setting associated with a requesting digital device may determine that light grey (e.g., most likely networks which are OK to share) or lighter are acceptable. Another access setting may require that the user will only approve "whitewashed" or white curation indicators. If the access setting indicates that the user will accept network access based on the curation indicator, the credential server 1708 may send a curation indicator request response indicating that access of the network is approved. The curation indicator request response may also include credentials to access the network, a terms and condition indicator, a message indicator, and/or any other information.

In other embodiments, the requesting digital device (e.g., mobile device 1702) may include the access setting and perform the comparison. In some embodiments, the curation module 1816 may provide the curation indicator within the curation indicator request response back to the requesting digital device.

Those skilled in the art will appreciate that, in some embodiments, the curation module 1816 may provide the curation indicator within the credential request response along with credentials associated with a network device. This process is further described regarding FIG. 21.

The T&C module 1818 may receive a terms and conditions indicator request from a requesting digital device. The terms and conditions indicator request may include or be associated with a network and/or network device. The T&C module 1818 may retrieve a terms and conditions indicator associated with a network device identifier, or any other identifier, and provide the terms and conditions indicator within a terms and conditions indicator request response back to the requestor.

In some embodiments, the terms and conditions indicator indicates whether terms and conditions are required or requested. In one example, the terms and conditions indicator is a flag which triggers the mobile device to request terms and conditions information. Terms and conditions information may include notification information and terms and conditions reference information. The notification information may be text, an image, graphic, or any other information that may be displayed to the user of the requesting digital device to indicate that terms and conditions are required or requested. The terms and conditions reference information may comprise a link (e.g., web URL) or any other reference that may provide a user of the requesting digital device access to the terms and conditions.

For example, the T&C module 1818 may return the terms and conditions information within a terms and conditions request response to the requesting digital device. Subsequently, the requesting digital device may display all or some of the terms and conditions notification information. In one example, the requesting digital device may display the message "This network requires acceptance of terms and conditions. You may access the terms and conditions at _____. You must accept or decline these terms and conditions before network access is granted." The underline portion may include a link, image, or any other actionable item that allows users to view the terms and conditions. Those skilled in the art will appreciate that any message related to the terms and conditions and requesting acceptance may be displayed to the user. The requesting digital device may also display a link to the terms and conditions. The link may be associated with or include the terms and conditions reference information. The link may trigger a web page or any other application to display the terms and conditions. In one example, the link directs the browser to a web page with terms and conditions associated with the network device (e.g., terms and conditions as hosted by a coffee shop). In some embodiments, the link may direct the browser to a web page of standard terms and conditions hosted by the credential server 1708 or any other kind of server.

If the user accepts the terms and conditions, the requesting digital device may provide a T&C acceptance indication that the requesting digital device accepted the terms and conditions. The T&C acceptance indication may be digitally signed by the digital device to confirm the device accepted the terms and conditions. In some embodiments, the T&C module 1818 may log or otherwise track acceptance of terms and conditions. The T&C module 1818 may enable reports to be generated that may indicate which digital devices approved the terms and conditions, the time of approval, a version of the terms and conditions that was approved, and the network or network device associated with the terms and conditions.

In various embodiments, the terms and conditions information may be stored within the T&C and message storage 1824, another server, network storage, or any other storage.

Those skilled in the art will appreciate that, in some embodiments, the T&C module 1818 may provide the terms and conditions indicator within the credential request response along with credentials associated with a network device. This process is further described regarding FIG. 21.

The message module 1820 may be configured to retrieve and provide a message indicator which indicates a message is to be provided to a requesting digital device. In some embodiments, the message module 1820 may receive a message indicator request from a requesting digital device. The message indicator request may include or be associated with a network and/or network device. The message module 1820 may retrieve a message indicator associated with a network device identifier, or any other identifier, and provide a message indicator within a message indicator request response back to the requestor. The message indicator may be a flag that indicates if a message associated with the network or network device is available to the requesting digital device.

If the message indicator indicates that a message is available to the digital device, the digital device may provide a message request. The message module 1820 may retrieve message information based on a network identifier or any other identifying information within the request. The message information may include a message notification information and message reference information. The message notification information may be text, an image, graphic, or any other information that may be displayed to the user of the requesting digital device to indicate there is a message associated with the network, network device, operator of the network device, or business associated with the network device. The message reference information may comprise a link (e.g., web URL) or any other reference that may provide a user of the requesting digital device access to the message.

In one example, the requesting digital device may comprise a notification status area which provides notifications to the user. Such a notification status area may, for example, be found in Android OS smart phones. In some embodiments, the digital device may provide all or some of the information from the message notification information to indicate that a message is available. The message notification may indicate that the message is a special offer, advertisement, welcome, or any other information. The message notification may include animations, graphics, blinking images, moving images, scrolling text, sounds, video, or any other kind of display. The user may activate the notification and access the message through the message reference information (e.g., an embedded link to a web page associated with the network device displaying an offer).

Those skilled in the art will appreciate that, in some embodiments, the message module 1820 may provide the message indicator within the credential request response along with credentials associated with a network device. This process is further described regarding FIG. 21.

The profile module 1822 may be configured to store access settings for one or more users. In some embodiments, the access setting may be configured by employers, administrators, or the like for any number of users. In some embodiments, individual users may store individual settings within the credential server 1708. Those skilled in the art will appreciate that the profile module 1822 may provide backup for access setting stored locally in digital devices.

The T&C and message storage 1824 may include any type or combination of types of data storage configured to store a plurality of terms and conditions, terms and conditions URLs, indicator associated with the terms and conditions, messages, message URLs, or indicator associated with one or more messages. The T&C and message storage 1824 may comprise any data structure or combination of data structures. Even though the credential server 1708 is depicted in FIG. 18 as including the T&C and message storage 1824, those skilled in the art will appreciate that the T&C and message storage 1824 may be located at another server or be a part of network storage.

Figure 19:
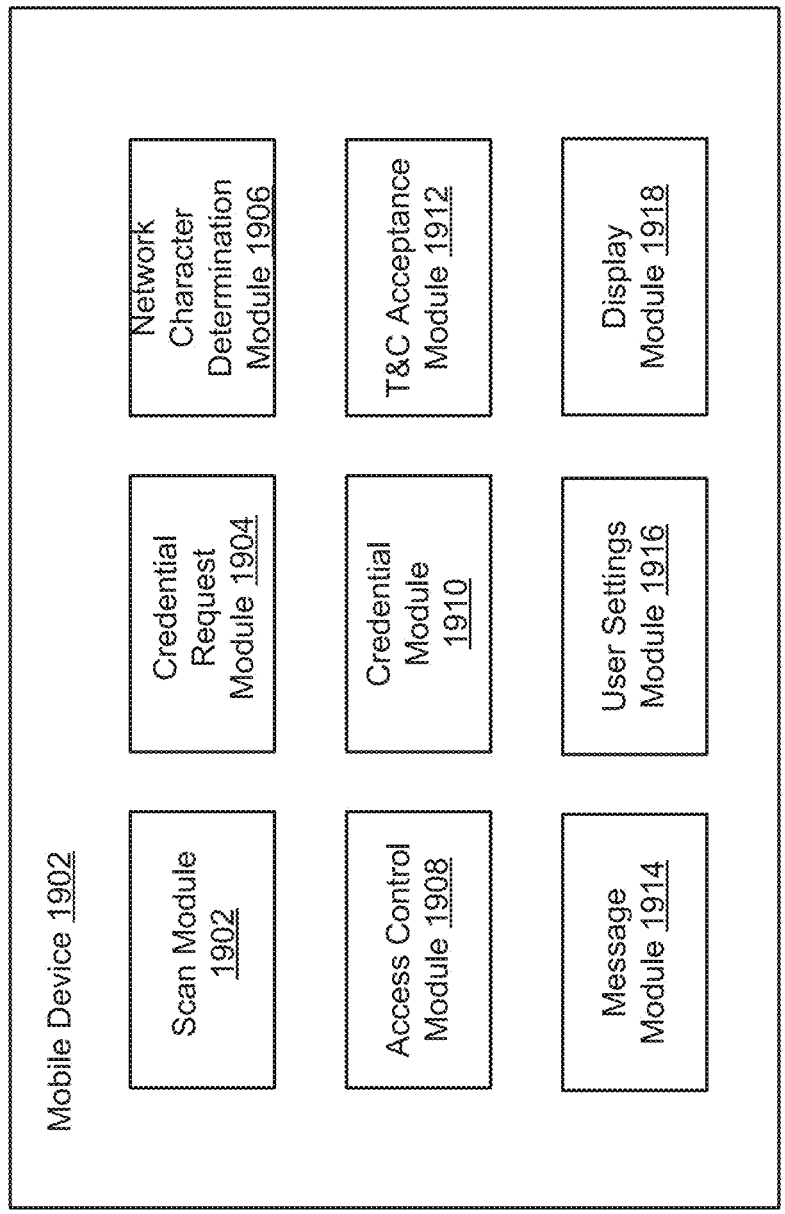
FIG. 19 is a block diagram of a mobile device in some embodiments.

FIG. 19 is a block diagram of a mobile device 1702 in some embodiments. The mobile device 1702 may comprise a scan module 1902, a credential request module 1904, a network character determination module 1906, an access control module 1908, a credential module 1910, a T&C acceptance module 1912, a message module 1914, a user setting module 1916, and a display module 1918.

The scan module 1902 is configured to scan an area for available networks. In one example, the scan module 1902 scans an area for wireless routers (e.g., hotspots) or any other network devices. The scan module 1920 may receive network identifiers that identify a network device.

The credential request module 1904 is configured to generate credential requests including one or more network identifiers associated with one or more network devices identified by the scan module 1902. In various embodiments, the credential request module 1904 generates a credential request to request credentials to log onto a network device. The credential request may include one or more network identifiers associated with the network device to be logged onto. The credential request may further include mobile device identifiers. The credential request is further described herein.

In some embodiments, the credential request module 1904 provides the credential request over an open port of the network device to be logged onto. In one example, the mobile device 1702 does not log onto the device or otherwise establish an active session with the network device. Those skilled in the art will appreciate that, for example, the mobile device 1702 may lack credentials to log onto the network device. The credential request module 1904 or any other module may provide the credential request over an open port (e.g., port 53) of the network device. The credential request may be formatted as a DNS protocol which may be delivered to a credential server.

The credential server may receive the credential request, identify the network device to be logged onto, and provide credentials associated with the network device back to the mobile device 1702 via the open port of the network device. The mobile device 1702 may receive the credential request response, retrieve the credentials, and provide the credentials to the network device to log onto the network device and/or establish a session to gain network services and full network access.

In some embodiments, the credential request response comprises a curation indicator which may indicate a likelihood that the network device and/or network services provided by the network device are intentionally shared. The network character determination module 1906 may be configured to retrieve the curation indicator from the credential request response. In some embodiments, the network character determination module 1906 compares the curation indicator to an access setting stored by or retrieved from the user settings module 1916. The access setting may indicate a level of acceptance related to the curation indicator. The access setting may be set by a user of the mobile device 1702 or an administrator.

If the network character determination module 1906 determines, based on the comparison of the curation indicator with the access setting, that the access is approved, the access control module 1908 and/or the credential request module 1904 may provide credentials from the credential request response to log into the network device. If the network character determination module 1906 determines, based on the comparison of the curation indicator with the access setting, that the access is not approved, the mobile device 1702 may not log onto the network device or log off the network device.

Those skilled in the art will appreciate that the network character determination module 1906 may request a curation indicator at any time. In some embodiments, the network character determination module 1906 may provide a curation indicator request to a curation server, credential server, or any kind of server. The curation indicator request may comprise an identifier of the mobile device 1702 as well as one or more network identifiers associated with network devices in the area of the mobile device 1702. The receiving server may retrieve one or more curation indicators based on the network identifier(s) and provide one or more of the curation indicators back to the mobile device 1702. In some embodiments, the network character determination module 1906 may compare the curation indicator(s) from the curation indicator request response to the access setting to either log off or blacklisting network devices that are not approved.

The mobile device 1702 may access and provide a curation indicator request over any network including, but not limited to, a cellular network, Wi-Fi network, or a network associated with one of the network devices identified in the curation indicator request. In one example, the mobile device 1702 may log onto an insecure network device, provide a curation indicator request to a curation or credential server, and receive a curation indicator request response. The curation indicator request response may include a curation indicator associated with the network device. The network character determination module 1906 may compare the curation indicator to the access setting. If the curation indicator is acceptable based on the comparison, the mobile device 1702 may continue access of the network device. If the curation indicator is unacceptable (e.g., falls below the minimum standard required) based on the comparison, the mobile device 1702 may log off the network device and/or add the network device to a blacklist. If the curation indicator of the network device is later changed, the mobile device 1702 may be notified (e.g., via a credential request response or other message from a server) and the network device may be removed from the blacklist.

The access control module 1908 may be configured to allow access to the network device based on the comparison of the curation indicator to the access setting and/or based on a response to terms and conditions required by the associated network device. The credential module 1910 may retrieve credentials provided by the credential request response, format a response, and provide the credentials to a network device to log onto the network device. The process of providing a credential request, retrieving credentials from a credential request response, and preparing the credentials to be provided to the network device is further described herein.

The T&C acceptance module 1912 may be configured to determine if terms and conditions are required by the network device, an operator of the network device, or a business associated with the network device. In some embodiments, the credential request response may comprise a terms and conditions indicator. The terms and conditions indicator may indicate if terms and conditions associated with the network device are available and/or are required. Based on the terms and conditions indicator, the T&C acceptance module 1912 may provide a terms and conditions information request to a T&C server and/or the credential server. The T&C acceptance module 1912 may subsequently receive a terms and conditions information request response comprising terms and conditions information. Terms and conditions information may include notification information and terms and conditions reference information. As discussed herein, the notification information may be text, an image, graphic, or any other information that may be displayed to the user of the requesting digital device to indicate that terms and conditions are required or requested. The terms and conditions reference information may comprise a link (e.g., web URL) or any other reference that may provide a user of the requesting digital device access to the terms and conditions.

The mobile device 1702 may display all or some of the terms and conditions notification information. Those skilled in the art will appreciate that any message related to the terms and conditions and requesting acceptance may be displayed to the user. The requesting mobile device 1702 may also display a link to the terms and conditions. The link may be associated with or include the terms and conditions reference information. The link may trigger a web page or any other application to display the terms and conditions.

If the user accepts the terms and conditions, the T&C acceptance module 1912 may provide a T&C acceptance indication the terms and conditions has been accepted. The T&C acceptance indication may be digitally signed by the T&C acceptance module 1912 to confirm the device accepted the terms and conditions.

In some embodiments, the mobile device 1702 may access a network device utilizing credentials provided by the credential server. The display module 1918 may retrieve the terms and conditions associated with the network device from a web page to present to the user. If the user does not accept the terms and conditions, the mobile device 1702 may log off the network device and/or place the network device in a local blacklist. In some embodiments, the mobile device 1702 may log off the network device after the display module 1918 displays the terms and conditions or the notification of the terms and conditions is provided to the user. If the user accepts the terms and conditions, the mobile device 1702 may log back onto the network device.

The T&C acceptance module 1912 may request a terms and conditions indicator at any time. For example, the mobile device 1702 may access and log onto a publicly available network device. Subsequently, the T&C acceptance module 1912 may provide a terms and conditions indicator request to determine if there are available or required terms and conditions associated with the publicly available network device. The T&C acceptance module 1912 may receive a terms and conditions indicator request response indicating that terms and conditions are available and/or required. The T&C acceptance module 1912 may then provide a terms and conditions information request regarding the terms and conditions associated with the network device. If the user does not accept the terms and conditions, the mobile device 1702 may log off of the publicly available network device.

The message module 1914 may be configured to receive a message indicator or provide a message indicator request. In one example, the credential request response may comprise a message indicator. The message indicator may indicate that a message associated with the network device, operator of the network device, or business associated with the network device is available.

Subsequently, the message module 1914 may provide a message information request to the credential server or message server. The message module 1914 may receive a message information request response including message information associated with the message.

The message module 1914 may generate a message indicator request at any time. In some embodiments, the scan module 1902 identifies one or more network devices proximate to the mobile device 1702. The mobile device 1702 may access one of the scanned network devices, a cellular network, or any network. The message module 1914 may provide the message indicator request to a message server or a credential server over the accessed network. The message indicator request may request one or more message indicators associated with one or more of the network devices identified by the message module 1914. The message module 1914 may determine if one or more messages are available based on the message indicator request response.

Subsequently, the message module 1914 may provide one or more message information requests associated with the messages identified by the message indicator request response. The message module 1914 may receive one or more message information request responses comprising message information associated with any number of messages. The message information may comprise message notification information and message reference information.

In various embodiments, the message module 1914 notifies the user of waiting messages by providing one or more notifications related to the message notification information. The user may interact with the notification(s) and be directed to a web page or other document with the message (e.g., advertisement, offer, or the like).

In some embodiments, the message module 1914 may not provide a message indicator request but rather provide a message information request associated with one or more network devices or businesses associated with the one or more network devices. If there are not available messages, the message server or credential server may not respond or, alternately, may respond indicating that no messages are available. If a message is available, the message server or credential server may provide one or more message information request responses to the mobile device 1702.

The user settings module 1916 may comprise access settings associated with the mobile device 1702 or a user of the mobile device 1702. In various embodiments, there may be different access settings depending on the user. In one example, there may be different access settings for different users depending on password or other user identification. In some embodiments, the access settings are not determined by a user of the mobile device but rather may be set by an administrator or employer.

The display module 1918 is configured to display information to the user. In various embodiments, the display module 1918 may be configured to display notifications, messages, terms and conditions, or any other information.

Figure 20:
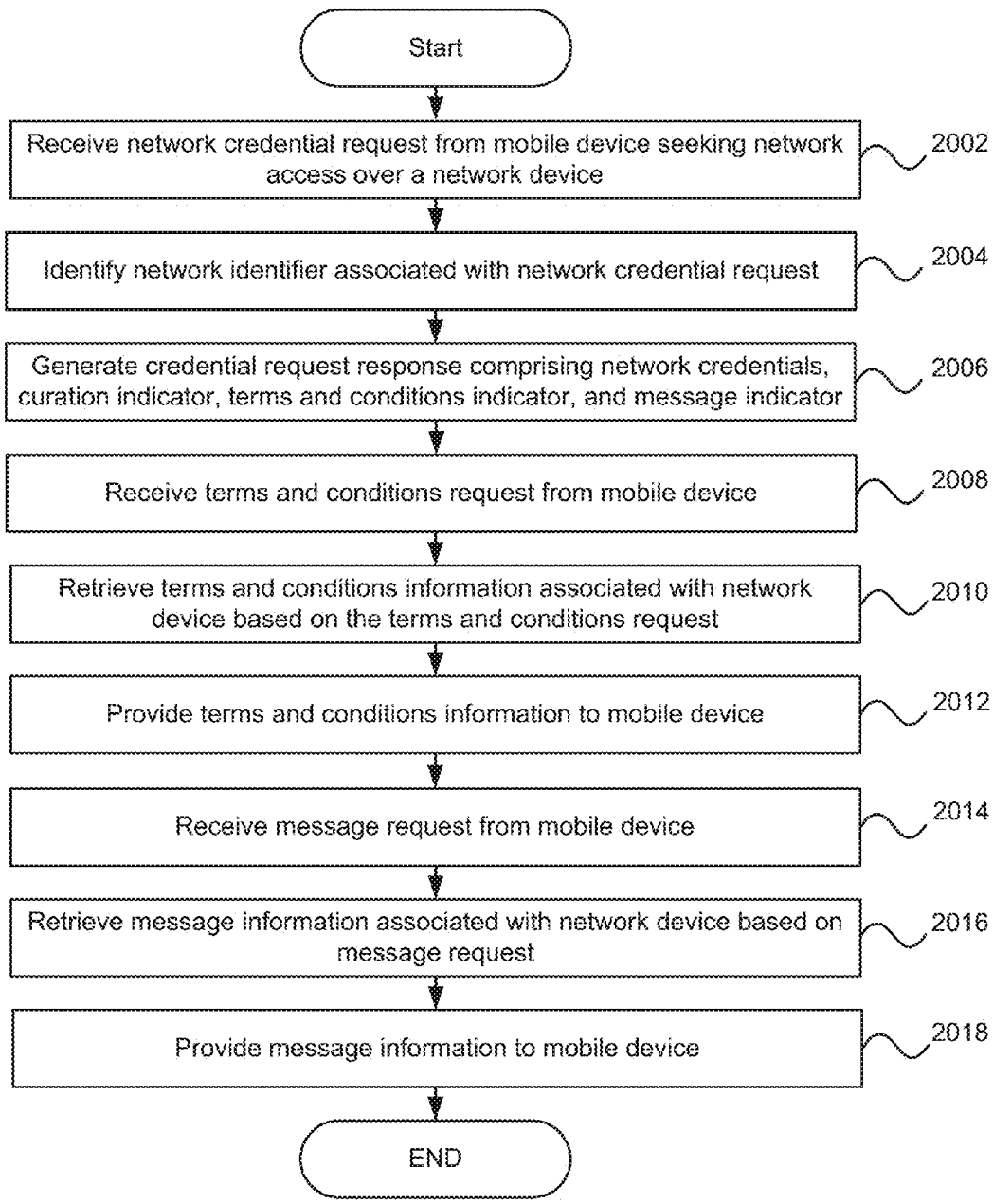
FIG. 20 is a flow chart depicting a method for providing a curation indicator, terms and conditions identifier, and a message identifier associated with a network device in some embodiments.

FIG. 20 is a flow chart depicting a method for providing a curation indicator, terms and conditions identifier, and a message identifier associated with a network device in some embodiments. In step 2002, the credential request module 1806 receives a network credential request from a mobile device 1702 seeking to log onto a network device. The network credential request may comprise a network identifier associated with the network device. In some embodiments, the mobile device 1702 provides the network credential request over an open port of the network device without logging onto the network device. In one example, the mobile device 1702 formats the network credential request as a DNS protocol. In step 2004, the credential request module 1806 may identify the network identifier associated with the network credential request.

The curation module 1816 may retrieve a curation indicator from a plurality of curation indicators. The retrieved curation indicator may be based, at least in part, on the network identifier. The T&C module 1818 may retrieve a terms and conditions indicator from a plurality of terms and conditions indicators. The retrieved terms and conditions indicator may also be based, at least in part, on the network identifier. Further, the message module 1820 may retrieve a message indicator from a plurality of message indicators. The retrieved message indicator may be based, at least in part, on the network identifier. The credential request response module 1808 may retrieve credentials associated with the network identifier as further described herein.

In step 2006, the credential request response module 1808 generates a credential request response comprising the retrieved network credentials, curation indicator, terms and conditions indicator, and the message indicator. The credential request response module 1808 may format the credential request response as a DNS protocol and return the response to the requesting mobile device 1702 via an open port of the network device.

In step 2008, the T&C module 1818 receives a terms and conditions request from the mobile device 1702. The terms and conditions request may request terms and conditions information associated with the network device. In some embodiments, the mobile device 1702 may provide the terms and conditions request to the T&C module 1818 based on an indication from the terms and conditions indicator that terms and conditions associated with the network device are available and/or required.

In step 2010, the T&C module 1818 retrieves terms and conditions information associated with the network device based on the terms and conditions request. In some embodiments, the T&C module 1818 retrieves the terms and conditions information based on a network identifier or any other identifiers contained within the terms and conditions request and/or the network credential request.

In step 2012, the T&C module 1818 provides the retrieved terms and conditions information as a part of the terms and conditions request response to the mobile device 1702. In some embodiments, the terms and conditions request provided from the mobile device 1702 may be provided over the network device without logging into the network device. For example, similar to the network credential request, the mobile device 1702 may provide the terms and conditions request over an open port of the network device without logging into the device. Further, the T&C module 1818 may provide the terms and conditions request response, including the terms and conditions information, to the mobile device 1702 over the open port of the network device. In one example, the terms and conditions request response may be formatted as a DNS protocol.

In step 2014, the message module 1820 receives a message request from the mobile device 1702. The message request may request message information associated with the network device. In some embodiments, the mobile device 1702 may provide the message request to the message module 1820 based on an indication from the message indicator that one or more messages associated with the network device are available.

In step 2016, the message module 1820 retrieves message information associated with the network device based on the message request. In some embodiments, the message module 1820 retrieves the message information based on a network identifier or any other identifiers contained within the message request and/or the network credential request.

In step 2018, the message module 1820 provides the retrieved message information as a part of a message request response to the mobile device 1702. In some embodiments, the message request provided from the mobile device 1702 may be provided over the network device without logging into the network device. For example, similar to the network credential request, the mobile device 1702 may provide the message request over an open port of the network device without logging into the device. Further, the message module 1820 may provide the message request response, including the message information, to the mobile device 1702 over the open port of the network device. In one example, the terms and conditions request response may be formatted as a DNS protocol.

Figure 21:
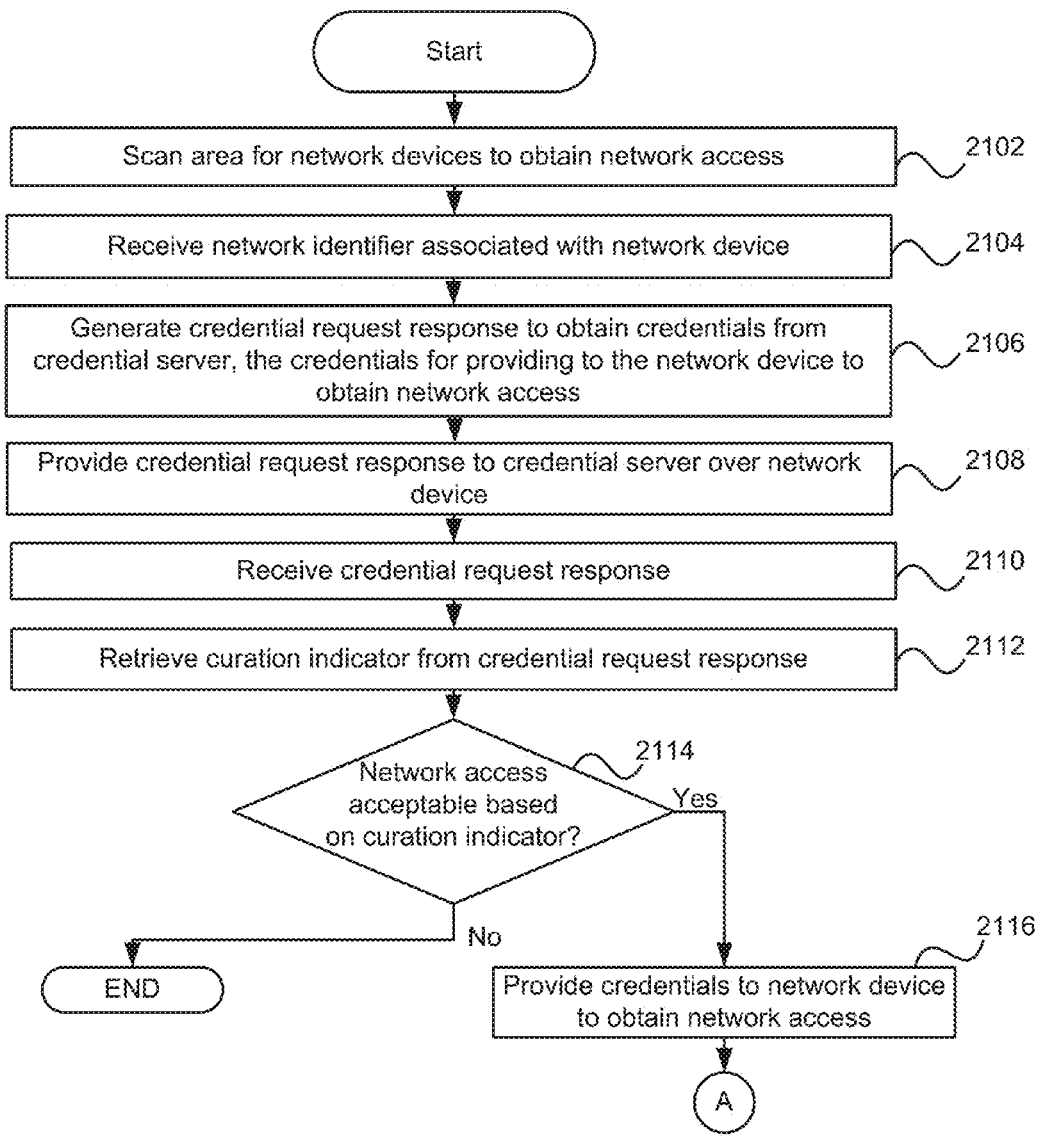
FIG. 21 is a flow chart depicting a method for determining to access a network device based on a curation indicator, displaying terms and conditions, and displaying a message associated with a network device in some embodiments.

FIG. 21 is a flow chart depicting a method for determining to access a network device based on a curation indicator, displaying terms and conditions, and displaying a message associated with a network device in some embodiments.

In step 2102, the scan module 1902 scans an area for network devices to obtain network access. In step 2104, the scan module 1902 receives network identifiers associated with the scanned network devices.

In step 2106, the credential request module 1904 generates a credential request response to obtain network credentials from a credential server. The network credentials may be for providing to the network device (e.g., logging into the network device) to obtain network access.

In step 2108, the credential request module 1904 provides the credential request to the credential server. In some embodiments, the credential request may be formatted as a DNS message and provided over an open port of the network device. In various embodiments, the credential request may comprise a curation indicator request, a terms and conditions request, and/or a message request. In some embodiments, the credential request response 1904 may provide the credential request to the credential server, a curation indicator request to a curation server, a terms and conditions indicator request to a T&C server, and/or a message indicator request to a message server.

In step 2110, the credential request module 1904 may receive the credential request response from the credential server. In some embodiments, the network character determination module 1906 may receive a curation indicator request response from the curation server, the T&C acceptance module 1912 may receive a terms and conditions indicator request response from the T&C server, and/or the message module 1914 may receive a message indicator request response from the message module.

In step 2112, the network character determination module 1906 retrieves the curation indicator from the credential request response 2112 or the curation indicator request response. In step 2114, the network character determination module 1906 determines whether network access is acceptable based on a comparison of the curation indicator and an access setting associated with the mobile device 1702 and/or the user of the mobile device 1702. If the curation indicator is not acceptable (e.g., the access setting requires a different curation indicator), the mobile device 1702 may not log into or otherwise provide the credentials to the network device and the method may end. If the network access is determined to be acceptable, the credential module may provide the credentials from the credential request response to log into the network device to obtain network access.

In one example, the network character determination module 1906 may request a curation indicator associated with the network device. In various embodiments, looking up the "shade of grey" (i.e., the curation indicator) may be handled via an A record (IPv4 address) DNS lookup:

sequence.uuid.bssid.ssid.b0.example.com

| Element | Description |
|---|---|
| Sequence | The sequence number that may be used for the entire "login" session (including any script retrieval and alive checks). |

| Element | Description |
| --- | --- |
| UUID | UUID of the device |
| BSSID | BSSID of the target network |
| SSID | Hex encoded SSID of the target network |

The credential server's curation module 1816 may generate a response which may be an A record (i.e. a 32 bit integer in network byte order). It may consist of two parts including: 1) a four bit "shade of grey" value; and 2) flags indicating additional requirements for using this network. For example:

| Bits (0 = LSB) | Description |
| --- | --- |
| 0:3 | Shade of grey value (see table below) |
| 4 | Client should show terms & conditions & report user response |
| 5 | Client should request & show post-login information |
| 6 | Client should request & show pre-login information [Reserved] |
| 7-31 | Reserved |

Shades of Grey Values:

| Shade Value | Meaning |
| --- | --- |
| 0x0 | White: OK to use |
| 0x1 | White: Network has terms & conditions |
| 0x2 | Grey: Likely intentionally shared |
| 0x3 | Grey: Unknown |
| 0x4 | Grey: Likely unintentionally shared |
| 0x5-0xe | Reserved |
| 0xf | Black: Do not use this network |

Any number of "grey values" may be identified to represent a likelihood to share the network. In one example, there may be sixteen different "grey values" to identify different or similar likelihoods.

Figure 22:
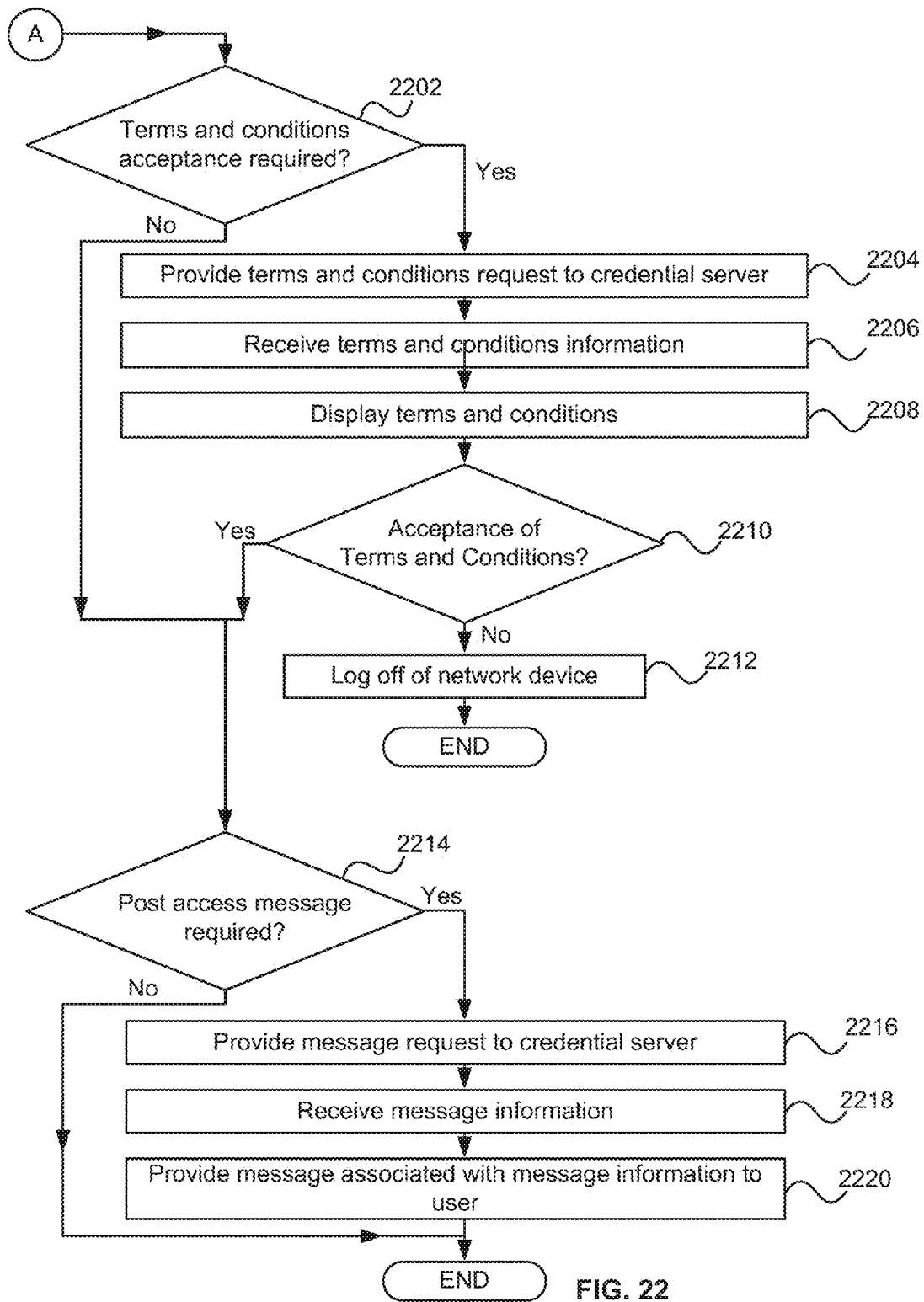
FIG. 22 is a continued flow chart from FIG. 21 depicting a method for determining to access a network device based on a curation indicator, displaying terms and conditions, and displaying a message associated with a network device in some embodiments.

The process continues in FIG. 22 in the portion marked as "A". FIG. 22 is a continued flow chart from FIG. 21 depicting a method for determining to access a network device based on a curation indicator, displaying terms and conditions, and displaying a message associated with a network device in some embodiments.

In step 2202, the T&C module 1818 determines if terms and conditions are available or required based on the terms and conditions indicator from the credential request response or the terms and conditions indicator request response. In some embodiments, the terms and conditions indicator is a flag that indicates whether terms and conditions associated with the network device are available.

The T&C acceptance module 1912 may request terms and conditions associated with the network device. For example, the mobile device 1702 may receive a credential request response that indicates that terms and conditions are required for the network device. The T&C acceptance module 1912 may provide a request for terms and conditions to the credential server and/or a T&C server. The terms and conditions request may be a DNS TXT record lookup encoded as follows:

sequence.uuid.bssid.ssid.i0.example.com

| Element | Description |
| --- | --- |
| Sequence | The sequence number that will be used for the entire "login" session (including any script retrieval and alive checks). |
| UUID | UUID of the device |
| BSSID | BSSID of the target network |
| SSID | Hex encoded SSID of the target network |

In one example, the credential server's T&C module may respond to the request. The response may be a single text record containing the following two fields, separated by an ASCII '\0x01' character, including: 1) printable text for the terms and conditions (UTF-8 encoded); and 2) fully qualified URL for the text of the terms and conditions (must be accessible before authentication).

If terms and conditions are not available, the method continues to step 2214 to determine if a post access message is available. If terms and conditions are available, the T&C module 1818 provides a terms and conditions request to the credential server or the T&C server in step 2204. The terms and conditions request may request terms and condition information.

In step 2206, the T&C module 1818 retrieves terms and conditions information from a terms and conditions request response provided by the credential server or the T&C server. The terms and conditions information may comprise terms and conditions notification information as well as terms and conditions referral information.

In step 2208, the display module 1918 displays the terms and conditions. In various embodiments, the display module 1928 displays a notification of terms and conditions. The notification may be associated with the terms and conditions notification information. The notification may allow the user to accept the terms and conditions and/or display the terms and conditions. In some embodiments, the user may interact with the notification to access a web page or other document provided by the terms and conditions referral information.

In step 2210, the T&C acceptance module 1912 determines if the user accepts the terms and conditions. If the user does not accept the terms or conditions over a predetermined time or expressly does not accept the terms and conditions, the T&C module 1912 and/or the access control module 1908 may log the mobile device 1702 off of the network device. The T&C module 1912 and/or the access control module 1908 may also blacklist the network device. Although the individual network device may be blacklisted (e.g., based on network identifier), those skilled in the art will appreciate that other related network devices (e.g., other network devices owned by the same business) may not be similarly blacklisted.

If the user accepts the terms and conditions, the T&C module 1818 may be configured to report the user's acceptance. In one example, reporting the user's response to the terms and conditions request may be handled by another DNS A record lookup. This may be a signed lookup. The signature may be calculated using the sequence number as well:

signature.sequence.uuid.bssid.ssid.a0.example.com

| Element | Description |
| --- | --- |
| Signature | The signature for the request calculated the same way as for other DNS lookups. The message components for the signature in this case should be "sequence.uuid.bssid.ssid.a0.example.com" (i.e. everything to the right of the signature field). |

-continued

| Element | Description |
|---|---|
| Sequence | The sequence number that will be used for the entire "login" session (including any script retrieval and alive checks). The sequence number that will be used for the entire "login" session (including any script retrieval and alive checks). |
| UUID | UUID of the device |
| BSSID | BSSID of the target network |
| SSID | Hex encoded SSID of the target network |

In one example, the response to this lookup may be either 0.0.0.0 (0) for OK or 255.255.255.255 (−1) in case of an error.

In some embodiments, the mobile device 1702 may not log onto the network device or may only temporarily log onto the network device to obtain terms and conditions or messages. Subsequently the mobile device 1702 may log off the device. If terms and conditions are not accepted, the mobile device 1702 may not log onto the network device. If terms and conditions are accepted, the mobile device 1702 may subsequently log onto the network device.

In step 2214, the message module 1914 may determine if a message is available based on the message indicator received from the credential server or the message server. If a message is not available, the method may end. If a message is available, the message module 1914 may provide a message request to the credential server or the message server in step 2216. The message request may comprise an identifier of the mobile device 1702 and the network identifiers.

In step 2218, the message module 1914 may retrieve message information from a message request response. The message information may comprise message notification information as well as message referral information.

The post login information request (i.e., the message request) may be another TXT record request:

sequence.uuid.bssid.ssid.i1.example.com

| Element | Description |
|---|---|
| Sequence | The sequence number that may be used for the entire "login" session (including any script retrieval and alive checks). The sequence number that will be used for the entire "login" session (including any script retrieval and alive checks). |
| UUID | UUID of the device |
| BSSID | BSSID of the target network |
| SSID | Hex encoded SSID of the target network |

The message request response may be a single text record containing the following three fields, separated by an ASCII '\0x01' character, including: 1) printable text for the message (UTF-8 encoded); 2) fully qualified Devicescape Short URL for the action; and 3) icon image identifier.

Fields may be left empty if not applicable. In some embodiments, fields are not dropped. In other embodiments, empty fields may be dropped.

In step 2220, the display module 1918 may provide a message associated with the message information to the user. For example, the display module 1918 may display a notification of a message. The notification may indicate the message based, at least in part, on the message notification information. If the user engages or interacts with the notification, the user may be presented a web page or other document via the message referral information containing one or more messages.

In various embodiments, those skilled in the art will appreciate that, on the database side, there may track one or more of the following:

Shade of grey for each BSSID

Default shade of grey for each network

Terms & conditions acceptance state for each network (per device)

Terms & conditions URL for each network (that has them)

Post login message, URL and icon image identifier for each network (that needs them)

The following tables may be included in the database side:

| Shade Of Grey | | |
|---|---|---|
| Column Name | Type | Description |
| bssid | VARCHAR(12) | BSSID of the network in our standard format |
| ssid | VARCHAR(64) | SSID of the network, hex encoded in our standard format |
| network_id | INT UNSIGNED | ID of the network this BSSID/SSID pair belongs to |
| shade | INT UNSIGNED | Shade of grey for this network |
| terms | INT UNSIGNED | ID of the terms and conditions for this location (NULL if none) |
| post | INT UNSIGNED | ID of the post login message for this location (NULL if none) |
| lastModifiedDate | TIMESTAMP | Auto-updating timestamp showing date of last change |

| Default Shade | | |
|---|---|---|
| Column Name | Type | Description |
| network_id | INT UNSIGNED | ID of the network (from the connect.network table) |
| shade | INT UNSIGNED | Default shade of grey value for locations in this network (0-15) |
| terms | INT UNSIGNED | Default terms and conditions for locations in this network (NULL if none) |
| post | INT UNSIGNED | Default post login message for locations in this network (NULL if none) |
| lastModifiedDate | TIMESTAMP | Auto-updating timestamp showing date of last change |

| Terms & Conditions | | |
|---|---|---|
| Column Name | Type | Description |
| Id | INT UNSIGNED | ID for the terms and conditions |
| network_id | INT UNSIGNED | ID of the network (from the connect.network table) |
| title | VARCHAR(255) | Title text for terms & conditions (displayed to user) |
| url | VARCHAR(255) | URL for the text of the terms & conditions |
| lastModifiedDate | TIMESTAMP | Auto-updating timestamp showing date of last change |

| Terms & Conditions Acceptance | | |
|---|---|---|
| Column Name | Type | Description |
| Id | INT UNSIGNED | ID of the terms and conditions |
| uuid | VARCHAR(36) | UUID of the device that accepted the terms |
| bssid | VARCHAR(36) | BSSID of the network where the terms were accepted |
| acceptedOn | DATETIME | Date & time when the acceptance was received by the server |
| lastModifiedDate | TIMESTAMP | Auto-updating timestamp showing date of last change |

| Post Login Messages | | |
|---|---|---|
| Column Name | Type | Description |
| id | INT UNSIGNED | ID of the post login message |
| text | VARCHAR(255) | Text message to display |
| url | VARCHAR(255) | URL to associate with the message (may be NULL if none) |
| icon | VARCHAR(16) | Name of the icon for this message (may be NULL if none) |
| lastModifiedDate | TIMESTAMP | Auto-updating timestamp showing date of last change |

In addition the new data above, the credential server may verify the signed acceptance of terms & conditions messages. In some embodiments, this may not require access to the existing connect database. The following table may summarize the device information:

| Column Name | Type | Description |
|---|---|---|
| id | INT UNSIGNED | The device ID (matching connect.device) |
| uuid | VARCHAR(36) | The device's UUID |
| deviceKey | VARCHAR(250) | The device's encryption key (itself encrypted, as in the connect.device table) |
| userId | INT UNSIGNED | The ID of the user associated with the device |
| stateId | INT UNSIGNED | The operational state of the device |
| lastModifiedDate | TIMESTAMP | Auto-updating timestamp showing date of last change |

Figure 23:
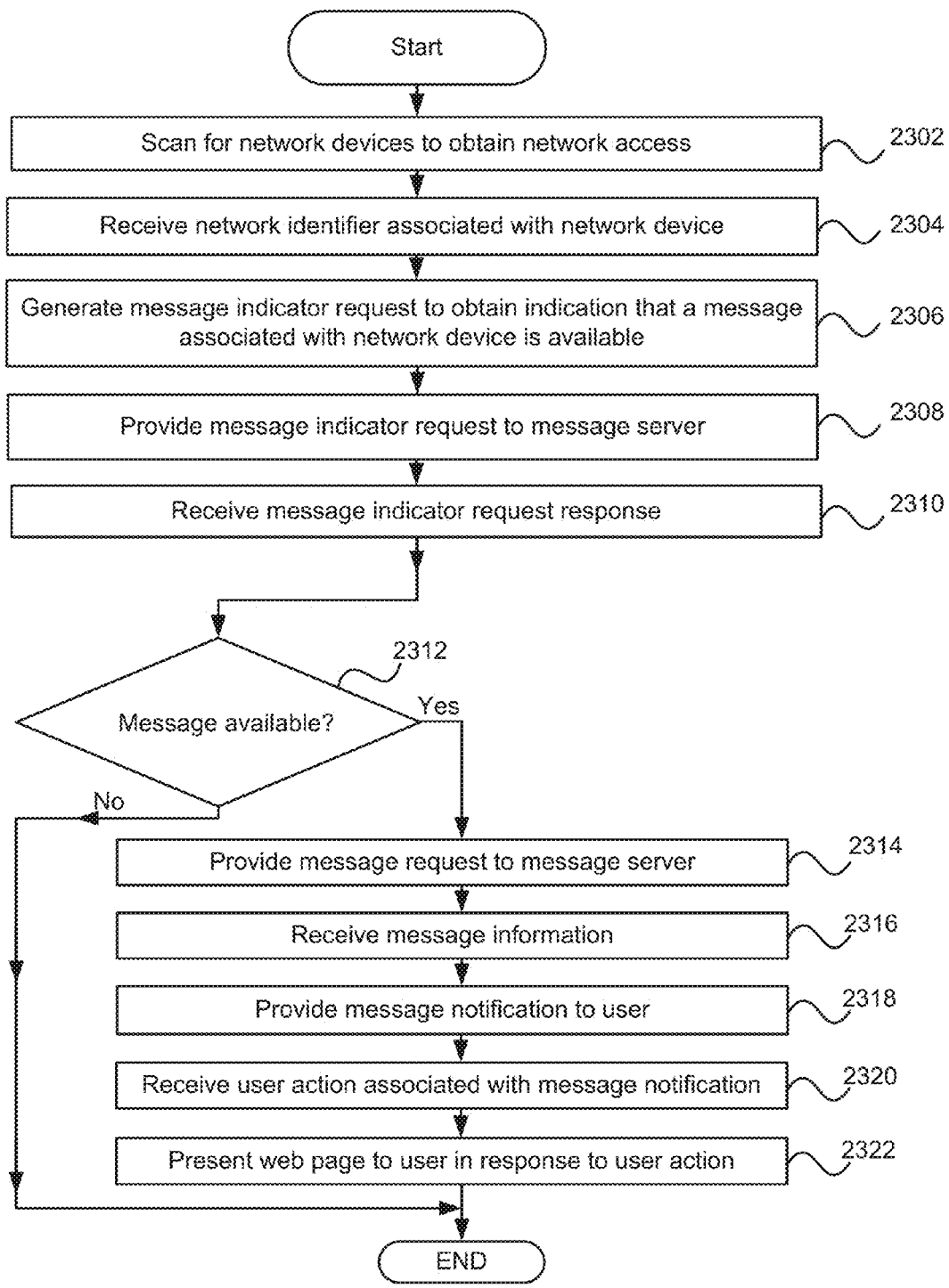
FIG. 23 is a flow chart depicting another method of obtaining and displaying messages associated with a network device in some embodiments.

FIG. 23 is a flow chart depicting another method of obtaining and displaying messages associated with a network device in some embodiments. Those skilled in the art will appreciate the difficulty of providing users with capable mobile device 1702 messages without requiring the user to log onto a network and/or open a browser to access the message. System and method described herein may allow for a formatted notification of a message associated with a network device in proximity to the mobile device 1702. The user may then have the option to review the notification, receive message indication information (e.g., a brief summary of what the message entails) and an option to interact with the notification to receive the message (e.g., via text message, SMS, web page, pop-up, or the like). The operator or business owner associated with the network device and/or the message may design a mobile web page or other message vehicle formatted for mobile devices which may be delivered to users in a manner that is both effective and nonobtrusive.

In step 2302, the scan module 1902 may scan an area proximate to the mobile device 1702 for network devices. In step 2304, the scan module 1902 may receive network identifier(s) associated with one or more network devices. The mobile device may log onto one of the network devices or access a separate network (e.g., a cellular network). In some embodiments, the mobile device 1702 does not log onto any of the network devices but formats messages (e.g., message indicator requests and/or message information requests) as a DNS protocol and provides the formatted messages over an open port of one or more of the scanned network devices.

In step 2306, the message module 1914 may generate a message indicator request to obtain an indication that a message associated with one or more of the scanned network devices is available. The message indicator request may comprise one or more network device identifiers. Those skilled in the art will appreciate that the message module 1914 may generate any number of message indicator requests.

In step 2308, the message module 1914 provides the message indicator request(s) to any number of credential servers and/or message servers. In step 2310, the message module 1914 may receive any number of message indicator request response(s) from the credential server(s) and/or message server(s).

In step 2312, the message module 1914 may determine if messages are available based on the receive message indicator request response(s). If no messages are available, the method may end. If one or more messages are available, the message module 1914 may provide a message request to the credential server and/or the message server based on the message indicator(s) contained within the message indicator request response(s).

Those skilled in the art will appreciate that step 2306-2312 may be optional. For example, the message module 1914 may provide any number of message requests to any number of message servers and/or credential servers without first providing one or more message indicator requests.

In step 2316, the message module 1914 may receive a message request response including message information from the credential server(s) and/or the message server(s). The message information may include message notification information that may summarize, advertise, or highlight information associated with a message, and a message referral information which may provide a link or web page to all or part of a message.

In step 2318, the display module 1918 may provide a message notification to the user. The notification may appear in a notification status bar. The notification may include audio, animations, video, graphics, text, and/or any other displayable information. The user may view the notification which may include information associated with at least some of the message information.

In step 2320, the display module 1918 may receive a user action or interaction with the notification. In step 2322, the display module 1918 and/or the message module 1914 may spawn a text message, SMS message, or any kind of pop-up based on the user action or interaction. The display module 1918 and/or the message module 1914 may initiate a browser and direct the browser to a web page or document associated with the message referral information. Similarly, the display module 1918 and/or the message module 1914 may initiate any application and display a document, access a file, play video, play audio, or any combination herein as part of the message.

In various embodiments, the user may be able to receive and/or accumulate notifications of messages formatted for the mobile device 1702 based on proximity to a business, network device, or service.

In various embodiments, a curated virtual network (CVN) provides a unified virtually aggregated and curated collection of free and open "amenity" hotspots. Further, the CVN may enable mobile software connectivity for purposes of data access and cellular offload. Wireless networks may be added automatically to the CVN with or without explicit permission from the network owner. A network owner is any individual, group, company, or other entity. For example, a network owner may be a venue owner (e.g., an owner of a bar installs a consumer-grade access point for example).

Those skilled in the art will appreciate that receiving explicit permission from a network owner to add one or more of their wireless networks to the CVN may be preferred. If explicit permission from the network owner is received, the network owner's wireless network maybe confirmed as being available and intentionally shared. Further, one or more identifiers for the wireless network may be confirmed and verified which may provide additional assurance that the wireless network is safe (e.g., that the wireless network is not a fake wireless network designed to steal confidential information). Receiving explicit permission of a network owner may provide, either expressly or impliedly, that the associated wireless network may be available for the foreseeable future.

There are any number of methods of gaining approval from the network owner to add one or more wireless networks to the CVN. In some embodiments, venue owners or operators are provided value in exchange for providing rights for the wireless network to be a part of a curated virtual network. The venue owner may, for example, may receive customer feedback, ratings of product and services, assessments, or the like in exchange for explicitly allowing access to the wireless network. Further, in some embodiments, the venue owner or operator may control a welcoming or informative message.

In one example, a network owner may desire to approve adding a wireless network to the CVN in exchange for commercial services. In some embodiments, a venue or business owner directly engages with their customers on devices running CVN mobile software. Services that enable the venue or business owner to directly engage with their customers may be provided at no charge to the end user or the venue owner. In return, the venue or business owner may explicitly grant permission end-users to access the wireless network via the CVN for data access/offload. Those skilled in the art will appreciate that the venue or business owner may provide permission for the wireless network to join the CVN for, essentially, a quid-pro-quo arrangement with no monetary exchange. Alternately, the business owner may provide permission for the wireless network to join the CVN for compensation (e.g., payment to the venue owner, payment in exchange for utilizing the wireless network for advertisements, or payment discounted in return for network access). In some embodiments, the business owner may provide compensation to an owner or operator of the curated virtual network and/or one or more virtual network servers in exchange for controlling content of notification messages and/or customer experience interfaces to be received by venue attendees.

Figure 24:
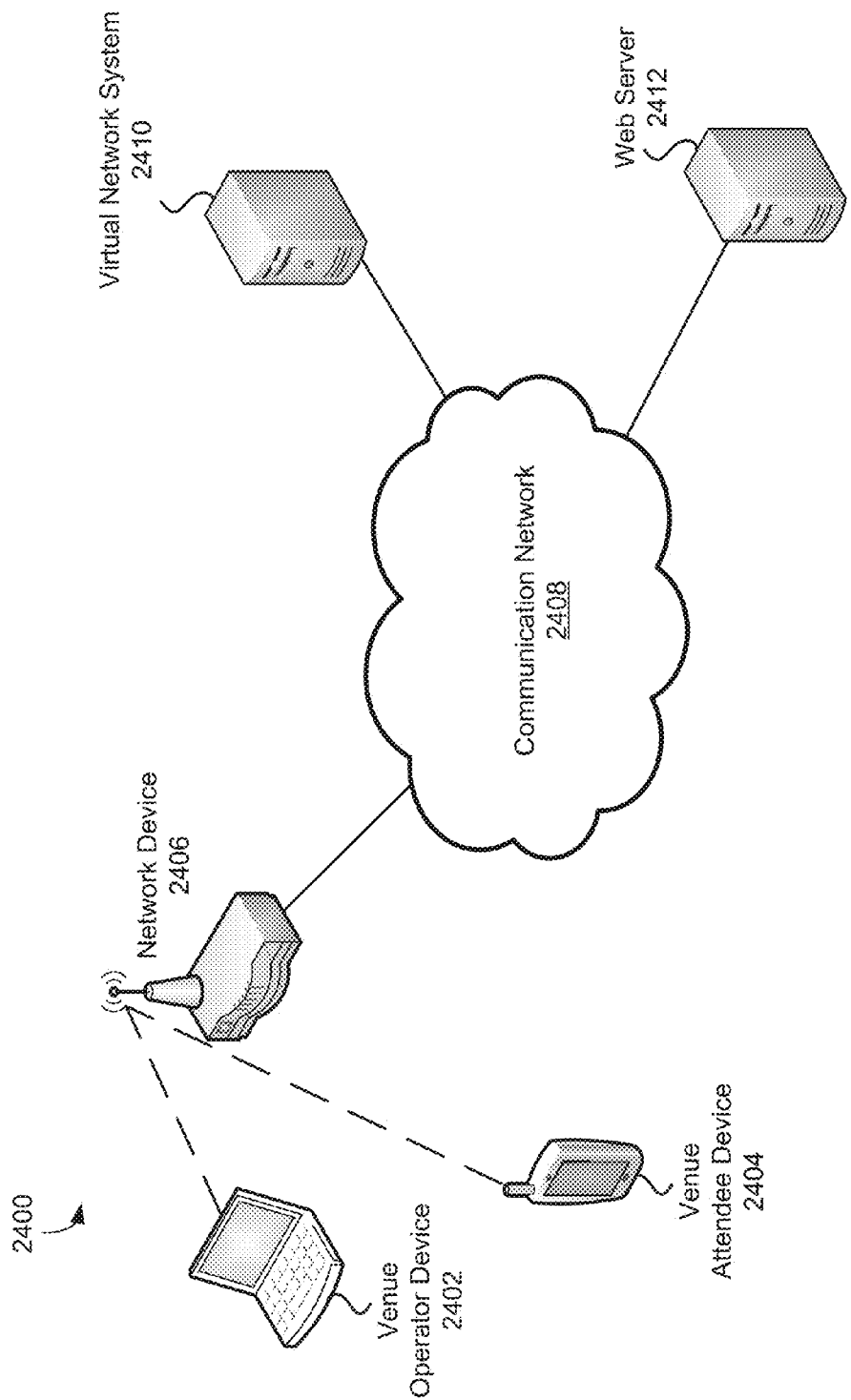
FIG. 24 is a diagram of an environment in which some embodiments may be practiced.

FIG. 24 is a diagram of an environment 2400 in which some embodiments may be practiced. The exemplary environment 2400 comprises a venue operator device 2402 and a venue attendee device 2404 in communication with a network device 2406. The network device 2406 may be in communication with a virtual network system 2410 and a web server 2412 over communication network 2408. The venue operator device 2402, venue attendee device 2404, network device 2406, virtual network system 2410, and/or web server 2412 may be or comprise digital device(s).

The venue operator device 2402 may be any digital device. In some embodiments, the venue operator may register and/or pre-register the wireless network to receive permission for the wireless network to be a part of the curated virtual network. For example, a venue owner or operator may provide wireless network identifiers (e.g., BSSID, SSID, a combination of BSSID and SSID, and/or the like) to the virtual networks system 2410. The venue owner or operator may provide the wireless network identifiers manually or automatically.

For example, the venue owner or operator may utilize the venue operator device 2402 (connected to the wireless network that is to be added to the curated virtual network) to retrieve one or more wireless network identifiers. In some embodiments, the venue owner or operator may retrieve a web page or any other media that includes functionality (e.g., a downloadable executable) that retrieves and/or identifies wireless network identifiers from a connected network. The wireless network identifiers may be provided by the venue operator device 2402 to the virtual network system 2410. The wireless network identifiers may be provided to the virtual network system 2410 as a part of a pre-registration system or may be a part of registering the wireless network with the curated virtual network.

At the time of or following registration, the venue owner or operator may configure a notification message and a customer experience interface for venue attendees. In various embodiments, the venue owner or operator accesses an account (e.g., created or provisioned through registration) and enters or selects a notification message that may be sent to a venue attendee that connects to the wireless network. The notification message may be displayed on the venue attendee device. For example, when a venue attendee connects to the wireless network, they may receive a notification indicator on their venue attendee device 2404 (e.g., the venue attendee device 2404 is an Android smartphone with a pull down notification interface). Upon selecting the notification interface on the venue attendee device 2404, the venue attendee may view the notification message.

The notification message may comprise text, images, URL, or any other information. In one example, the notification message is either text and/or a URL. The notification message may include a text message, pop-up, or the like. In one example, the notification message comprises text and is associated with a URL. By engaging with the notification message (e.g., selecting or clicking on the notification message), a browser may be directed to the associated URL. The URL may link to a venue web page, a landing page, a custom interface, a Facebook page, a Yelp page, a page for Google+, a YouTube video, or a mobile webapp page, for example. In some embodiments, the URL links to a page on a network. In other embodiments, the URL may link to a locally stored interface (e.g., a locally stored webpage, interface, window, article, file, or the like). The notification message may be the notification as discussed with regard to FIG. 17.

The notification message may include an offer, a welcome, an advertisement, coupon, opening hours, reminders, or any other information. In one example, the venue attendee device 2404 comprises a smartphone with an Android operating system. A notification indicator may appear in the notification status bar. The user may activate the notification indicator and see the notification message (e.g., text or graphic with an embedded link) The notification message may indicate an offer, advertisement, or any other information. The user may, in some embodiments, activate the embedded ink (e.g., by clicking on or touching the text) of the notification message to access a web page, graphic, image, or other media that displays information or otherwise informs the user. In some embodiments, the notification message may open an application (e.g., a mobile app). In various embodiments, the notification message may request to or download/install an application (e.g., from an app store).

In some embodiments, the customer may engage with the notification message (e.g., click on or select the message) and receive one or more customer experience interfaces (e.g., pop-up or browser window) which may allow the customer to rate a service, rate the venue, rate products, leave feedback or public comments, view a web page, receive offers, receive discounts, receive video and/or audio, receive opportunities, be presented with information (e.g., information for an upcoming event, for an exhibit, directions, locations, or information for an entertainment group such as a band) or the like.

The venue attendee device 2404 may be any digital device. For example, the venue attendee device 2404 may include, but is not limited to, a smart phone, cellular device, media device (e.g., iPod), tablet, notebook computer, PDA, personal computer (e.g., mobile or stationary) or the like. As discussed herein, the venue attendee device 2404 may obtain network access via the network device 2406 by providing the network device 2406 login information (e.g., username, password, procedural information, acceptance of terms and conditions, and/or the like). In one example, login information may comprise instructions to click through one or more interfaces or pages, click (or select) buttons, check boxes, or the like. In some embodiments, the venue attendee device 2404 does not provide any login information (e.g., login information is not necessary to obtain access). In some embodiments, the venue attendee device 2404 does not provide login information to access the wireless network over the network device 2406. In one example, the venue attendee device 2404 does not receive any information from the virtual network system 2410 to provide to the network device 2406 to obtain wireless network access.

In some embodiments, the venue attendee device 2404 provides the network device 2406 credentials and/or login information received from a credential server (e.g., credential server 1708 as depicted in FIG. 17). The credential server may be a part of the virtual network system 2410. For example, the venue attendee device 2404 may identify the network device 2406, request credentials from the credential server over an open port of the network device 2406 (e.g., by formatting the request using the DNS protocol), and receive a credential request response including credentials from the credential server over the open port of the network device 2406.

In some embodiments, once the venue attendee device 2404 obtains access to the wireless network or thereafter, the venue attendee device 2404 may receive the notification message and/or the notification indication of the notification message. In various embodiments, connectivity is not necessary for the venue attendee device 2404 to obtain a notification message. For example, as described herein, the venue attendee device 2404 may provide a credential request or a notification message request to the virtual network system 2410 over the network device 2406 (e.g., via an open port on the network device 2406). The credential request or notification request may be formatted using a DNS protocol. In response to the credential request or the notification request, the virtual network system 2410 may retrieve credentials and/or a notification message and provide the credentials and/or notification message to the venue attendee device 2404 formatted using a DNS protocol (e.g., credentials and/or providing the notification message over the open port of the network device 2406). The venue attendee device 2404 may display a notification indicator and/or the notification message at any time (e.g., whether or not the venue attendee device 2404 obtains or attempts to obtain wireless network access). In some embodiments, the virtual network system 2410 provides instructions for the venue attendee device 2404 to display a notification message stored locally on the venue attendee device 2404.

In some embodiments, the venue attendee device 2404 may connect to the wireless network and the venue owner or operator may provide wireless network identifiers to the virtual network system 2410 via the venue attendee device 2404 as a part of pre-registration. For example, the venue owner or operator may interact with the venue attendee device 2404 to confirm that the venue owner or operator owns or operates the wireless network and provides permission for the transmission of wireless network identifier(s) to the virtual network system 2410. Functionality on the venue attendee device 2404 (e.g., of a client on the venue attendee device 2404 and/or downloaded functionality) may retrieve one or more wireless network identifiers and provide the information to the virtual network system 2410. The virtual network system 2410 may provide a pre-registration code associated with the one or more wireless network identifiers back to the venue attendee device 2404 (and/or the venue operator device 2402 if the venue owner or operator provided their email address or the like with the wireless network identifier(s)).

The venue owner or operator may then utilize the pre-registration code at a later time or on a different digital device (even a digital device that is not connected to the wireless network that has not yet been expressly approved to be shared by the owner with the virtual network system 2410). For example, the venue owner or operator may access a web page or interface (e.g., a local interface from an application or app) to register the wireless network with the curated virtual network and provide, in addition to other registration information (e.g., username, confirmation of a desire to share the wireless network, and/or the like), the pre-registration code. The virtual network system 2410 may retrieve the wireless network identifier(s) based on the pre-registration code and may associate the wireless network identifier(s) with the venue owner or operator's registration information.

Those skilled in the art will appreciate that there are any number of ways to enable providing wireless network identifiers during or before registration. Further, a venue owner or operator may be encouraged to provide permission for their wireless network to be a part of the curated virtual network if they do not have the burden of manually determining the wireless network identifier(s) and/or are not required to be connected to the wireless network at the time of registration (thereby allowing, for example, the venue owner or operator to consider allowing the wireless network to be a part of the curated virtual network at another place when there is more time).

In some embodiments, the venue attendee device 2404 may determine that the network device 2406 or an operator associated with the network device 2406 requires terms and conditions to be agreed to before utilizing network services of the network device 2406. In various embodiments, the venue attendee device 2404 may request terms and conditions from a server such as the credential server or virtual network system 2410. The credential server or virtual network system 2410 may receive the terms and conditions request and determine if terms and conditions are associated with the network device 2406. If terms and conditions are required, the credential server or virtual network system 2410 may provide the venue attendee device 2404 terms and conditions information.

The communication network 2408 may be any network including a LAN, WAN, or combination of networks. The communication network 2408 may comprise wired, wireless, and/or cellular connections. The communication network 2408 may be similar to the communication network 1706 and/or 114 as shown in FIGS. 17 and 1, respectively.

The virtual network system 2410 may comprise any number of digital devices (e.g., credential servers, virtual network servers, and the like). In various embodiments, the virtual network system 2410 may receive pre-registration requests and wireless network identifiers, generate pre-registration codes associated with the respective wireless network identifiers, and provide the codes. The virtual network system 2410 may also register wireless networks (e.g., the virtual network system 2410 may retrieve previously stored wireless network identifiers based on the pre-registration code and associate the wireless network identifiers with one or more registrations).

The virtual network system 2410 may also allow a venue owner or operator to configure notification messages and/or customer experience interfaces with which the venue attendee may see and interact.

The virtual network system 2410 may also provide information (e.g., wireless network identifiers, login information, and/or the like) to other digital devices to allow the other digital devices to obtain access through the network device 2406 as discussed herein.

In some embodiments, the virtual network system 2410 may not provide the login information to the other digital device. For example, in some embodiments, the digital device may comprise a client configured to scan an area to identify available wireless network that are intentionally shared. The client may retrieve wireless network identifiers from the scan. The digital device and/or the virtual network system 2410 (e.g., the digital device may provide the scanned wireless network identifiers to the virtual network system 2410) may compare the wireless network identifiers to known and confirmed available wireless networks (e.g., confirming that a venue owner or operator of the wireless network has expressly allowed the wireless network to be a part of the curated virtual network during the registration process). The client on the digital device may then enable or obtain access over the network device 2406.

The web server 2412 may be a digital device configured to provide one or more web pages to the venue attendee device 2404. The web pages may be associated with the venue or chosen by the venue owner or operator as a part of the customer experience configured by the venue owner or operator. In one example, the network device 2406 is a wireless router at a coffee shop. The web server 2412 may provide web pages associated with the coffee shop (e.g., a homepage of the coffee shop).

Although only one venue operator device 2402, venue attendee device 2404, network device 2406, virtual network system 2410, and web server 2412 are depicted in FIG. 24, those skilled in the art will appreciate that there may be any number of venue operator devices 2402, venue attendee devices 2404, network devices 2406, virtual network systems 2410, and/or web servers 2412. For example, any number of venue attendee devices 2404 may communicate with and/or over network device 2408.

Figure 25:
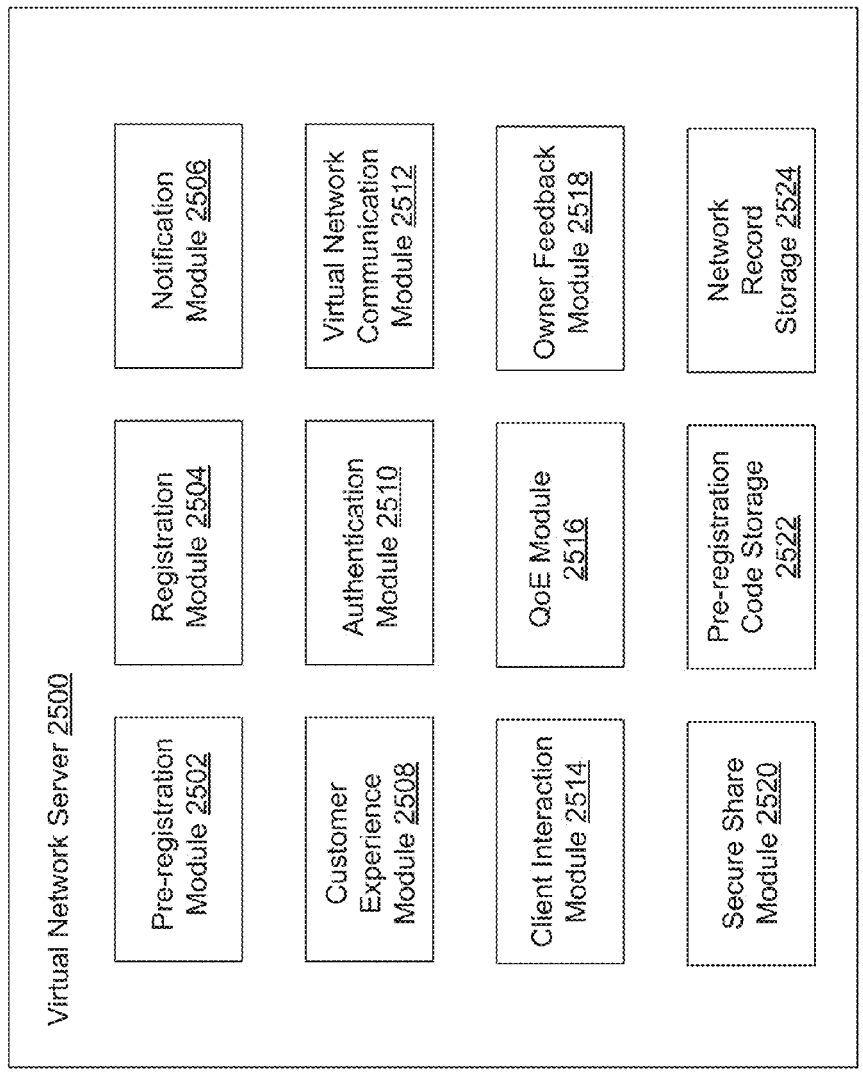
FIG. 25 is a block diagram of a virtual network server in some embodiments.

FIG. 25 is a block diagram of a virtual network server 2500 in some embodiments. The virtual network server 2500 may comprise a pre-registration module 2502, a registration module 2504, a notification module 2506, a customer experience module 2508, an authentication module 2510, a virtual network communication module 2512, a client interaction module 2514, a QoE module 2516, an owner feedback module 2518, a secure share module 2520, a pre-registration code storage 2522, and a network record storage 2524.

The virtual network server 2500 may include any number of digital devices. In some embodiments, the virtual network server 2500 is a part of, controls accessibility, and/or is accessible to the curated virtual network. The virtual network server 2500 may be a part of the virtual network system 2410 depicted in FIG. 24.

The pre-registration module 2502 is configured to generate and/or otherwise provide one or more pre-registration codes. For example, a venue operator or venue attendee may request, via a browser or a client on a digital device, a pre-registration website, webpage, or interface (e.g., the interface being partly or completely locally stored on a digital device). The pre-registration website, webpage, or interface may include an option to request a pre-registration code or may include the pre-registration code. The pre-registration website, webpage, or interface may be provided by the virtual network server 2500, web server, or any other digital device associated with the virtual network server 2500.

A venue owner or operator may be any entity which owns and/or operates one or more wireless networks. In various embodiments, the venue operator is a venue owner. The venue operator may also be an agent or otherwise represent the venue owner.

In various embodiments, when a venue owner or operator wishes to obtain a pre-registration code, the venue owner or operator submits a pre-registration request via a digital device (e.g., a venue owner device or the venue owner interacts with a venue attendee device). The pre-registration code request may comprise an identifier of the digital device that provided the request as well as at least one identifier of a wireless network associated with the venue operator. For example, at the time the venue operator wishes to obtain the pre-registration code over the digital device, the digital device may have accessed the wireless network over a network device. The digital device may include one or more identifiers, such as a BSSID and/or SSID, associated with the wireless network within the pre-registration request.

The digital device may provide the one or more identifiers of the wireless network in any number of ways. In some embodiments, the digital device may download an agent (e.g., implemented via java, JavaScript, or via downloadable executable) or any functionality configured to identify one or more identifier(s) of wireless networks scanned by the digital device. For example, an agent or client on the digital device may identify a wireless network that is connected to the digital device. The agent or client may then retrieve the identifiers from the digital device to include with or in the registration request. In various embodiments, the agent, client, or other functionality may be provided by the pre-registration module 2502, or any digital device (e.g., a web server).

The pre-registration module 2502 may receive the pre-registration request and retrieve the one or more identifiers associated with the wireless network from the pre-registration request. The pre-registration module 2502 may generate or retrieve a pre-registration code (e.g., from the pre-registration code storage 2522) and associate the pre-registration code with the one or more identifiers associated with the wireless network. The pre-registration module 2502 may store the associated pre-registration code and the one or more wireless network identifiers within the pre-registration code storage 2522.

The pre-registration module 2502 may also provide the pre-registration code. In some embodiments, the pre-registration module 2502 provides the pre-registration code to the requesting device (e.g., via a digital device identifier such as an address). The pre-registration code may be provided to the requesting device within, for example, a web page or interface. The pre-registration code may be provided to a requesting device in any number of ways or any combination of ways including but not limited to within a web page, text message, email, SMS text, facsimile, image, and/or the like.

In some embodiments, the pre-registration request may indicate an email address, phone number, SMS texting address, facsimile number, or other address to provide the pre-registration code request. For example, the venue operator may provide an email address in addition to the request for the registration code. The pre-registration module 2502 may generate and provide the pre-registration code to the email address or in any number of ways (e.g., by phone, by text message, by facsimile, or the like).

A pre-registration code may be any identifier comprising any combination of letters, numbers, and/or symbols. Those skilled in the art will appreciate that the pre-registration code is not necessarily utilized to perform security functions and, as such, the pre-registration code may not be too complex or too long which may become an obstacle to the venue owner or operator in registration of the wireless network.

As discussed herein, the pre-registration code provided to the venue operator or owner may allow the venue operator or owner to register the wireless network at another time. Further, by automatically pairing the wireless network identifier(s) with the pre-registration code, some systems and methods discussed herein may relieve the venue owner or operator from recalling or searching for the correct wireless network identifier(s) to provide to the virtual network server 2500 during registration.

In some embodiments, the venue owner or operator may provide the wireless network identifier(s) within the pre-registration and/or registration requests.

The registration module 2504 is configured to register one or more wireless networks such that the one or more wireless networks are identified as being intentionally shared by the owner or operator of the wireless network(s). In some embodiments, the venue owner or operator may complete a registration request. For example, the venue owner or operator may retrieve a registration request over a network (e.g., the Internet). In some embodiments, the venue owner or operator may obtain a registration request from an application. The venue owner or operator may provide the completed registration request in any number of ways including by filling in a form within a browser, by filling a form of a file (e.g., downloaded from a web site or retrieved from local storage), facsimile, and/or providing information via email, text or the like.

The registration request may include any information including an indication that the venue operator and/or owner has rights to allow the wireless network(s) associated with the venue operator and/or owner to be shared with users (e.g., one or more venue attendees) of the curated wireless network. The registration request may include, but is not required, to include a business name, zip code, email address of a person responsible for the wireless network (e.g., the venue operator or owner's email address), and password to access a registered account. In some embodiments, the registration form (e.g., sign in form) may require the venue owner or operator to accept terms and conditions and/or terms of use. In some embodiments, the venue owner or operator may be required to provide a credit card number business license, company ID (e.g., TIN), or other information to confirm the venue owner or operator identity and/or authority.

In various embodiments, the registration module 2504 generates and/or provisions an account associated with the wireless network. The account, in some embodiments, may be accessible by the venue operator, owner, or other entity utilizing the password (and/or other information) from the registration request.

As a part of a registration form and/or in order to request information for registration, the venue owner or operator may provide the registration module 2504 the pre-registration code. In some embodiments, the pre-registration code is provided as part of the registration request. In some embodiments, the pre-registration code may be provided to the registration module 2504 after the account has been created and/or provisioned (e.g., the registration module 2504 may provide a request for the pre-registration code.) As discussed herein, the pre-registration code may be associated with one or more wireless networks associated with the venue owner or operator.

The registration module 2504 may be configured to associate one or more wireless network identifiers with the registration request and/or account utilizing the pre-registration code. For example, the registration module 2404 may retrieve one or more wireless network identifiers from the pre-registration code storage 2522 based on the pre-registration code.

In some embodiments, the venue owner or operator may complete the registration request utilizing a digital device that may retrieve one or more wireless network identifiers. For example, the same digital device that provides the registration request may have access to the wireless network that is to be associated with the curated wireless network. In this example, a browser, client, software agent (e.g., via java or downloadable executable), operating system or the like may retrieve one or more wireless network identifiers from the wireless network to include with or as a part of the registration request.

In various embodiments, the venue owner or operator may request a pre-registration code at the time of or before requesting registration. For example, the venue owner or operator may browse to a web page requesting a pre-registration code before the registration process initiates. If the venue owner or operator does not have a pre-registration code, the venue owner or operator may request a pre-registration code if the venue owner's or operator's digital device is connected to or is able to otherwise scan the wireless network(s) that are to be added to the curated wireless network.

In some embodiments, the venue owner or operator may provide the one or more wireless network identifiers in or with the registration request (e.g., by manually including the appropriate information within the appropriate field(s)).

In some embodiments, the registration module 2504 generates at least one network record associated the created and/or provisioned account. The network record may identify the one or more wireless networks (e.g., utilizing the network identifier(s)), information required to access the wireless network(s), the entity (and contact information associated with the entity) that registered the wireless network(s), password for the entity to access the account, and/or the like.

The notification module 2506 is configured to receive a notification message to provide to venue attendees from the venue owner or operator. For example, the notification message may be provided to a smartphone such as an Android phone when a venue attendee accesses the wireless network via the curated virtual network. The notification message may include any text, a URL, or any other information. The notification message may encourage the venue attendee to interact with the notification to access one or more customer experience interfaces.

For example, the notification message may request the venue attendee to rate the venue, a service of the venue, or a product. The notification message may include promotions, advertisements, inducements, or the like. In some embodiments, the notification message may include offers (e.g., for products and/or services). The notification may, in some embodiments, suggest for venue attendees to leave comments, feedback regarding the venue (e.g., the facility, services or products offered, wait staff, interactions, positives, negatives, and/or the like), tips, reviews, or other content which may be directed to other attendees.

In various embodiments, the notification module 2506 receives any number of notification messages from a venue owner or operator. The notification module 2506 may receive the notification message(s) from a registration request.

In some embodiments, the notification module 2506 may receive new, modified, or otherwise updated notification messages from a venue owner or operator when they access their network record(s). For example, after registration, the venue owner or operator may access their network record (e.g., via username and/or password) to make changes. The venue owner or operator may add, delete, or update notification messages. Further, the venue owner or operator may also add, delete, or update customer experience interfaces at any time.

The customer experience module 2508 may receive selection(s) of the customer experience interface(s) to provide to the user if the user engages with or interacts with the notification message. For example, the customer experience interface may comprise a URL which allows the digital device to download an associated webpage or pop-up associated with the URL when the user engages with the notification message. The customer experience interface, as described herein, may be any interface such as a rating interface (e.g., to rate products, services, or the like), feedback interface (e.g., to allow the user to provide the venue owner or operator feedback), community wall interface (e.g., to allow the user to provide public comments to other digital device users), or interfaces for coupons, web sites, reminders, or the like.

In some embodiments, the venue owner or operator, either during registration or afterwards, may provide conditions for delivering one or more notification messages. For example, the venue owner or operator may include different notification messages and/or different customer experience interfaces. Venue attendees may receive different notification messages and/or different customer experience interfaces randomly, based on a predetermined schedule, based on events at the venue, based on the digital device to receive the notification messages and/or different customer experience, or the like. In one example, venue attendees may receive a first notification message and/or customer experience interface before a predetermined time (e.g., before 5 P.M.), a second notification message and/or customer experience interface after a second predetermined period of time (e.g., after 5 P.M.), and a third notification message and/or customer experience interface after a second predetermined period of time (e.g., after 9 P.M.). In this example, the first notification message may advertise food specials and encourage venue attendees to leave messages on a wall, while the second notification message may advertise drink specials and encourage venue attendees to rate one or more drinks A third notification message may be directed to venue entertainment (e.g., a band) and encourage users to visit the entertainment's web site.

Different notification messages and/or customer experience interfaces may also be provided based on events. In some embodiments, venue attendees that attend musical events, sports events, seasonal events or the like may receive different notification messages and/or customer experiences based on the event at the venue. For example, venue attendees that attend a sports event may receive a notification supporting a local team who is playing during the sports event and may encourage venue attendees to rate the event. Venue attendees that attend a cultural event may receive a notification of one or more exhibits and may encourage venue attendees to leave messages regarding the types of cultural events they may wish to see in the future.

In various embodiments, different notification messages and/or customer experience interfaces may be provided based on the venue attendee and/or the venue attendee's digital device. Different digital devices may receive different notification messages and/or customer experience interfaces. For example, different hardware or operating systems of the digital device may receive notification messages and/or customer experience interfaces. Further, in some embodiments, a venue attendee may be associated with a loyalty program, is a member of a group, or has requested special treatment. When the venue attendee accesses the wireless network utilizing the curated wireless network, the venue attendee device may provide a device or client identifier. The virtual network server 2500 (e.g., the client interaction module 2514) may compare the device or client identifier received from the venue attendee device to the conditions to determine if the venue attendee is to receive one or more predetermined notification messages (e.g., offering greater discounts or providing information that is not for general distribution). In some embodiments, venue attendee who perform certain acts (e.g., make purchases, indicate a Facebook "like") may receive select notification messages (e.g., messages of appreciation) and select customer experience interfaces (e.g., special offers). In some embodiments, limited services may be provided for users depending upon whether the user performs select actions (e.g., makes purchases or perform a Facebook "like").

The authentication module 2510 is configured to authenticate a venue owner or operator or venue attendee. In some embodiments, after the venue owner or operator provides a password, username, and/or other credentials to the registration module 2504 (e.g., via the registration request), the registration module 2504 may store the password, username, and/or other credentials in or with the associated network record. Before the venue owner or operator accesses the network record, the authentication module 2510 may confirm, authenticate, and/or verify the password, username, identity (e.g., via credit card information) and/or other credentials provided by the venue owner or operator with the information within or associated with the network record.

The authentication module 2510 may also authenticate the venue attendee before allowing the venue attendee to access the curated virtual network and/or the venue wireless network. In some embodiments, the venue attendee may provide a password, username, and/or other credentials to the virtual network server 2500 and/or device associated with the curated virtual network. The authentication module 2510 may confirm, authenticate, and/or verify the password, username, and/or other credentials prior to allowing the venue attendee access to the curated virtual network and/or the wireless network.

The virtual network communication module 2512 may communicate with the curated virtual network, other devices (e.g., other virtual network servers), venue attendee devices, and venue owner or operator devices. In some embodiments, the virtual network communication module 2512 provides a venue attendee or any user one or more wireless network identifiers and/or login information. The wireless network identifiers may identify any wireless network. For example, the wireless network may include an SSID and/or BSSID. The login information may comprise username, password, and/or login procedure information (e.g., to automatically provide information to an access point to allow access to a wireless network). For example, the login information may allow the venue attendee device (e.g., via a client on the venue attendee device) to auto-fill forms, click buttons, check boxes, click-through pages, and/or automatically provide inputs to web pages to provide to the access point to obtain wireless network access.

In various embodiments, the virtual network communication module 2512 receives an indication that a venue attendee device has obtained access to an access device associated with a wireless network of the curated virtual network. For example, the virtual network communication module 2512 may receive an access indication may comprise a wireless network identifier as well as a venue attendee device identifier. The access indication may be provided by the venue attendee device to the virtual network communication module 2512. In one example, a client on the venue attendee device may provide the access indication when the venue attendee device connects and/or scans one or more wireless network(s). The client on the venue attendee may provide a wireless network identifier (e.g., SSID or BSSID) as well as a venue attendee identifier (e.g., a unique identifier, email address, MAC address, notification identifier, location information, and/or other address information). The virtual network communication module 2512 may retrieve a network record associated with the wireless network identifier.

In various embodiments, the notification module 2506 retrieves one or more notification messages from or associated with the network record. The notification module 2506 may provide the one or more notification messages to the digital device (e.g., venue attendee device). Similarly, the customer experience module 2508 may retrieve one or more customer experience interfaces from the network record and provide the one or more customer experience interfaces to the digital device or may wait to provide the one or more customer experience interfaces unless or until the notification message is engaged. If the notification message is engaged (e.g., selected or clicked on by a user), the notification message may retrieve or otherwise request the customer experience interface.

The client interaction module 2514 may receive information from the user associated with the customer experience interface(s). For example, the customer experience interface provided to one or more users may allow the user to rate products, provide feedback, input comments, or the like. The client interaction module 2514 may receive the ratings, feedback, comments, or any other input. In some embodiments, the client interaction module 2514 averages or assesses (e.g., performs any function) on information collected from any number of users for a venue or a collection of related venues (e.g., a chain, franchise, common facility, or the like). For example, the client interaction module 2514 may determine an average rating of a product, service, or venue over a plurality of users over a predetermined period of time.

The quality of experience (QoE) module 2516 may determine or assist in determining the quality of the performance or other experiences with the wireless network. The QoE module 2516 may determine or assist in determining any number of indicators of performance such as, but not limited to latency, jitter, speed, signal strength, and/or radio frequency signal to noise ratio. In various embodiments, the QoE module 2516 may combine these indicators of performance into any number of indicators. For example, the QoE module 2516 may blend (e.g., average and/or assess) any number of factors including, for example, but not limited to, latency, jitter, speed, signal strength, and/or radio frequency signal to noise ratio to generate a quality of experience (QoE) metric for any number of users over any length of time.

The QoE module 2516 may provide the QoE metric and/or other measures for any number of venue attendees to the venue owner or operator (e.g., via the owner feedback module 2518. For example, the QoE module 2516 may average or aggregate the QoE metric, latency, jitter, speed, signal strength, and/or radio frequency signal to noise ratio for any number of users (e.g., over a predetermined period of time). The QoE module 2516 may provide the average(s) and/or aggregation(s) to the venue owner or operator.

In some embodiments, the QoE module 2516 may compare the QoE metric, latency, jitter, speed, signal strength, and/or radio frequency signal to noise ratio strength to similar measures of other businesses (e.g., peers such as small or medium sized businesses) to generate a peer qualitative metric. In some embodiments, the QoE module 2516 may compare the QoE metric, latency, jitter, speed, signal strength, and/or radio frequency signal to noise ratio to a standard of overall performance.

Those skilled in the art will appreciate that a venue may be, for example, any facility, combination of facilities, campus, chain, individual franchise, stadium, or store. A venue may be a single location or may comprise a plurality of locations (e.g., a chain or variety of different types of venues with the same owner).

In some embodiments, the owner feedback module 2518 averages ratings, feedback or any information from any number of users from a subset of related venues to provide to one or more related venue owner or operator. In various embodiments, the venue owner or operator may indicate preferences for how feedback is to be provided (e.g., over a number of related venues that the venue owner or operator may have authority).

The secure share module 2520 may receive secure network information (e.g., encryption keys, passwords, and the like) associated with any number of secured wireless networks. The secure share module 2520 may receive the secure network information (e.g., security information) from the venue owner or operator during registration. The secure share module 2520 may store or associate the secure network information with the network record. In various embodiments, the secure network information is stored in the curated virtual network via the virtual network communication module 2512. The secure share module 2520 may provide any amount of the secure network information to any number of digital devices which may store the information until the digital device accesses the secured wireless network.

In some embodiments, the secure share module 2520 provides at least some of the secure network information to a limited number of digital devices. In various embodiments, the secure share module 2520 determines a likelihood that the digital device may access the secured wireless network before providing the secure network information. For example, the secure share module 2520 may provide at least some secure network information to digital devices that are physically located within a predetermined distance to the secure wireless network. The secure share process is further described herein.

The pre-registration code storage 2522 and the network record storage 2524 are any form of storage and/or data structures (e.g., databases, tables, or the like). The pre-registration code storage 2522 may comprise pre-registration codes and associated wireless network identifiers as well as, in some embodiments, venue owner or operator address information (e.g., email and/or phone), wireless network location information, or the like. The network record storage 2524 may store network records that comprise venue owner or operator information (e.g., name, username, password, address, and the like), notifications messages, customer experience interface selections, related venues, and the like.

In various embodiments, if a wireless network is not associated with a network record (e.g., the wireless network identifier(s) are not sufficiently distinct), the virtual network server 2500 may provide one or more default notification messages and related customer experience interfaces to a digital device (e.g., a digital device with a client that provides the wireless network identifier(s) to the virtual network server 2500). In some embodiments, the notification message and/or the customer experience interface may be different for different sized venues, for home use, for business networks, or the like.

Figure 26:
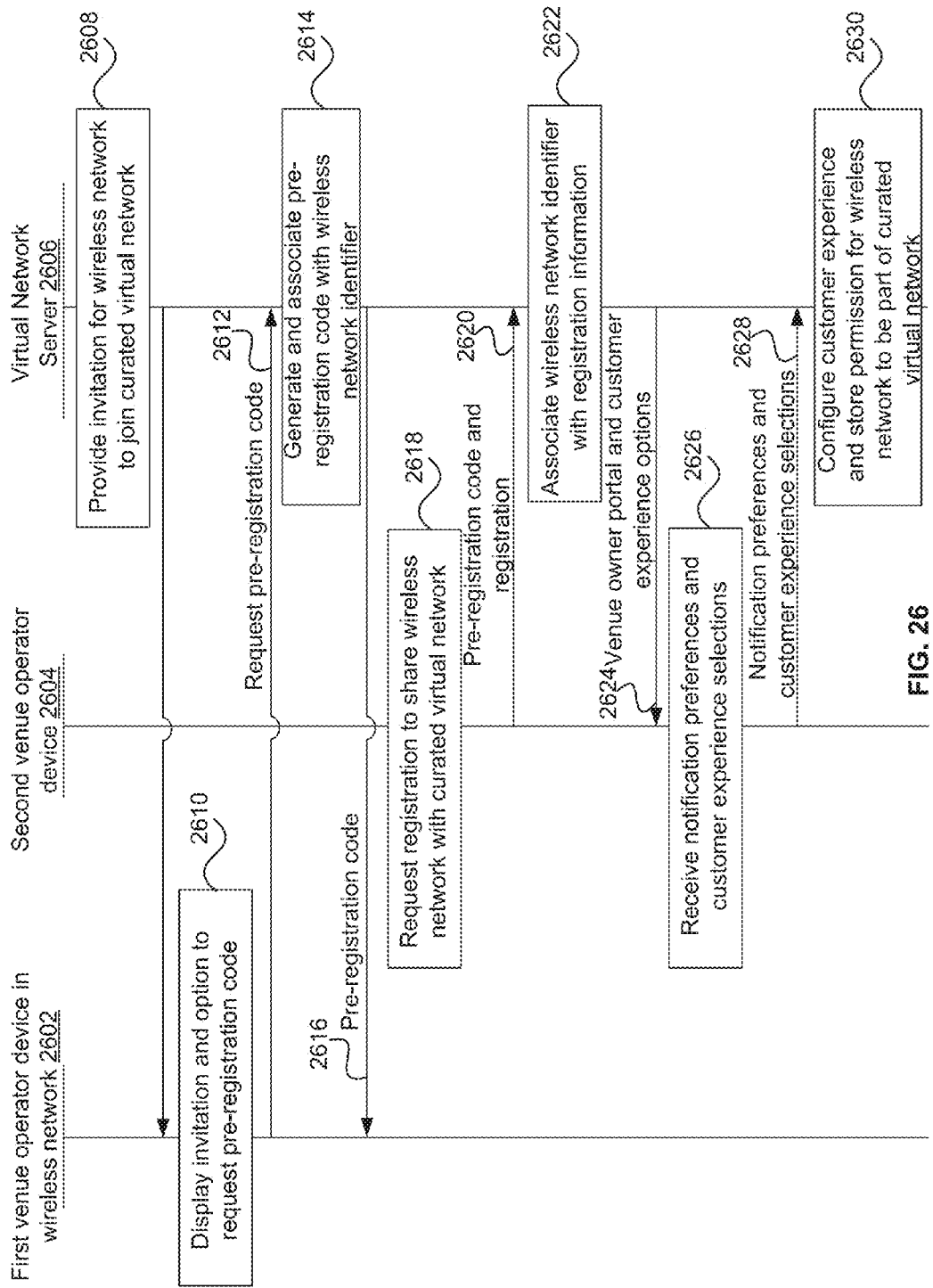
FIG. 26 is a flow diagram depicting a venue operator registration process in some embodiments.

FIG. 26 is a flow diagram 2600 depicting a venue operator registration process in some embodiments. In flow diagram 2600, the first venue operator device in a wireless network 2602 may request and receive a pre-registration code from a virtual network server 2606. In some embodiments, the second venue operator device 2604 utilizes the pre-registration code to register the wireless network with the virtual network. The virtual network server 2606 may be a part of the virtual network system discussed herein.

In step 2608, the virtual network server 2606 may provide an invitation for a wireless network to be permitted to be shared as a part of the curated virtual network. For example, the first venue operator device in the wireless network 2602 may browse to a web page that displays the invitation. In some embodiments, the first venue operator device in the wireless network 2602 may be operated by the venue owner or operator. In some embodiments, the first venue operator device in the wireless network 2602 comprises the client as discussed herein (e.g., a client that allows the digital device to connect with wireless networks that are intentionally or expected to be shared as a part of a curated virtual network). The client may, for example, display the invitation or an option to display the invitation if the first venue operator device scans or is connected to a network that is not a part of the curated virtual network In another example, the first venue operator device in the wireless network 2602 may be a venue attendee device that is connected to the wireless network. The venue attendee may, either through the venue attendee browsing or through a client on the venue attendee device, receive the option to display an invitation for the wireless network to be permitted to be shared (e.g., a link to the invitation and a message to encourage the attendee to show the invitation to the venue owner or operator).

The virtual network server 2606 may provide the invitation to the first venue operator device in the wireless network 2602.

In step 2610, the first venue operator device in the wireless network 2602 (or venue attendee device) may display the invitation and an option to request the pre-registration code. The invitation may require a requestor of the pre-registration code to confirm that they are a venue owner or operator empowered to share the wireless network with the curated virtual network.

In step 2612, the first venue operator device in the wireless network 2602 provides the pre-registration code request (e.g., the pre-registration request) to the virtual network server 2606. In some embodiments, when the user of the first venue operator device in the wireless network 2602 selects the option to request the pre-registration code, the first venue operator device in the wireless network 2602 may scan for wireless network identifiers of the connected wireless network and provide the wireless network identifiers with the pre-registration code request to the virtual network server 2606. In various embodiments, the first venue operator device in the wireless network 2602 may download functionality associated with the invitation that may retrieve the wireless network identifiers. In some embodiments, a client on the first venue operator device in the wireless network 2602 may perform the functionality.

In step 2614, the pre-registration module 2502 may receive the pre-registration code request. In response to the request, the pre-registration module 2502 may generate a pre-registration code and associate the pre-registration code with the wireless network identifier(s). The pre-registration module 2502 may store the pre-registration code and the associated wireless network identifier(s) in the pre-registration code storage 2522.

In step 2616, the pre-registration module 2502 may provide the pre-registration code to the first venue operator device in the wireless network 2602. The pre-registration code may be displayed on the first venue operator device in the wireless network 2602, stored in the first venue operator device in the wireless network 2602, and/or provided to another digital device (e.g., if the venue owner or operator provided another digital device identifier or email address with the pre-registration code request). For example, the pre-registration module 2502 may provide the pre-registration code to the second venue operator device 2604.

In step 2618, the second venue operator device 2604 requests registration to provide permission to share the wireless network with the curated virtual network (e.g., provide permission with users of the curated virtual network access to the wireless network. In some embodiments, venue owner or operator utilizes the second venue operator device 2604 to retrieve a registration web page from the virtual network server 2606 (e.g., from the registration module 2504). The venue owner or operator may provide the pre-registration code as well as permission for users of the curated virtual network to access the wireless network. The venue owner or operator may also provide a username, password, or other information to set up an account associated with the virtual network server 2606. The account may be utilized to control access to the wireless network, create notification messages, and/or control customer experiences associated with notification message engagement.

In step 2620, the second venue operator device 2604 may provide the pre-registration code and the other information to the virtual network server 2606. In some embodiments, the pre-registration module 2502 or the registration module 2504 may retrieve wireless network identifier(s) from the pre-registration code storage 2522 based on the pre-registration code.

In step 2622, the registration module 2504 may create and/or provision an account. For example, the registration module 2504 may associate the venue owner or operator information with the wireless network identifier(s). The registration module 2504 may create a network record indicating the account, wireless network identifier(s), venue owner or operator information, and/or any other information. The network record may be stored by the registration module 2504 in the network record storage 2524.

In step 2624, the notification module 2506 and/or the customer experience module 2508 provide a venue owner portal to allow the venue owner or operator to make selections and/or create notification message(s) and/or customer experience interface(s). For example, the venue owner portal may be a webpage, pop-up, form, or the like. The venue owner portal may allow the venue owner or operator to create one or more notification message(s) and/or selection from pre-created notification message(s). Further the venue owner or operator may select any number of customer experience interface(s) (e.g., to rate a venue, product, or service).

In step 2626, the second venue operator device 2604 receives the venue owner or operator's selections and/or input related to notification message(s) and/or customer experience(s). In one example, the venue owner or operator may enter a brief welcome and an encouragement to try a service or beverage. The venue owner or operator may also determine the customer experience that will result when a user interacts with the notification message. For example, the venue owner or operator may determine that if the venue attendee interacts with the notification message, a web page, pop-up, or other information may be provided. The customer experience interface may, for example, allow a user to enter comments on community wall, provide feedback to the venue owner or operator, and/or be delivered to a web page on the Internet.

In step 2628, the second venue operator device 2604 provides the venue owner portal selections and input to the virtual network server 2606, In step 2630, the virtual network server 2606 configures the notification message(s), the customer experience(s), and/ or provides expression permission to share the wireless network as a part of the curated virtual network. In some embodiments, the notification module 2506 may store the notification message(s) from the venue owner or operator with or in the associated network record and the customer experience module 2508 may store the customer experience determinations and/or selections from the venue owner or operator with the associated network record.

In various embodiments, as venue attendee devices connect to the wireless network, they may provide connection information (e.g., identifying the wireless network that is connected to the venue attendee device) to the virtual network server 2606. The virtual network communication module 2512 may retrieve the network record associated within wireless network identifier(s) from the connection information and to provide associated notification message(s) to the venue attendee devices. The client interaction module 2514 may receive an indication from the venue attendee device that the user of the venue attendee has interacted (e.g., clicked or selected) or otherwise engaged the notification message. The client interaction module 2514 may provide any number of associated customer experience interfaces (e.g., based on the network record for the wireless network) to the user of the venue attendee device.

Figure 27B:
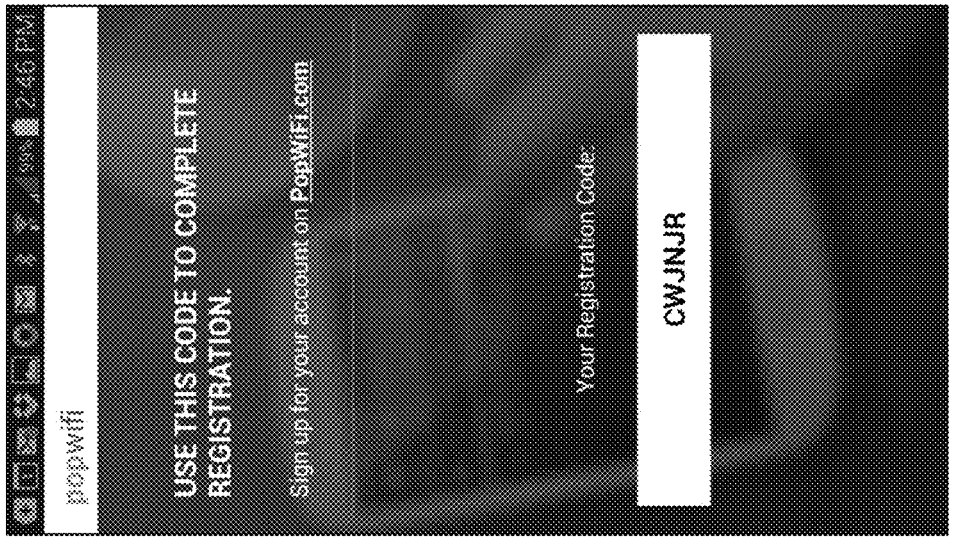
FIGS. 27a and 27b depict screen shots or interfaces of a mobile device requesting and receiving a pre-registration code in some embodiments.
Figure 27A:
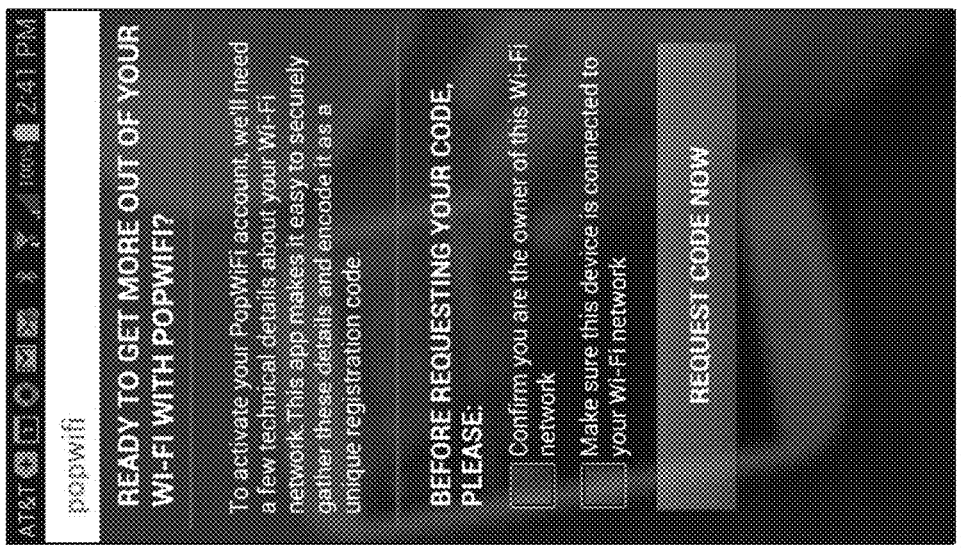

FIGS. 27*a* and 27*b* depict screen shots of a mobile device requesting and receiving a pre-registration code in some embodiments. FIG. 27*a* depicts a screen shot of a web page or interface (e.g., Android interface) offering a venue owner or operator an opportunity to obtain a pre-registration code. The web page or interface may be locally stored or accessible from another digital device (e.g., via a network). In some embodiments, the web page or interface is on a digital device such as a mobile phone. The digital device may be connected to the wireless network which the venue owner or operator may provide permission to be shared as a part of the curated virtual network. As indicated in the screen shot, the venue owner or operator may confirm their status or the owner or operator of the wireless network and may confirm that the digital device displaying the screen shot is connected to the wireless network that the venue owner or operator may provide permission to be shared. Once confirmed, the venue owner or operator may request the pre-registration code.

As discussed herein as well as on the web page, by requesting the pre-registration code, the venue owner or operator is allowing the digital device (e.g., utilizing an executable file downloaded by the digital device) to send one or more wireless network identifiers regarding the connected network to the virtual network server 2500. The one or more wireless network identifiers may be utilized by the virtual network server 2500 to generate and/or encode as a pre-registration code. Those skilled in the art will appreciate that the pre-registration code may or may not be unique.

FIG. 27*b* depicts a web page or interface providing the pre-registration code from the virtual network server 2500. In some embodiments, after the venue owner or operator confirms that the venue owner or operator is the owner or operator of the wireless network and that the digital device is connected to the wireless network, the venue owner or operator may request a pre-registration code. In response to the pre-registration request, the digital device may receive and display a pre-registration code (e.g., "CWNJNJR").

After receiving the pre-registration code, the venue owner or operator may, at any time, submit a request for registration information and provide the pre-registration code as a part of the registration process (e.g., the pre-registration code may accompany the venue owner or operator's name, email address, preferred password to access an account and control different functionality and the like).

Figure 28:
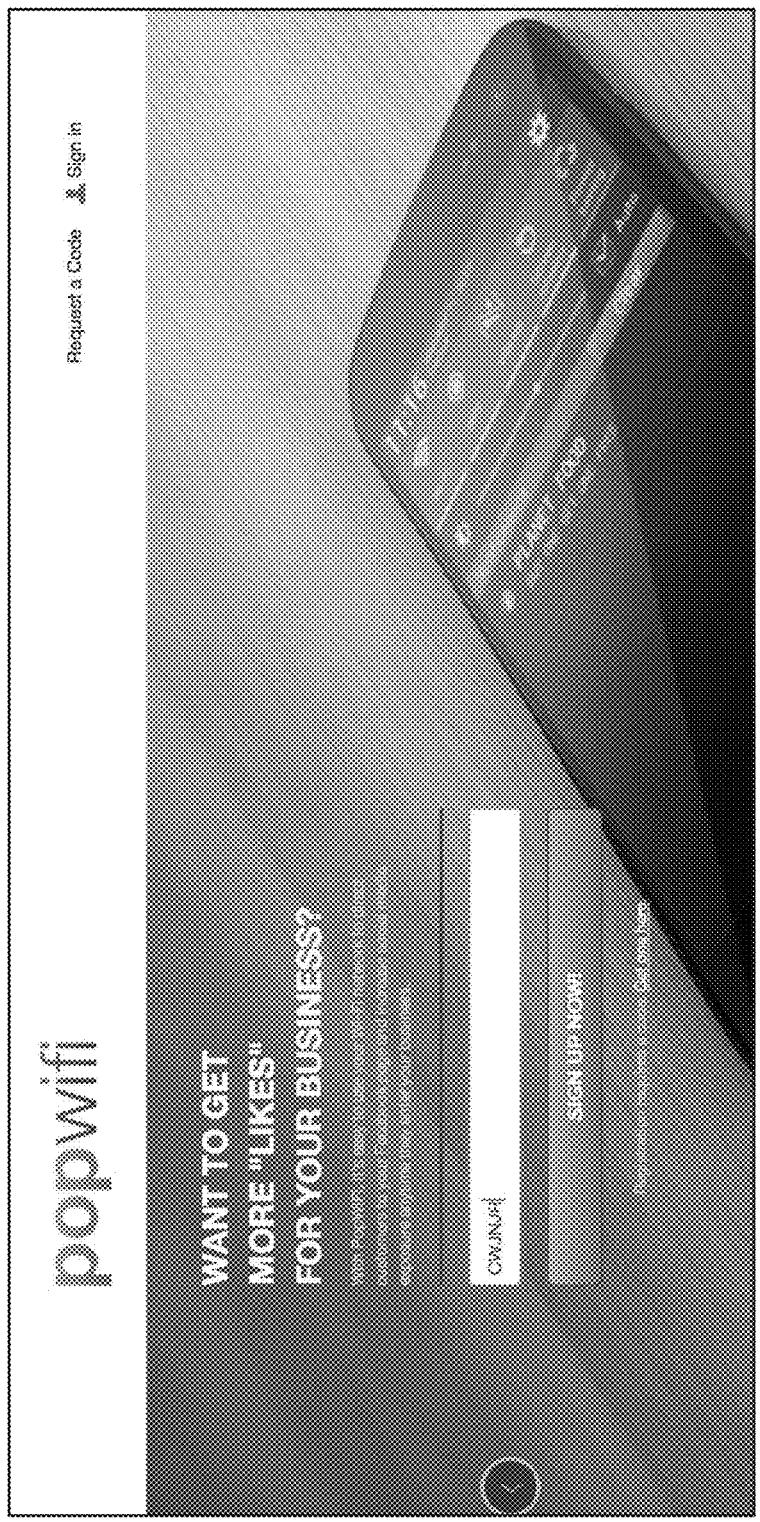
FIG. 28 depicts a screen shot or interface for a venue operator to request registration of a wireless network in some embodiments.

FIG. 28 depicts a screen shot or interface for a venue operator to request registration of a wireless network in some embodiments. FIG. 28 depicts a web page or interface for requesting registration of a wireless network. In some embodiments, the venue owner or operator may access the web page or interface for requesting registration on any digital device. For example, the venue owner or operator may register the wireless network on a digital device that is not connected to the wireless network. Since the pre-registration code may already be associated with one or more wireless network identifiers, by providing the pre-registration code, the venue owner or operator is providing the wireless network identifiers (e.g., which may be retrieved from the pre-registration code storage and/or the network record storage).

If the venue owner or operator does not have a pre-registration code, the venue owner or operator may provide a request for the pre-registration code. In some embodiments, before the pre-registration code may be provided, the venue owner or operator may be required to confirm that the digital device is connected to the wireless network that the venue owner or operator intends to provide express permission to be shared.

In some embodiments, a venue owner or operator may log into their account (e.g., authenticated by the virtual network server) to make changes such as additions, updates, or deletions of notifications and/or customer experience interfaces. The venue owner or operator may, in some embodiments, access their account through the registration request webpage or interface depicted in FIG. 28.

Those skilled in the art will appreciate that examples including web pages or interfaces are discussed herein, the web page(s) or interface(s) which allow the venue owner or operator to request a pre-registration code, retrieve wireless network identifiers, provide the pre-registration request to the virtual network server, complete registration information, and the like may be provided by a client or agent on the digital device.

Figure 29:
FIG. 29 is a screen shot or interface for a sign up interface in some embodiments.

FIG. 29 is a screen shot for a sign up web page or interface in some embodiments. In some embodiments, after the venue owner or operator requests the registration page, the venue owner or operator may be provided the sign up web page or interface. The venue owner or operator may provide a business name, zip/postal code, passwords and/or an indication that the venue owner or operator has the right to provide permission to share one or more wireless network(s) as a part of the curated virtual network. Those skilled in the art will appreciate that the venue owner or operator may provide any, more, or less information than that depicted in the exemplary sign up interface depicted in FIG. 29.

The venue owner or operator may also create and/or provision an account. The provisioned account and/or network record may include any and/or all information provided in the sign-up interface as well as the wireless network identifier(s), and pre-registration code. Included and/or associated with the provisioned account and/or network record may be past user's success or failure in accessing the wireless network prior to registration.

Figure 30:
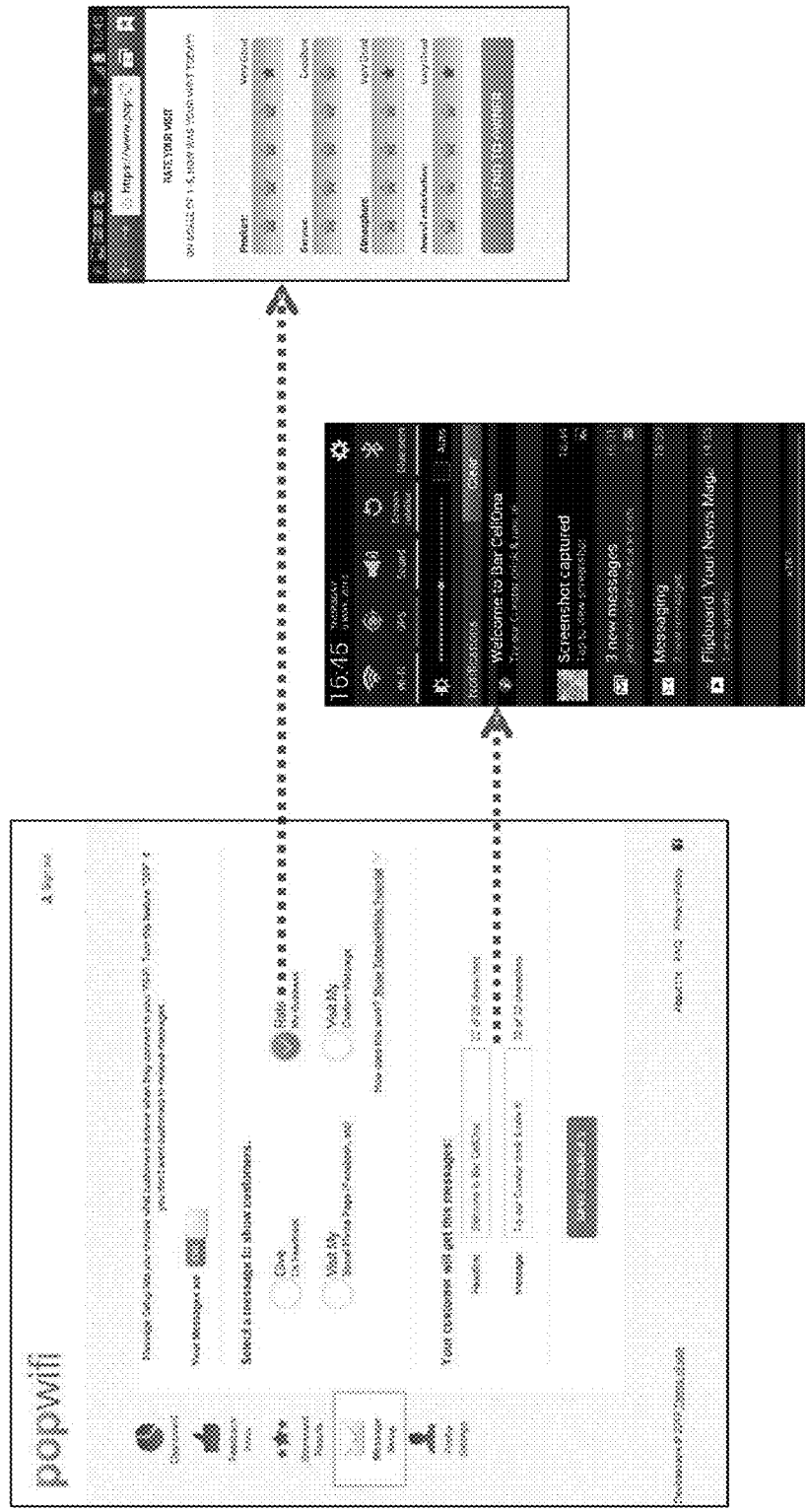
FIG. 30 depicts screen shots or interfaces for venue operator registration and options to control a notification message and customer experience preferences in some embodiments.

FIG. 30 depicts screen shots or interfaces for venue operator registration and options to control a notification message and customer experience preferences in some embodiments. In various embodiments, after the venue owner or operator has registered the wireless network, the venue owner or operator may configure the notification message(s) as well as the customer experience interface that customer may receive if they engage with the notification message.

For example, a venue owner or operator may select from a limited number of options and/or input a headline and a message that may be displayed on digital device (e.g., a mobile Android smartphone). In one example, as depicted in FIG. 30, the venue owner or operator chose the headline "Welcome to Bar CellOna" as well as the message "try our Curator drink & rate it!" The venue owner or operator may change the headline and/or message at any time.

The venue owner or operator may also select one or more customer experience interfaces should the receiver of the notification message interacts with the notification message. In one example, the venue owner or operator may select among any number of customer experience interfaces including an interface to provide feedback, an interface to encourage visitation to a social media page, an invitation to visit other accessible web sites or information, a community wall, or a rate interface for attendees to rate the different aspects (e.g., product, service, atmosphere, and overall satisfaction).

In some embodiments, the venue owner or operator may also utilize the web page or interface depicted in FIG. 30 to review ratings. The ratings may be averaged or otherwise assessed for any number of people over a predetermined period of time. The venue owner or operator may also utilize the web page or interface to receive feedback inbox and/or dashboard which may summarize the information provided on other pages. The dashboard may also indicate the number of people who have successfully connected to the wireless network.

Figure 31:
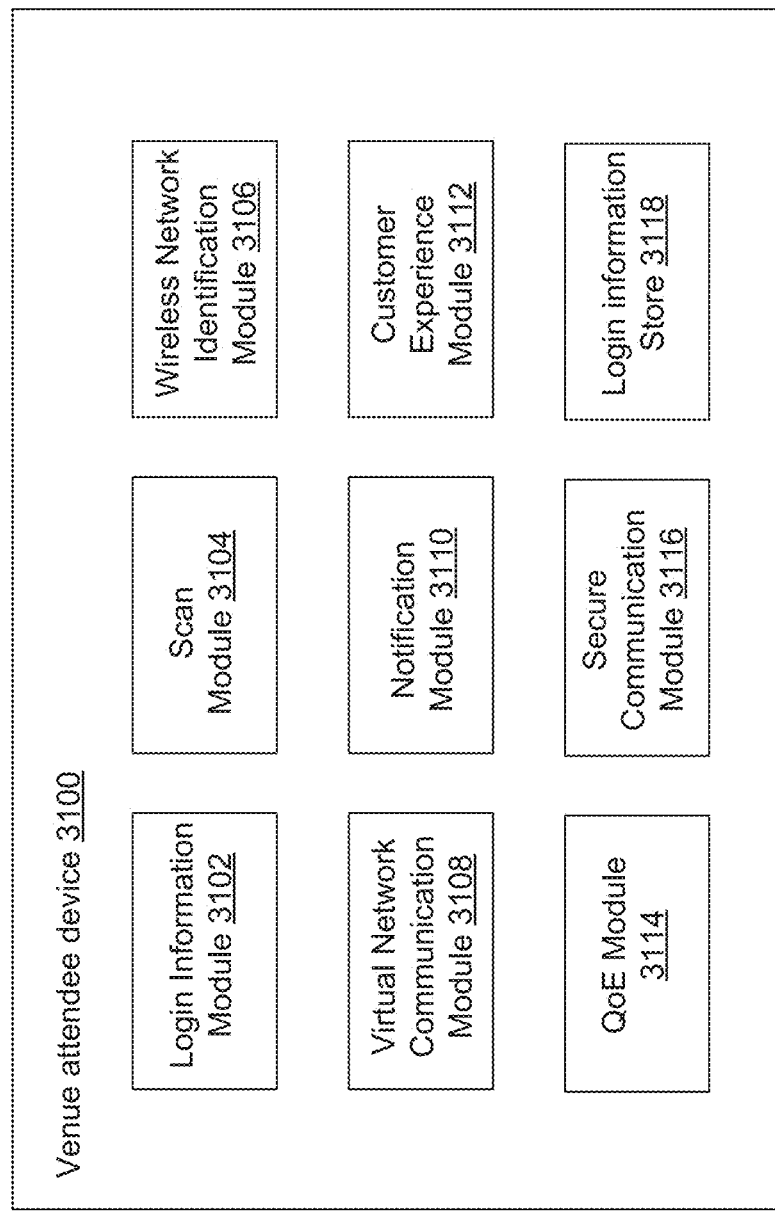
FIG. 31 is a block diagram of a venue attendee device in some embodiments.

FIG. 31 is a block diagram of a venue attendee device 3100 in some embodiments. The venue attendee device 3100 may comprise a login information module 3102, a scan module 3104, a wireless network identification module 3106, a virtual network communication module 3108, a notification module 3110, a customer experience module 3112, a QoE module 3114, a secure communication module 3116, and a login information store 3118. The venue attendee device 3100 may be the venue attendee device 2404.

In various embodiments, the venue attendee device 3100 comprises a client that may perform any or all of the functionality of the login information module 3102, the scan module 3104, the wireless network identification module 3106, the virtual network communication module 3108, the notification module 3110, the customer experience module 3112, the QoE module 3114, the secure communication module 3116, and the login information store 3118. The client may be or include one or more application(s) (e.g., from an appstore) and/or operating system functionality. In some embodiments, all or part of the functionality of the venue attendee device 3100 may be downloaded from a network and/or included as a webapp (e.g., java script or the like) downloaded from a network (e.g., with a webpage downloaded from the Internet).

The login information module 3102 may control all or some of the functionality of the venue attendee 3100. In some embodiments, the scan module 3104 scans for available wireless networks. The wireless network identification module 3106 may retrieve wireless network identifier(s) from any number of the scanned available wireless networks.

In various embodiments, the login information module 3102 may connect to one of the wireless networks. In some embodiments, the login information module 3102 compares the identified wireless network(s) from the wireless network identification module 3106 to a list of acceptable and/or "safe" wireless network previously received from the virtual network system. The login information module 3102 may connect to a wireless network associated with an acceptable and/or "safe" wireless network associated with the list.

If none of the wireless networks identified by the wireless network identification module 3106 is associated with the list or the venue attendee device 3100 does not have a list, the login information module 3102 may select and connect to a wireless network.

The virtual network communication module 3108 may, in some embodiments, provide the wireless network identifier(s) of the connected wireless network to the virtual network system. The virtual network system may determine if there is a network record associated with the wireless network identifier(s) from the virtual network communication module 3108. If there is a network record associated with the wireless network identifier(s), the virtual network system may provide the venue attendee device 3100 with one or more notification message(s) and/or one or more customer experience interface(s).

If the virtual network system determines there is not a network record associated with the wireless network identifier(s) from the virtual network communication module 3108, the virtual network system may provide a pre-registration invitation. For example, the virtual network server may provide a notification message inviting a venue owner or operator to register or pre-register the wireless network with the virtual network server and/or the curated virtual network. In this example, the venue attendee device 3100 may receive a notification indicator which indicates a notification message is received. The notification message may encourage the venue attendee to find a venue owner or operator and display the pre-registration invitation. The venue owner or operator may confirm that they are an owner or operator and request a pre-registration code. The wireless network identification module 3106 may provide the wireless network identifier(s) associated with the connected network with the pre-registration code request to the virtual network system.

Notification module 3110 may receive one or more notification messages associated with the wireless network. For example, the virtual network server may provide one or more notification messages to the venue attendee device 3100. In some embodiments, the notification module 3110 may trigger a notification indication on the venue attendee device 3100. When the user of the venue attendee device 3100 reviews notification messages, the notification module 3110 may display the notification message.

The customer experience module 3112 may provide or link to one or more customer experience interface(s) when the user engages with the notification message from the notification module 3110. In some embodiments, the customer experience module 3112 detects when the user selects, clicks on, or otherwise engages with the notification message. The customer experience module 3112 may trigger a browser, pop-up, or any application to display one or more customer experience interfaces. In some embodiments, the customer interfaces are loaded on the venue attendee device 3100 locally. In various embodiments, the customer experience module 3112 provides a URL to a browser to browse for a web page or other information to display to the venue attendee of the venue attendee device 3100.

In various embodiments, the customer experience module 3112 may also receive information from the venue attendee associated with the customer experience interface(s). For example, a venue attendee may provide comments, feedback, ratings, or the like. The customer experience module 3112 may provide the received information to the virtual network system. The virtual network system may provide some or all information to the venue owner or operator of the wireless network. In some embodiments, information from a plurality of users (e.g., venue attendees, users at different related locations such as at different locations of a chain, or the like) may be aggregated or assessed (e.g., averaged). The aggregated or assessed information may be provided to the venue owner or operator of the wireless network.

The QoE module 3114 may assist in determining a quality of experience associated with the connected wireless network. In various embodiments, the QoE module 3114 may assist the virtual network system in determining any number of indicators of performance of the connected wireless network such as, but not limited to, latency, jitter, speed, signal strength, and/or radio frequency signal to noise ratio of the venue attendee 3100 communication over the wireless network and/or related network(s).

In some embodiments, the QoE module 3114 may trigger or otherwise display a request for the venue attendee to provide their input (e.g., comments and/or selections of quality) regarding the quality of the experience using the connected wireless network. The input from the user (e.g., the user QoE information) may also be provided to the virtual network system to assist in assessing the quality of the user experience for the wireless network and/or to provide to the venue owner or operator.

The secure communication module 3116 may receive security information (e.g., encryption keys, passwords, and the like from the virtual network system. In some embodiments, the scan module 3104 may identify a secure wireless network. Based on the wireless network identifier, the secure communication module 3116 may determine if the venue attendee device 3100 has access to any security information. If there is security information, the secure communication module 3116 may provide encryptions keys, passwords, login procedural information and the like. The secure share process is further described herein.

The login information store 3118 is any data structure (e.g., database, table or the like) that may store login information associated with any number of wireless networks. In some embodiments, the login information store 3118 is optional.

Figure 32:
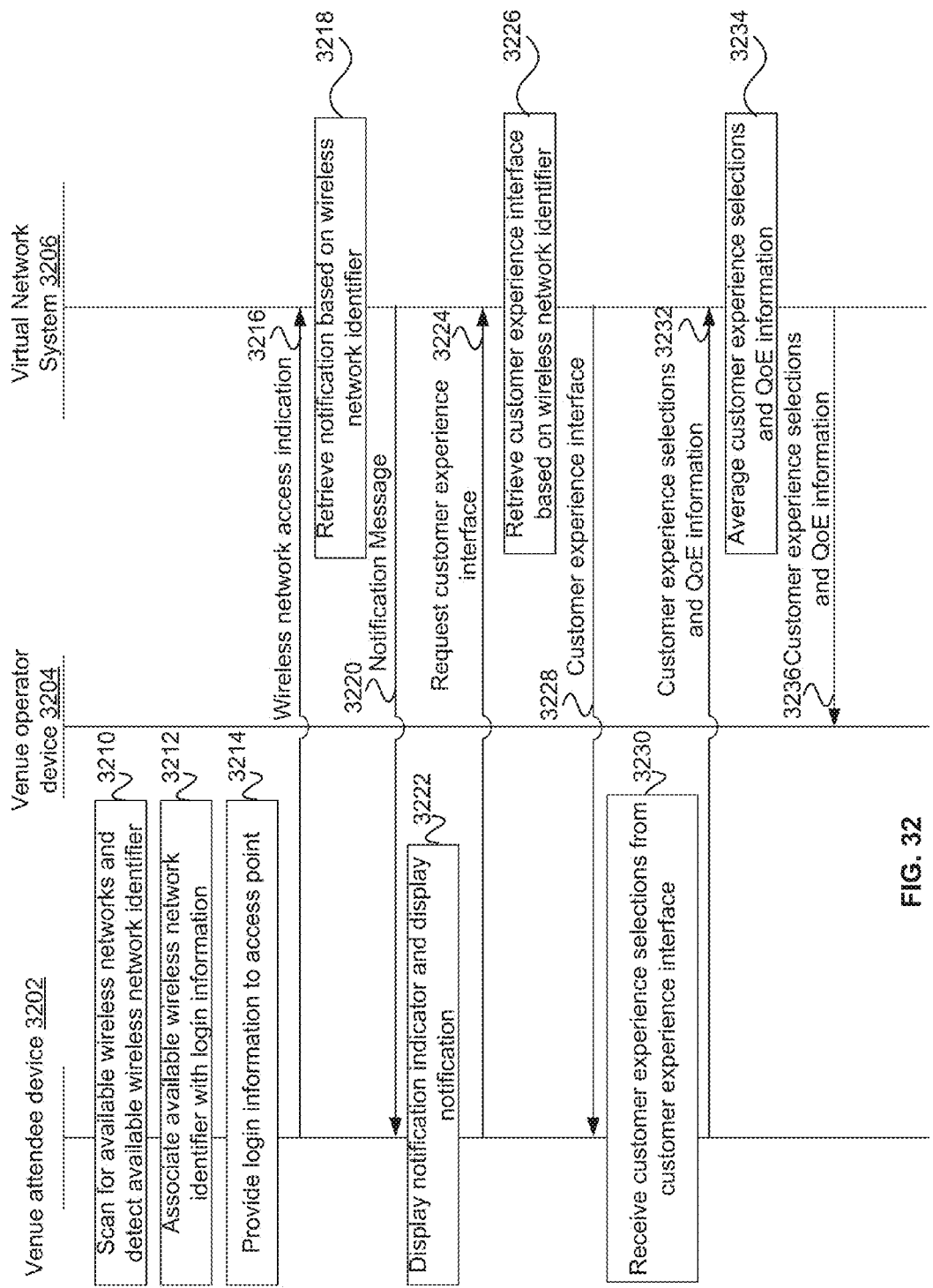
FIG. 32 is a flow diagram depicting a venue attendee device accessing a wireless network as a part of the virtual network system and providing feedback to the venue operator device in some embodiments.

FIG. 32 is a flow diagram 3200 depicting a venue attendee device 3202 accessing a wireless network as a part of a curated virtual network and providing feedback to the venue operator device 3204 in some embodiments. The venue attendee device 3202 may be the venue attendee 3100. The virtual network system 3206 may be or comprise the virtual network server 2500 and/or the virtual network server 2606.

In step 3210, the scan module 3104 of the venue attendee device 3202 may scan for and detect available wireless networks. The wireless network identification module 3106 may provide identify and/or otherwise retrieve wireless network identifier(s) associated with available wireless networks. In some embodiments, the wireless network identification module 3106 retrieve wireless network identifiers for wireless network connected to the venue attendee device 3202.

In optional step 3212, the login information module 3102 may associate one or more available wireless network identifiers from the scan module 3104 and/or the wireless network identification module 3106 with login information. In some embodiments, login information may be provided by the virtual network system 3206 (e.g., periodically, upon detection of proximity of wireless network(s), and/or upon request). In some embodiments, the login information module 3102 receives requirements of login information (e.g., a login page) from a network device associated with the wireless network and requests information from the user (e.g., by providing the login page).

The user may manually provide the login information. For example, the user may provide a username, password, acknowledge terms and conditions, and/or click through advertisements or other pages to access the network. The venue attendee device 3202 may provide the login information from the user and/or the virtual network system 3206 to the network device associated with the wireless network to obtain access.

In step 3216, the virtual network communication module 3108 provides a wireless network access indication to the virtual network system 3206. The wireless network access indication may comprise the wireless network identifier(s) from the wireless network identification module 3106.

In step 3220, the virtual network system 3206 provides a notification message to the venue attendee device 3202. In some embodiments, the virtual network system 3206 retrieves a network record associated with the wireless network identifier(s) from the wireless network identification module 3106. The network record may be retrieved from a network record store. The network record may associate one or more notification message(s) and one or more customer experience interface(s) with the wireless network based on the wireless network identifier(s).

In step 3220, the virtual network system 3206 provides the notification message(s) to the venue attendee device 3202. The notification module 3110 may trigger a notification indication when there is one or more notification messages received and display the notification message if the user accesses notifications. If the user (e.g., venue attendee) accesses the indicator, the venue attendee may display the notification message(s) in step 3222.

In some embodiments, the customer experience module 3112 of the venue attendee 3202 monitors interaction and/or engagement with the notification message(s). If the venue attendee interacts with the notification message, the customer experience module 3112 may request a customer experience interface from the virtual network system 3206 in step 3224.

In some embodiments, when a notification message is engaged, a browser may be executed and the browser directed to a predetermined URL associated with the notification message (e.g., the customer experience interface may be a web page). In various embodiments, one or more customer experience interfaces (e.g., a rating interface, a community wall interface, an advertisement interface, or the like) may be provided to the venue attendee device 3202. The customer experience module 3112 may retrieve the previously provided customer experience interface(s) when the user engages with one or more of the notification modules. In some embodiments, the customer experience module 3112 may retrieve customer experience interface(s) from the virtual network system 3206 when the user engages with one or more of the notification modules.

The virtual network system 3206 may retrieve the customer experience interface based on the wireless network identifier(s) in step 3226. In some embodiments, one or more customer experience interface(s) may be provided to the venue attendee device 3203 at the same time that notification message(s) are provided, after notification message(s) are provided, before the notification message(s) are engaged, or after the notification message(s) are engaged.

In step 3228, the virtual network system 3206 provides the customer experience interface(s) to the venue attendee device 3202 where the interface may be displayed to the user. In some embodiments, in step 3230, the user may provide feedback, ratings, or comments that may be provided by the venue attendee to the virtual network system 3206. The venue attendee may then provide all or some of the feedback, ratings, or comments to the venue operator device 3204 as a part of step 3232.

In some embodiments, the QoE module 3114 may assist the virtual network system 3206 to determine a quality of experience. The QoE module 3114 may assist the virtual network system 3206 by providing a user's latency, jitter, speed, signal strength, and/or radio frequency signal to noise ratio to the virtual network system 3206 also in step 3232. In some embodiments, the QoE module 3114 may also receive user comments and/or ratings regarding the quality of performance in connectivity with the wireless network. The comments and/or ratings may be provided to the virtual network system 3206.

In step 3234, the virtual network system 3206 may assess QoE information (e.g., the user's latency, jitter, speed, signal strength, radio frequency signal to noise ratio, comments and/or ratings). Qualitative information (e.g., comments) may be provided to the venue operator device 3204. In some embodiments, the virtual network system 3206 averages or performs other functions including customer experience selections and/or QoE information with a plurality of customers of the wireless network connected to the venue attendee device 3202.

In step 3236, the customer experience selections (e.g., the averaged customer experience selections and/or QoE information with the plurality of customers of the wireless network connected to the venue attendee device 3202 may be provide to the venue operator device 3204. The venue operator device 3204 may receive the information, for example, graphically (e.g., bar graph, line graph, pie graph, dashboard indicator, or the like), by text, in an MS Excel format, or in a CSV format.

In various embodiments, a venue attendee device 3202 may access the wireless network and/or receive notification messages regardless if the venue owner or operator has provided express permission in the registration process. For example, the venue attendee device 3202 may receive login information associated with the wireless network from the virtual network system 3206 (e.g., over an open port of a network device associated with the wireless network, previously downloaded, or received over a different network). The venue attendee device 3202 may provide the login information or credentials to the network device to obtain access. The venue attendee device 3202, either before or after login, may receive the notification message. Since the venue owner or operator had not registered the wireless network, the venue owner or operator may not have the opportunity to create or modify the content of the notification message or a related customer experience associated with the notification message.

In various embodiments, even if the wireless network is not part of the curated virtual network and login information is not received from the virtual network system 3206, the venue attendee device 3202 may receive and display a notification message. The venue attendee device 3202 may receive a notification message from the virtual network system 3206. In one example, the venue attendee device 3202 receives a notification message from the virtual network system 3206 over an open port of a network device associated with the wireless network, previously downloaded, or received over a different network. In another example, after obtaining wireless network access, the venue attendee device 3202 may provide an access indicator over the wireless network to the virtual network system 3206. Even if the wireless network is not recognized (e.g., the wireless network is not yet known by the virtual network system 3206), the virtual network system 3206 may provide one or more notification messages (e.g., a default notification message or a notification message selected from a plurality of notification messages based on user ID, location of the venue attendee device 3202, the venue attendee device 3202 past visits to other venues, related venues, type of venue of the wireless network, or the like). The venue attendee device 3202 may receive then notification message(s) and display a notification indicator and/or the notification message(s).

Figure 33:
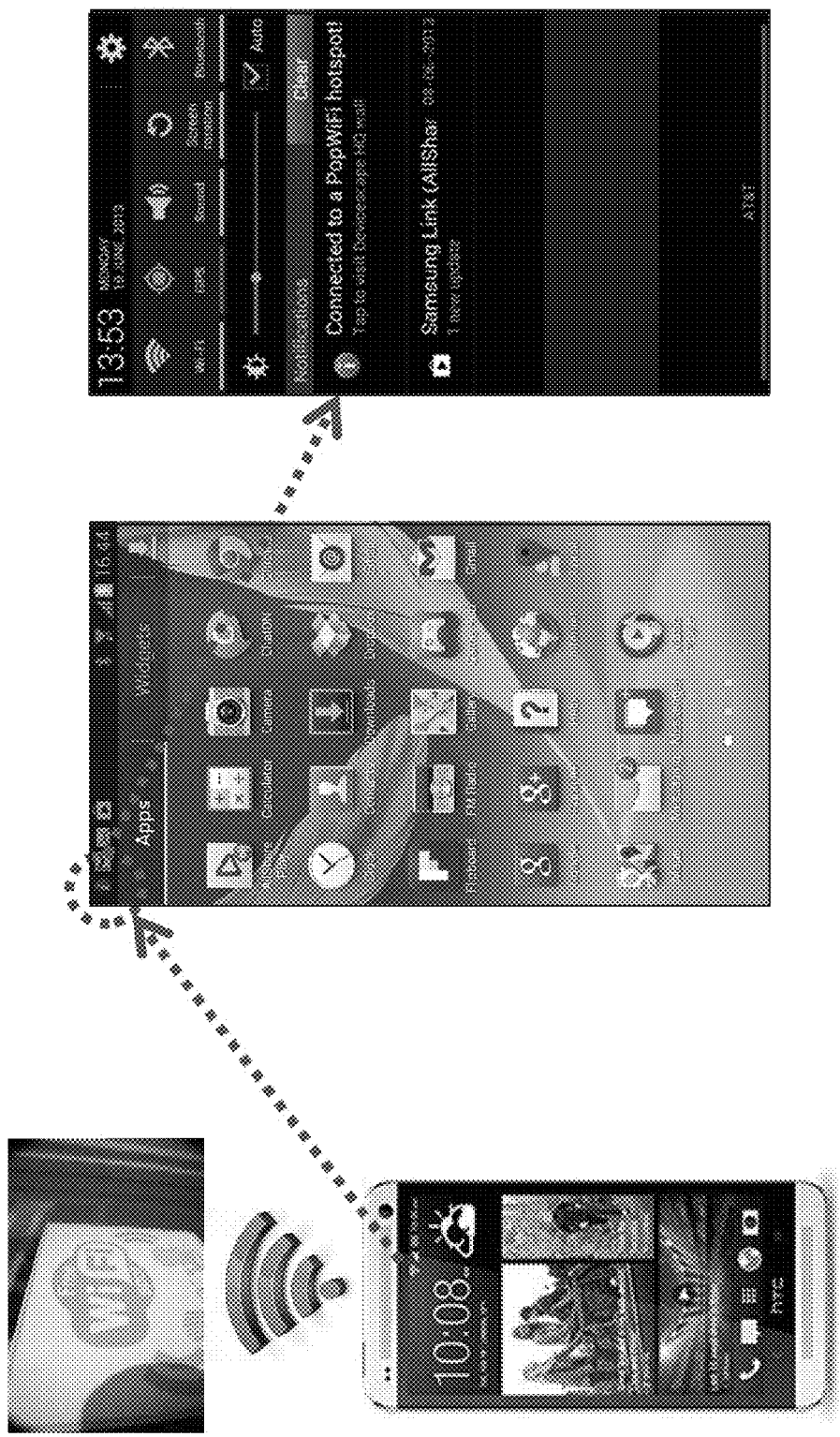
FIG. 33 depicts screen shots or interfaces displaying a notification indication and a notification after accessing a wireless network in some embodiments.

FIG. 33 depicts screen shots or interfaces displaying a notification indication and a notification after accessing a wireless network in some embodiments. In various embodiments, a venue attendee device (e.g., an HTC smartphone running the Android operating system) may scan (e.g., via the scan module 3104) an area for an available wireless network. In some embodiments, the login information module 3102, either with information manually provided by the user or utilizing login information from the virtual network system, may access the wireless network over a network device.

In some embodiments, after the venue attendee device is connected with the wireless network, the virtual network communication module 3108 may provide network access information (e.g., wireless network identifier(s) from the wireless network identification module 3106) to the virtual network system. The virtual network system may retrieve one or more network records associated with the wireless network identifier(s), and provide any number of notification messages to the venue attendee device.

The venue attendee device may depict a notification identifier (e.g., in the upper left corner of the venue attendee device interface. If the user access notifications, the notification message from the virtual network system (e.g., "connected to a PopWiFi hotspot! Tap to visit Devicescape HQ wall") may be displayed by the notification module 3110.

Figure 34B:
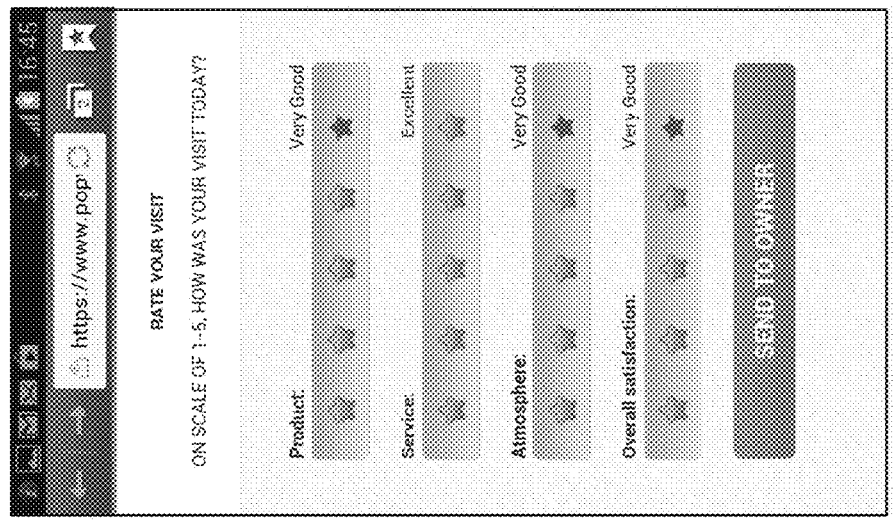
FIGS. 34a and b depicts screen shots or interfaces displaying a notification and a rating customer experience interface in some embodiments.
Figure 34A:
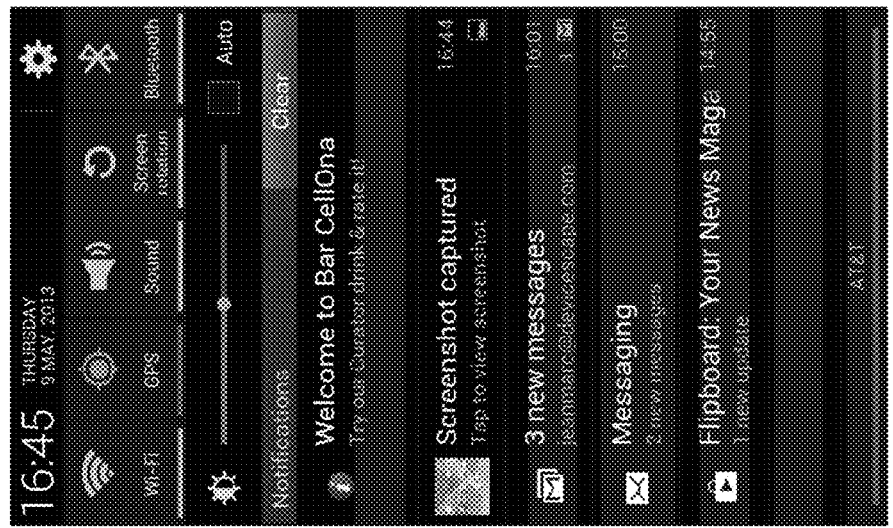

FIGS. 34a and b depicts screen shots or interfaces displaying a notification and a rating customer experience interface in some embodiments. FIG. 34a depicts a notification screen of an Android O/S smartphone with the notification message "Welcome to Bar CellOna—Try our Curator drink & rate it!" If the user selects or otherwise engages with the notification message, the user's digital device (e.g., venue attendee device) may display the rating interface depicted in FIG. 34b.

The rating interface depicted in FIG. 34b may allow the user to rate the venue, rate the visit, rate a product associated with the wireless network and/or venue (e.g., a rating of the Curator drink), rate a service (e.g., wait staff or WiFi service), rate the atmosphere, and/or rate overall satisfaction.

In various embodiments, the virtual network system may provide the rating interface to be stored locally on the digital device until the user engages with the notification message. In some embodiments, the notification message is associated with a URL associated an interface or webpage hosted by a web server or locally stored. In an example, when the user engages with the notification message, the digital device may execute or spawn a browser directed to the rating interface on a network (e.g., on the Internet) or directed to the rating interface on the digital device.

The user of the digital device may also provide the rating selections to the owner. In some embodiments, the rating(s) are provided by the digital device to the virtual network system which may provide any or all information to the venue owner or operator. In some embodiments, the virtual network system averages or otherwise assesses rating from any number of users who have accessed the wireless network. The virtual network system may provide the averaged or assessed rating(s) to the venue owner or operator.

Those skilled in the art will appreciate that an interface may comprise a screen shot.

Figure 35:
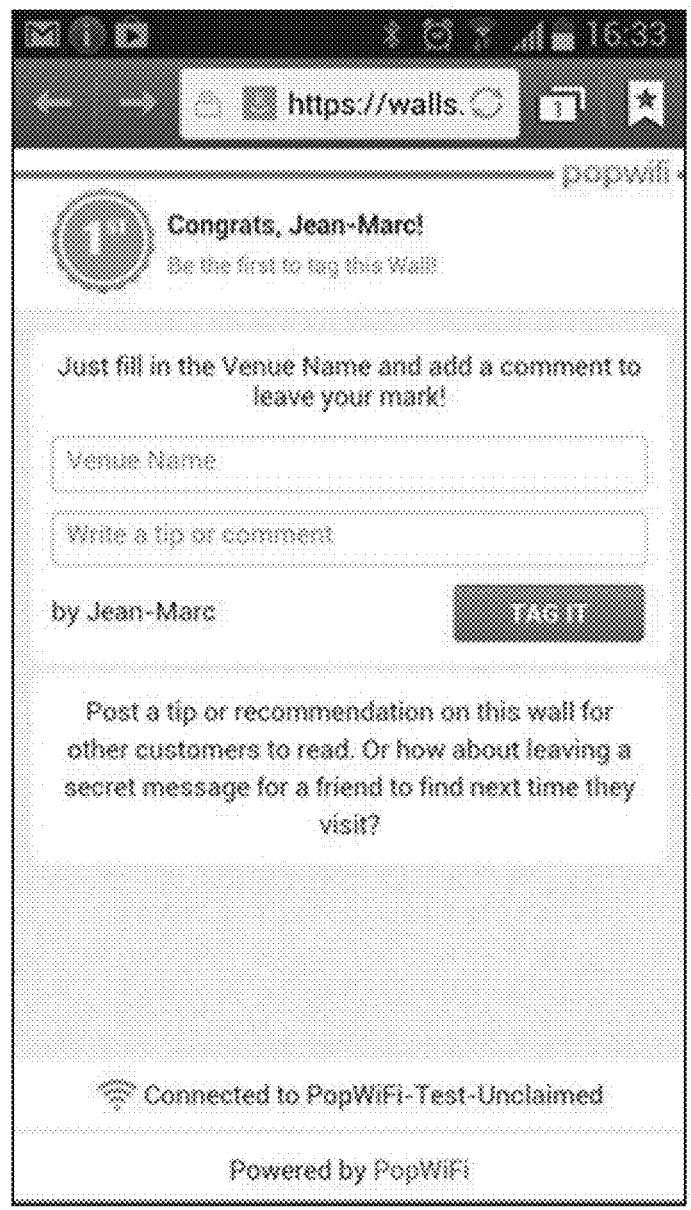
FIG. 35 depicts a screen shot or interface displaying a community wall in some embodiments.

FIG. 35 depicts a screen shot or interface displaying a community wall in some embodiments. In various embodiments, a community wall interface as depicted in FIG. 35 may be displayed by a digital device (e.g., venue attendee device). In various embodiments, the user of the digital device may be able to read comments by other venue attendees connected to the same wireless network. The community wall interface may allow a user to identify the venue name and/or write a comment. In some embodiments, the venue name may be automatically populated by the virtual network server and/or a client on the digital device.

Although the community wall interface depicted in FIG. 35 allows a user to type a comment, in some embodiments, the community wall interface may allow a user to select one of several options to express their view of the venue, products, services, people, entertainment, event, and/or the like.

In various embodiments, even if the venue owner or operator has not registered the wireless network, the venue attendee may access the wireless network and receive one or more notification messages and/or customer experience interfaces. For example, a venue attendee may interact with a default notification message to display the community wall. Even though the venue owner or operator may not receive comments from the community wall as a part of the feedback offered by the virtual network server, the venue attendee may, in some embodiments, review and provide comments. Those skilled in the art will appreciate that any number of different interfaces may be provided to venue attendees regardless if the venue owner or operator registers the wireless network.

In some embodiments, the community wall interface (or any other interface) may comprise a link coupled to a pre-registration interface, a registration interface, or an invitation to a venue owner or operator to pre-register or register. For example, the venue owner or operator may utilize a digital device to access the community wall interface and/or review comments. The venue owner or operator may execute the link to receive a pre-registration interface (e.g., to provide wireless network identifier(s) and receive a pre-registration code), a registration interface (e.g., to provide permission for the wireless network to be shared), or an invitation (e.g., to review the benefits of registration). The pre-registration interface, registration interface, and/or invitation may be locally stored or retrieved from a network.

In various embodiments, a registration link may comprise the wireless network identifier(s). For example, the link in the community wall interface may comprise the wireless network identifier(s). In some embodiments, wireless network identifier(s) may be provided by a digital device to the virtual network server (e.g., when the digital device provides an access indication discuss herein). Even if the wireless network identified by the wireless network identifier(s) had not been previously registered, the virtual network server may provide a notification message and the community wall interface. In some embodiments, the virtual network server may embed or otherwise associate the wireless network identifier(s) with the link. As a result, if the venue owner or operator receives or views the community wall interface, the venue owner or operator may activate the link thereby providing the wireless network(s) to the virtual network server. Those skilled in the art will appreciate that this step may render pre-registration (e.g., and the function of the pre-registration code) as unnecessary. As a result, the link may direct the venue owner or operator to a registration interface.

Figures 36A, 36B:
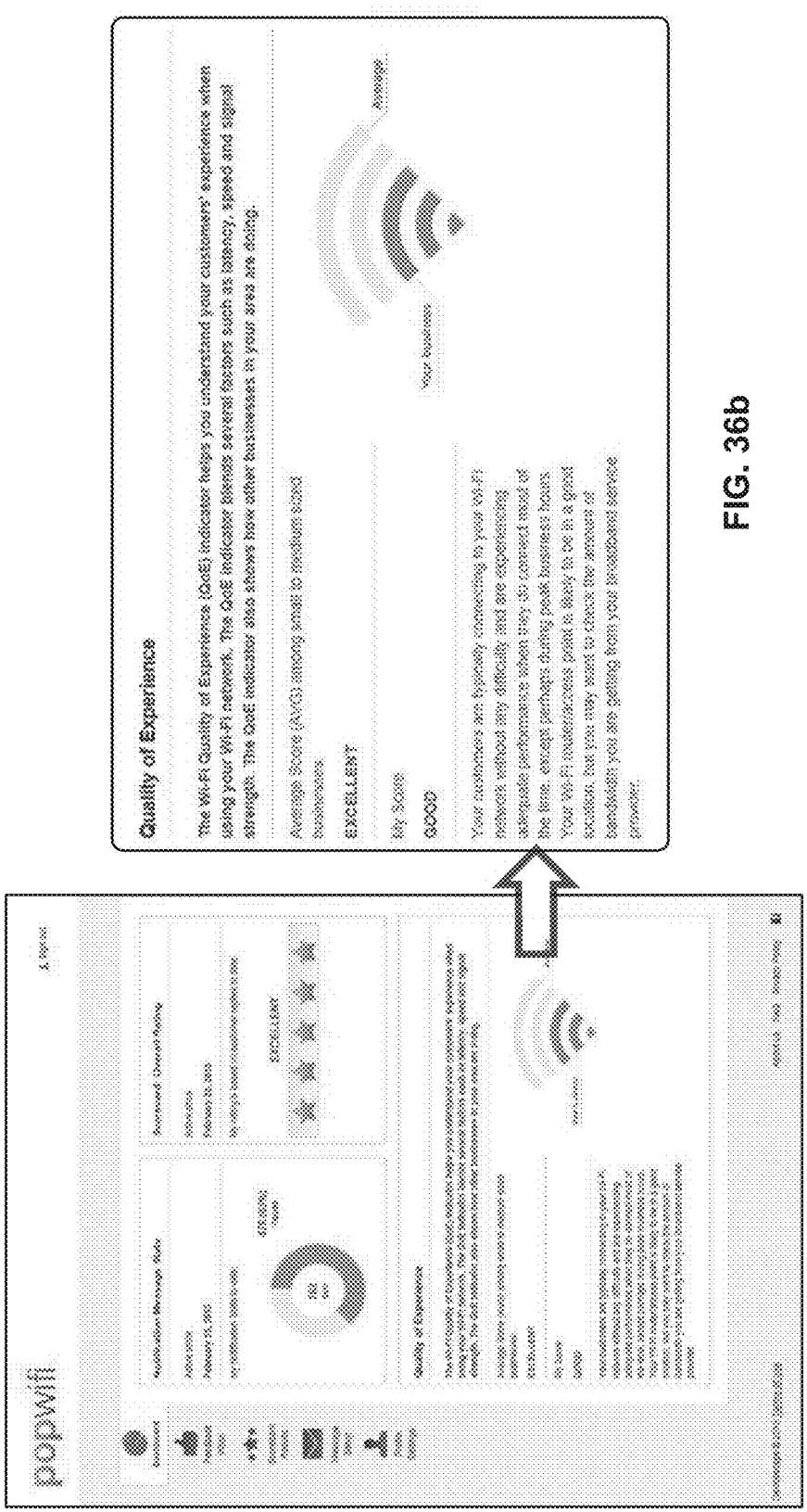
FIGS. 36a and b each depict a screen shot or interface displaying a dashboard as well as contents a QoE interface in some embodiments.

FIGS. 36a and b depict screen shots or interfaces displaying a dashboard as well as contents a QoE interface in some embodiments. In various embodiments, a venue owner or operator may access a dashboard indicating notification message stats, a scorecard for overall rating, and a quality of experience (QoE). The venue owner or operator may access the dashboard interface by providing a username, password, and/or credential to the virtual network server 2500. In some embodiments, the authentication module 2510 of the virtual network server 2500 may confirm, authenticate, and/or verify the user's username, password, credential, and/or associated wireless network. The owner feedback module 2516 and/or the registration module 2504 may provide the dashboard interface to the venue owner or operator's digital device.

The dashboard may comprise a portion for notification message statistics. The portion for notification message statistics may identify the total number of notification messages sent as well as the percent of notification messages that were engaged by the user. Although only one graphic and/or notification message is included, those skilled in the art will appreciate that there may be a separate graphic and/or separate information for any number of notification messages.

The scorecard: Overall Rating may include an overall rating by a plurality of users. For example, each of a plurality of users of a wireless network over time may provide customer ratings of venue, food, drink, products, services, and/or the like over a predetermined period of time. In some embodiments, the virtual network server may average, combine, and/or otherwise assess selections and/or input provided by the users. The overall rating may be provided to the venue owner or operator.

In some embodiments, the dashboard may include a quality of experience section that allows the venue owner or operator to understand the customer's experience utilizing the wireless network. In some embodiments, the quality of experience (QoE interface) graphs any number of factors including, for example, a QoE indicator, may be a blend of several factors including, for example, latency, jitter, speed, signal strength, and/or radio frequency signal to noise ratio from any number of users.

In addition to or instead of the QoE interface, the virtual network server 2500 may average and/or assess latency, jitter, speed, signal strength, and/or radio frequency signal to noise ratio from any number of users.

In various embodiments, the QoE indicator and/or other measurement(s) may be compared to an overall threshold to provide a qualitative assessment (e.g., "Good"). In some embodiments, the QoE module 2516 may average a QoE indicator over any number of users and then compare the average to other peer venues (e.g., peer venues) to provide a quality metric.

In various embodiments, the virtual network system may automatically add wireless networks that are "open" (i.e., there is no 802.11 encryption (WEP/WPA or the like.) at the networking link layer). An open network, in some embodiments, may be either completely open, provide access with no further action once connected, or require some action in a captive portal/web page. Many amenity networks, typically single locations, may use a security key to manage access to ensure only patrons are accessing the network.

As discussed herein, a customer may view signage for free Wi-Fi and then ask venue staff for the key (e.g., password). This kind of wireless network (i.e., a wireless network that is not "open") may not be automatically added to the curated virtual network since the key may be unknown to the virtual network system and may not be available.

In some embodiments, a venue owner can provide the network security key to the virtual network system during the sign-up (e.g., registration) process. Subsequently, the virtual network system may share the key and/or others automatically with handsets (e.g., venue attendee devices) running client software. Those skilled in the art will appreciate that seamless access may be provided to the venue's wireless network in return for allowing the venue owner to message the users. In some embodiments, access may be restricted to users that only view the venue's messaging or access maybe restricted to users that engage in any number of ways.

For example, a venue owner or operator may share their wireless network (e.g., Wi-Fi network) by agreeing (during registration) to terms and conditions, and providing the wireless network identifier (e.g., SSID) and encryption key (WEP, WPA and the like) to the virtual network device (e.g., via a web portal).

The encryption key(s), wireless network identifier(s), and/or other meta-data for any number of venues may be distributed to different digital devices (e.g., venue attendees). In some embodiments, the virtual network system may provide the encryption key(s), wireless network identifier(s), and/or other meta-data for any number of venues to digital devices with a client (e.g., with a secure communication module 3116).

In various embodiments, keys and wireless network identifiers (e.g., SSIDs) are distributed based on geographic location. For example, in some embodiments, a digital device (e.g., venue attendee device) may provide the virtual network system location information. In one example, the digital device may provide the digital device's location information in response to a location request provided by the virtual network system. In another example, the digital device may include location information when providing network access information or any other information to the virtual network system. In a further example, the virtual network system may determine the location of the digital device based on the location of wireless network scanned and/or connected by the digital device.

In some embodiments, the secure share module 2520 of the virtual network server may utilize a bounding box or geohash to determine which digital device(s) are to receive keys and wireless network identifiers. Periodically or at pre-determined times, collections of keys may be updated when a digital device changes location. Location of a digital device may be determined by many means, including GPS, cell tower positioning and Wi-Fi positioning. The frequency of updates may be variable.

Figure 36C:
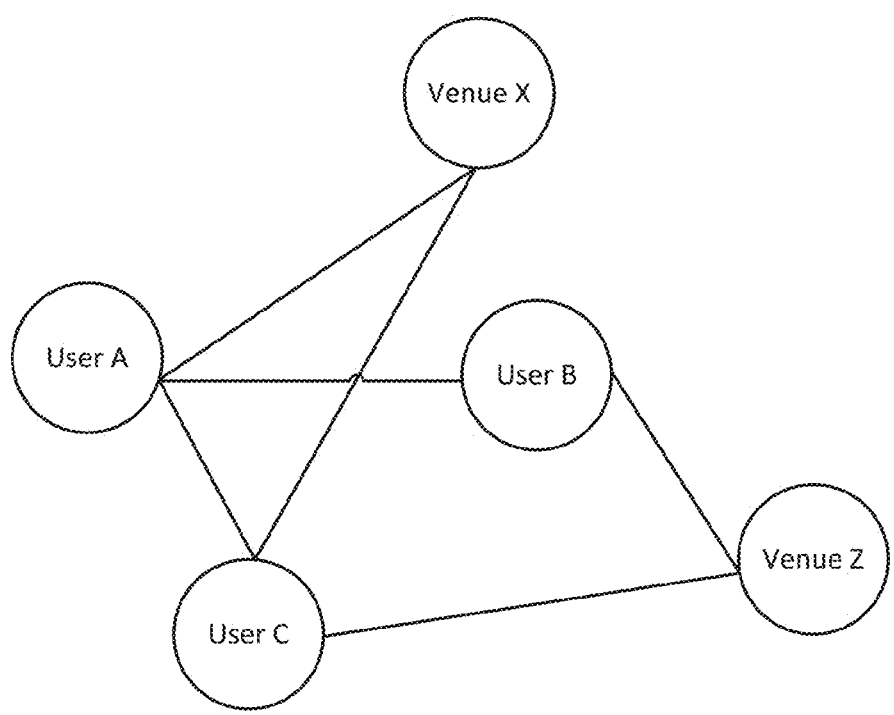
FIGS. 36c and d depict sample graph representations of multiple users' locations over time.

Multiple users' locations over time may be tracked and stored using a graph representation, with users and venues represented by graph vertices, and graph edges determining relationships between users and venues, as shown in FIG. 36c. In some embodiments, user A could be linked to user B and user C via a social network or other association, user B and C having visited venue Z, determined by a social network 'like' for example. User A may also be linked with venue X, which also was linked with user C. As a result, the secure share module 2520 may be derived that perhaps user A has the same interests as user C and hence the same likelihood of visiting venue Z. As a result, keys and wireless network identifiers deemed appropriate for user C, namely keys and wireless network identifiers for venue Z, may also distributed to user A. This may be further refined for example if venue X were a sports arena and venue Z a sports bar.

Figure 36D:
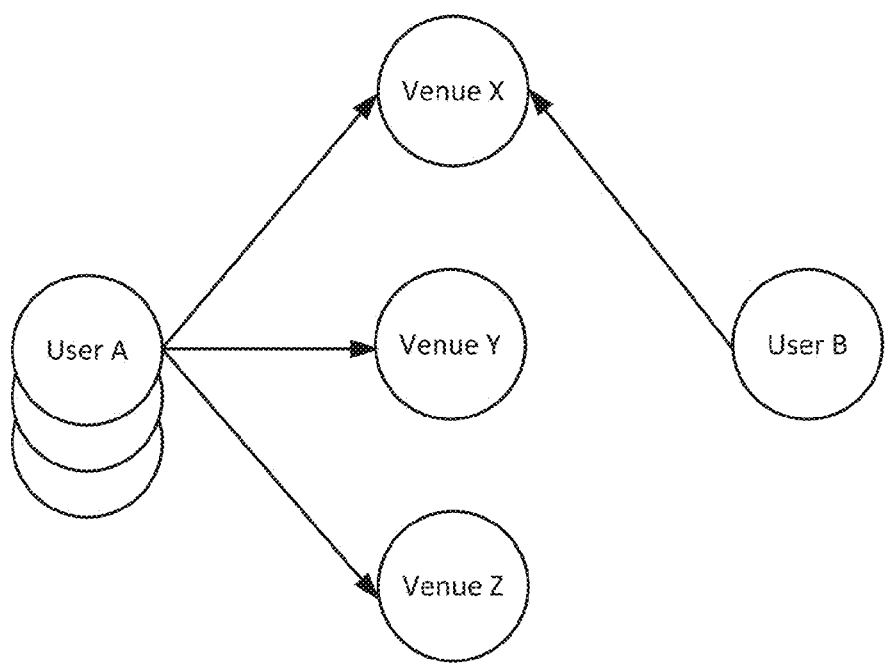

In various embodiments, users may be linked by directed edges of a graph when users are associated with a venue's wireless network based solely on the associated network device's wireless network identifiers (e.g., BSSIDs) derived from the digital device's Wi-Fi scan list, as shown in FIG. 36d. Device A (depicted as User A in FIG. 36d) may link to venue X, Y and Z, in which case, Device A may get the keys and wireless network identifiers for these venues. Additionally, Device B (depicted as User B in FIG. 36d) may only have a graph edge relationship to venue X, however based on a significant number of other users that are linked to venue X, and also Y and Z, it may be deemed appropriate to distribute the keys and wireless network identifiers for venues X, Y and Z to Device B since it's likely its user will encounter these venues.

There could be many other relationships that determine the appropriate distribution of network keys and SSIDs.

In various embodiments, a venue owner may change their security key, instead of providing their existing SSID and security keys. In some embodiments, the SSID may represent the security key where the SSID is hashed using a hashing algorithm and private key. For example, a venue has the SSID of "Bobs Dry Cleaning" The SSID may be hashed as follows MD5(Bobs Dry Cleaning 56a5cdea349f6cez)= dafdbb0df18712103941181a0cc0f651. A digital device may, in some embodiments, derive the key solely from the SSID using the same algorithm. For simplicity and to make manual entry easier, the MD5 hash could be truncated, for example to dafdbb0d.

In a further embodiment, the numeric key, hexadecimal, decimal etc. could be mapped to a dictionary of English words, making manual entry easier—for example: dafdbb0d would map to "baseball", and 4efb14d6 would map to "airplane."

Figure 37:
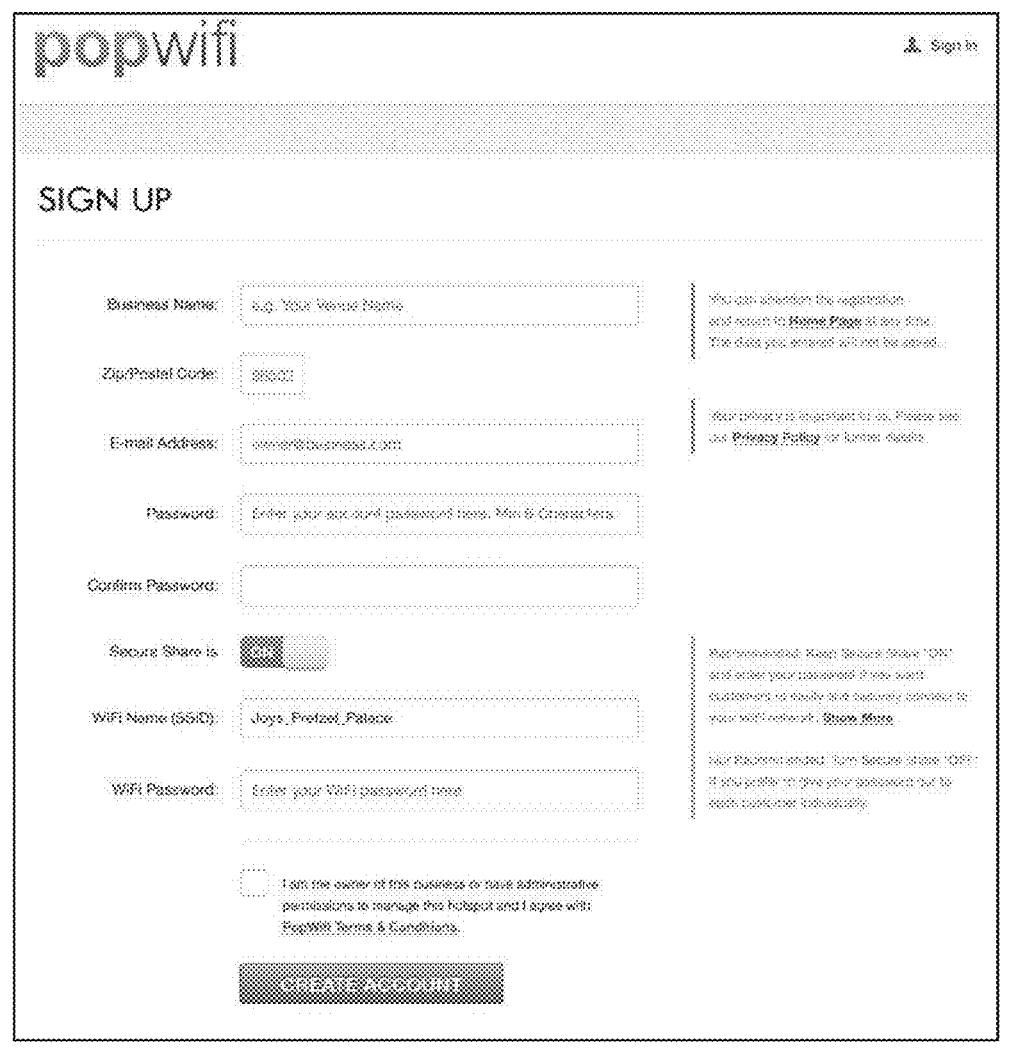

FIG. 37 is a screen shot or interface for providing secure share information in some embodiments. In various embodiments, the registration interface provided by the registration module 2504 may comprise a request for a wireless network name (e.g., SSID) as well as a key (e.g., password) or other credential. The registration interface may further comprise an indicator that the secure share is active (e.g., "on") or inactive (e.g., "off"). If secure share is inactive, the virtual network system may or may not provide wireless network identifiers to the digital device(s). If secure share is active, the virtual network system, In some embodiments, may provide the wireless network identifier (e.g., the SSID) as well as the key or credential to any number of digital device (e.g., those digital devices that enter within a predetermined proximity of the secured wireless network).

Figure 38:
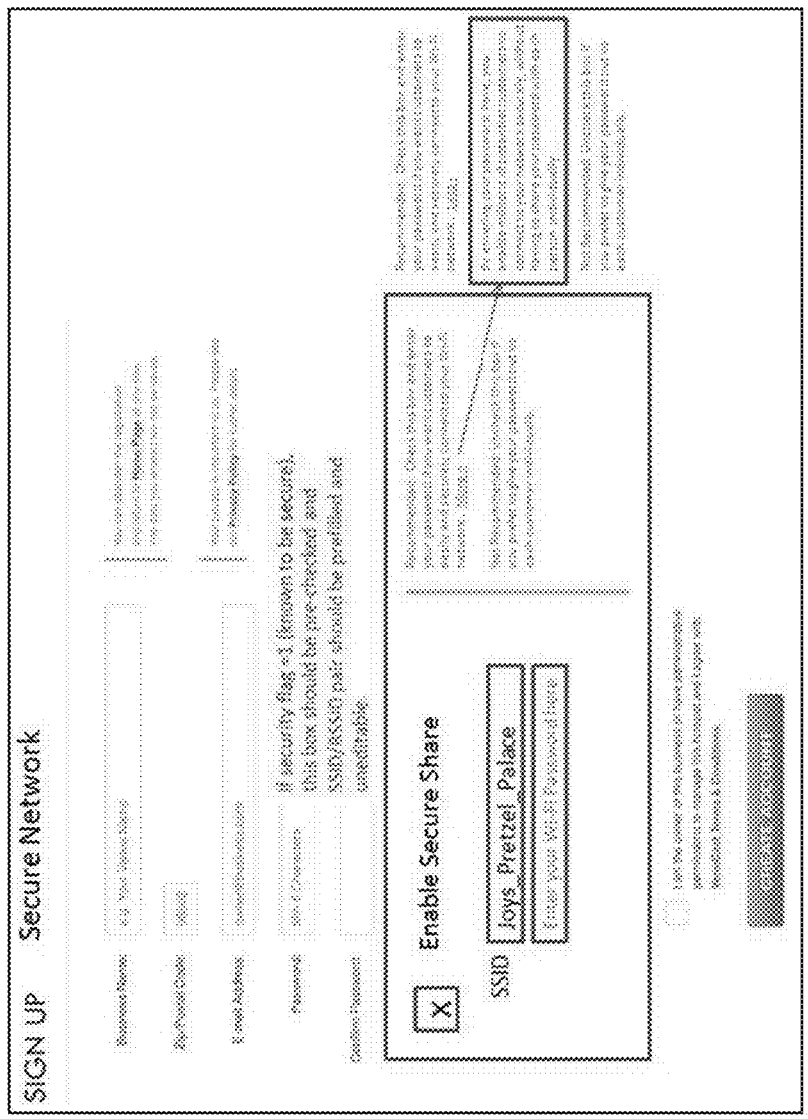
FIG. 38 depicts another screen shot or interface displaying a secure share set-up in some embodiments.

FIG. 38 depicts another screen shot or interface displaying a secure share set-up in some embodiments. In various embodiments, the venue attendee device or venue owner or operator device (e.g., via the wireless network identification module 3106) may determine that the wireless network is encrypted or otherwise secure. The information may be provided to the virtual network system. If the venue owner or operator requests to register the wireless network, the registration module 2504 may, based on the information provided to the virtual network system, confirm in a registration sign up interface that the secure share is enabled (e.g., and make the secure share "enabled" option unable to be changed).

As discussed with regard to the registration interface, the registration interface provided by the registration module 2504 may comprise a request for a wireless network name as well as a key (e.g., password) or other credential. The wireless network name and/or identifier may comprise the SSID/BSSID pair from the wireless network (e.g., from the network device associated with the wireless network).

Figure 39:
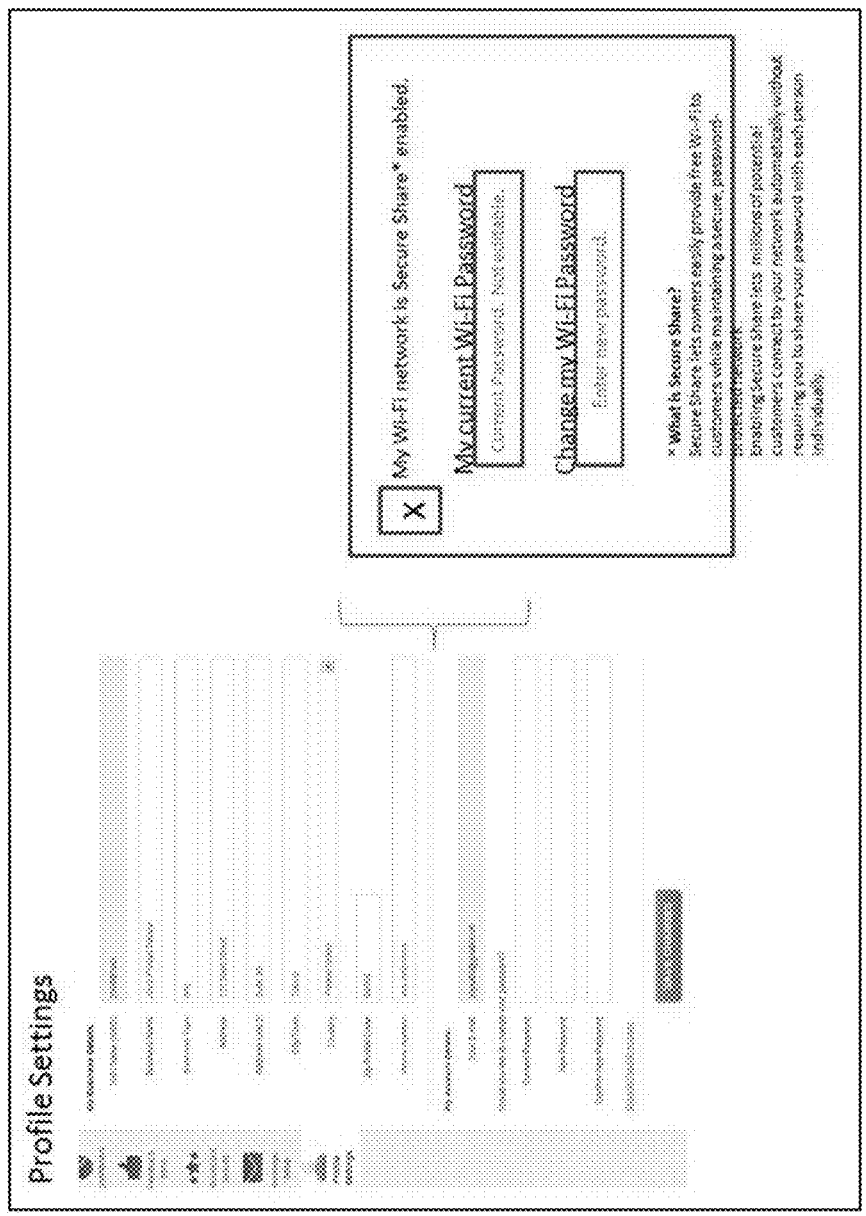
FIG. 39 depicts a screen shot or interface displaying changing secure share settings in some embodiments.

FIG. 39 depicts a screen shot or interface displaying changing secure share settings in some embodiments. In various embodiments, the venue owner or operator may access their profile settings by providing a username and/or password to the virtual network server. In some embodiments, the registration module 2504 and/or the owner feedback module 2518 may allow access to the profile settings. In various embodiments, the venue owner or operator may alter or update, the wireless network identifier(s), business name, business type, address(es), email address, whether the wireless network is "secure share enabled," and password(s).

The present invention(s) described above with reference to exemplary embodiments. It will be apparent to those skilled in the art that various modifications may be made and other embodiments can be used without departing from the broader scope of the present invention(s). Therefore, these and other variations upon the exemplary embodiments are intended to be covered by the present invention(s).

The invention claimed is:

1. A method comprising:
providing by a server system a pre-registration invitation to a first digital device connected to a wireless network;
receiving by the server system a pre-registration code request from the first digital device, the pre-registration code request including one or more wireless network identifiers detected by the first digital device, at least one of the one or more wireless network identifiers identifying the wireless network;
generating by the server system a pre-registration code in response to the pre-registration code request, the pre-registration code being associated with the one or more wireless network identifiers;
providing by the server system the pre-registration code to the first digital device;
receiving by the server system a registration request from a second digital device, the registration request comprising the pre-registration code; and
provisioning an account based on the registration request and the one or more wireless network identifiers, the one or more wireless network identifiers identified using the pre-registration code.

2. The method of claim 1 further comprising receiving by the server system notification message selections selecting at least one notification message from the second digital device, associating the at least one notification message with the account in response to receiving the notification message selections, and providing the at least one notification message to at least one user that shares the wireless network.

3. The method of claim 2 further comprising detecting the at least one user at the time the at least one user accesses the wireless network and providing the at least one notification message to the at least one user that accesses the wireless network.

4. The method of claim 2 further comprising receiving customer experience interface selections associated with customer experience interfaces, and providing at least one customer experience interface to the at least one user that accesses the wireless network.

5. The method of claim 4 further comprising detecting the at least one user accessing the at least one notification message or who has engaged with the at least one notification message and providing the at least one customer experience interface.

6. The method of claim 5 further comprising receiving feedback associated with content provided by the at least one user of the at least one customer experience interface.

7. The method of claim 5 wherein at least one of the customer experience interfaces comprises a community wall interface.

8. The method of claim 5 wherein at least one of the customer experience interfaces comprises a rating interface.

9. The method of claim 1 wherein the first digital device and the second digital device are the same device.

10. The method of claim 1 wherein the wireless network is accessible by a plurality of users before provisioning the account.

11. A non-transitory computer readable medium comprising instructions executable by a processor to perform a method, the method comprising:
- providing by a server system a pre-registration invitation to a first digital device connected to a wireless network;
- receiving by the server system a pre-registration code request from the first digital device, the pre-registration code request including one or more wireless network identifiers detected by the first digital device, at least one of the one or more wireless network identifiers identifying the wireless network;
- generating by the server system a pre-registration code in response to the pre-registration code request , the pre-registration code being associated with the one or more wireless network identifiers;
- providing by the server system the pre-registration code to the first digital device;
- receiving by the server system registration request from a second digital device, the registration request comprising the pre-registration code; and
- provisioning an account based on the registration request and the one or more wireless network identifiers, the one or more wireless network identifiers identified using the pre-registration code.

12. The non-transitory computer readable medium of claim 11, the method further comprising receiving by the server system notification message selections selecting at least one notification message from the second digital device, associating the at least one notification message with the account in response to receiving the notification message selections, and providing the at least one notification message to at least one user that shares the wireless network.

13. The non-transitory computer readable medium of claim 12, the method further comprising detecting the at least one user at the time the at least one user accesses the wireless network and providing the at least one notification message to the at least one user that accesses the wireless network.

14. The non-transitory computer readable medium of claim 12, the method further comprising receiving customer experience interface selections associated with customer experience interfaces, and providing at least one customer experience interface to the at least one user that accesses the wireless network.

15. The non-transitory computer readable medium of claim 14, the method further comprising detecting the at least one user accessing the at least one notification message or who has engaged with the at least one notification message, and providing the at least one customer experience interface.

16. The non-transitory computer readable medium of claim 15, the method further comprising receiving feedback associated with content provided by the at least one user of the at least one customer experience interface.

17. The non-transitory computer readable medium of claim 15 wherein at least one of the customer experience interfaces comprises a community wall interface.

18. The non-transitory computer readable medium of claim 15 wherein at least one of the customer experience interfaces comprises a rating interface.

19. The non-transitory computer readable medium of claim 11 wherein the first digital device and the second digital device are the same device.

* * * * *